US011970556B2

(12) United States Patent
Inagawa et al.

(10) Patent No.: US 11,970,556 B2
(45) Date of Patent: *Apr. 30, 2024

(54) METHACRYLIC RESIN, METHOD OF MANUFACTURING METHACRYLIC RESIN, METHACRYLIC RESIN COMPOSITION, SHAPED ARTICLE, OPTICAL COMPONENTS, AND AUTOMOTIVE PART

(71) Applicant: ASAHI KASEI KABUSHIKI KAISHA, Tokyo (JP)

(72) Inventors: Yuichiro Inagawa, Tokyo (JP); Junichi Yoshida, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 575 days.

This patent is subject to a terminal disclaimer.

(21) Appl. No.: 17/286,014

(22) PCT Filed: Oct. 10, 2019

(86) PCT No.: PCT/JP2019/040124
§ 371 (c)(1),
(2) Date: Apr. 16, 2021

(87) PCT Pub. No.: WO2020/080267
PCT Pub. Date: Apr. 23, 2020

(65) Prior Publication Data
US 2021/0380742 A1    Dec. 9, 2021

(30) Foreign Application Priority Data

Oct. 16, 2018  (JP) .................. 2018-195302
Oct. 16, 2018  (JP) .................. 2018-195306

(51) Int. Cl.
C08F 220/14      (2006.01)
G02B 1/04        (2006.01)

(52) U.S. Cl.
CPC ............ C08F 220/14 (2013.01); G02B 1/041 (2013.01); G02B 1/045 (2013.01)

(58) Field of Classification Search
CPC ........ C08F 220/14; G02B 1/045; G02B 1/041
USPC ........................................ 526/262
See application file for complete search history.

(56) References Cited

U.S. PATENT DOCUMENTS

| 5,556,991 | A | 9/1996 | Kita et al. | |
| 10,017,627 | B1* | 7/2018 | Iwase | C08K 5/524 |
| 11,459,504 | B2* | 10/2022 | Kanzaki | H10K 59/38 |
| 2013/0072651 | A1 | 3/2013 | Yonemura et al. | |
| 2014/0011959 | A1 | 1/2014 | Takaki | |
| 2014/0309391 | A1 | 10/2014 | Jeon et al. | |
| 2016/0048057 | A1* | 2/2016 | Sekiguchi | G02F 1/133602 349/61 |
| 2018/0291140 | A1 | 10/2018 | Yoshida et al. | |
| 2018/0305538 | A1 | 10/2018 | Murakami et al. | |
| 2019/0256632 | A1 | 8/2019 | Hiramoto et al. | |
| 2020/0165515 | A1* | 5/2020 | Kanzaki | H10K 50/00 |
| 2021/0238326 | A1 | 8/2021 | Kobayashi et al. | |

FOREIGN PATENT DOCUMENTS

| CN | 102906130 A | 1/2013 |
| CN | 107540779 A | 1/2018 |
| CN | 108350125 A | 7/2018 |
| CN | 108690162 A | 10/2018 |
| CN | 108779213 A | 11/2018 |
| CN | 112154185 A | 12/2020 |
| EP | 3378878 A1 | 9/2018 |
| JP | S61126108 A | 6/1986 |
| JP | H0586112 A | 4/1993 |
| JP | H06135931 A | 5/1994 |
| JP | H07286012 A | 10/1995 |
| JP | H09324016 A | 12/1997 |
| JP | 2001151814 A | 6/2001 |
| JP | 2001233919 A | 8/2001 |
| JP | 2011221122 A | 11/2011 |
| JP | 2014048586 A | 3/2014 |
| JP | 2014191175 A | 10/2014 |
| JP | 2016113579 A | 6/2016 |
| JP | 6114454 B1 | 4/2017 |
| JP | 2017101225 A | 6/2017 |
| JP | 2017132981 A | 8/2017 |
| JP | 2017179354 A | 10/2017 |
| JP | 2017179355 A | 10/2017 |
| JP | 2017186508 A | 10/2017 |

(Continued)

OTHER PUBLICATIONS

Dec. 10, 2019, International Search Report issued in the International Patent Application No. PCT/JP2019/040124.
Nov. 12, 2021, the Supplementary European Search Report issued by the European Patent Office in the corresponding European Patent Application No. 19874328.8.
Apr. 14, 2021, International Preliminary Report on Patentability issued in the International Patent Application No. PCT/JP2019/040124.

Primary Examiner — Michael M. Bernshteyn
(74) Attorney, Agent, or Firm — KENJA IP LAW PC

(57) ABSTRACT

The present disclosure is directed to provide a methacrylic resin and a methacrylic resin composition which enable production of a shaped article excellent in color tone in a long path length. A methacrylic resin of the present disclosure has a structural unit (X) including a cyclic structure in a main chain thereof. The methacrylic resin having a glass transition temperature (Tg) of higher than 120° C. and 160° C. or lower. An emission intensity at 514 nm in terms of a concentration of a solution of fluorescein in ethanol is $30 \times 10^{-10}$ mol/L or less when a solution containing 2.0 mass % of the methacrylic resin in chloroform is spectroscopically analyzed using an excitation wavelength of 436 nm and a slit width of 2 nm.

21 Claims, 1 Drawing Sheet

(56) References Cited

FOREIGN PATENT DOCUMENTS

| | | | |
|---|---|---|---|
| JP | 6247373 | B1 | 12/2017 |
| JP | 2018002994 | A | 1/2018 |
| JP | 2018009141 | A | 1/2018 |
| JP | 2018035225 | A | 3/2018 |
| JP | 2018053216 | A | 4/2018 |
| JP | 2019035015 | A | 3/2019 |
| JP | 2019035016 | A | 3/2019 |
| JP | 2019035017 | A | 3/2019 |
| KR | 1020100087644 | A | 8/2010 |
| WO | 2009041693 | A1 | 4/2009 |
| WO | 2011149088 | A1 | 12/2011 |
| WO | 2012128255 | A1 | 9/2012 |

* cited by examiner

METHACRYLIC RESIN, METHOD OF MANUFACTURING METHACRYLIC RESIN, METHACRYLIC RESIN COMPOSITION, SHAPED ARTICLE, OPTICAL COMPONENTS, AND AUTOMOTIVE PART

TECHNICAL FIELD

The present disclosure relates to a methacrylic resin, a method of producing a methacrylic resin, a methacrylic resin composition, a shaped article, an optical component, and an automotive part.

BACKGROUND

Background

Methacrylic resins have low birefringence as one of their optical properties, as well as excellent transparency and surface hardness. In recent years, they have been thus attracting attention as optical resins for optical materials of a wide variety of optical products including flat panel displays such as liquid crystal displays, plasma displays, and organic EL displays, small infrared sensors, minute optical waveguides, ultra-small lenses, pickup lenses for DVD/Blu-ray disks employing short wavelength light, optical disks, optical films, and plastic substrates, for example, and their market is greatly expanding.

In particular, a methacrylic resin having a cyclic structure in the main chain thereof and a composition containing such a methacrylic resin are known to have excellent performances in both heat resistance and optical property (see PTL 1, for example), and their demands have been rapidly increasing year by year. However, a methacrylic resin having a cyclic structure in the main chain thereof with improved heat resistance and optical property as described above suffers from coloration or reduced transmittance which are sometimes caused by absorption of light in the visible light range attributable to the cyclic structure or the like. Therefore, methods to reduce a coloration-inducing material contained in the raw material or to reduce unreacted cyclic monomers remaining in the methacrylic resin have been disclosed for producing a methacrylic resin having a cyclic structure in the main chain thereof with little coloration and high transparency.

With regard to coloration-inducing materials in raw materials, PTL 2 discloses that coloration and silver streaks of a resin can be prevented by reducing the contents of N-phenylmaleamic acids and N-phenylsuccinimides contained in N-phenylmaleimide, for example.

Further, PTL 3 discloses that coloration of N-substituted maleimide can be prevented and the color tone of a transparent resin produced from N-substituted maleimide as a monomer can in turn be improved by reducing the content of primary amines and the content of 2-amino-N-substituted succinimides in N-substituted maleimide.

As an example of the method of reducing unreacted monomers in a methacrylic resin, PTL 4 proposes a method employing monomer components containing (a) N-substituted maleimide and (b) a methacrylic ester. In this method, a portion of the monomer components is fed to initiate polymerization, and the remainder of the monomer component is fed during polymerization, for example. In this manufacturing method, remaining N-substituted maleimide monomer is reduced by carrying out a control so that the proportion of (a) N-substituted maleimide in unreacted monomer components in the reaction system after completion of feeding of the monomer components is smaller than the proportion of (a) N-substituted maleimide in the total amount of the monomer components that are fed, to thereby produce a heat-resistant methacrylic resin having excellent transparency and low coloration.

Further, PTL 5 proposes a method to suppress coloration by inclusion of an acidic substance in the reaction system of the polymerization system of methacrylic ester-based monomer/maleimide monomer employing a sulfur-based chain transfer agent such as mercaptan, thereby reducing residual maleimide monomers and maleimide monomers produced by heat during a molding process and so forth.

CITATION LIST

Patent Literature

PTL 1: WO 2011/149088 A1
PTL 2: WO 2012/128255 A1
PTL 3: JP H06-135931 A
PTL 4: JP H09-334016 A
PTL 5: JP 2001-233919 A

SUMMARY

Technical Problem

In recent years, applications of compositions have expanded from optical film applications to applications of thick shaped article such as lenses or formed plates. Such thick shaped articles have longer optical paths, and there has been accordingly a demand for providing a composition which enables production of shaped articles with further reduced coloration.

When a thick shaped article such as a lens is produced by injection molding of a methacrylic resin composition having a relatively high glass transition temperature, it is necessary to mold the shaped article under high-temperature condition where the flowability of the resin composition is increased for producing the shaped article having a low birefringence. Under such a condition, the interior of the thick shaped article is exposed to the high temperature for long time, which may cause degradation of the color tone.

It would thus be helpful to provide a methacrylic resin and a methacrylic resin composition which can be used as a raw material of a shaped article excellent in color tone in a long path length. Particularly preferred are a methacrylic resin and a methacrylic resin composition, wherein the methacrylic resin composition has a relatively high glass transition temperature to enable production of a shaped article having a low birefringence and little coloration, even an injection-molded thick shaped article such as a lens.

Solution to Problem

Having intensively studied solutions to the aforementioned problems, we discovered that the content and the like of a fluorescent-emitting material commonly contained in a methacrylic resin having a cyclic structure in the main chain thereof had a correlation with coloration induced during manufacturing processes. We hence discovered that a shaped article excellent in color tone could be produced by controlling the fluorescence emission intensity and the like of a methacrylic resin within a certain range, thereby accomplishing the present disclosure.

Specifically, the present disclosure provides the following:

(1) A methacrylic resin having a structural unit (X) comprising a cyclic structure in a main chain thereof, the methacrylic resin having a glass transition temperature (Tg) of higher than 120° C. and 160° C. or lower, an emission intensity at a wavelength of 514 nm in terms of a concentration of a solution of fluorescein in ethanol being $30 \times 10^{-10}$ mol/L or less when a solution containing 2.0 mass % of the methacrylic resin in chloroform is spectroscopically analyzed using an excitation wavelength of 436 nm and a slit width of 2 nm.

(2) The methacrylic resin according to (1), wherein the emission intensity in terms of the concentration of the solution of fluorescein in ethanol is $1 \times 10^{-10}$ mol/L or more and $20 \times 10^{-10}$ mol/L or less.

(3) The methacrylic resin according to (1) or (2), an emission intensity at a wavelength of 458 nm in terms of a concentration of a solution of quinine sulfate dihydrate dissolved in a 1-mol/L dilute sulfuric acid is $4 \times 10^{-9}$ mol/L or more and $6 \times 10^{-9}$ mol/L or less when a solution containing 2.0 mass % of the methacrylic resin in chloroform is spectroscopically analyzed using an excitation wavelength of 365 nm and a slit width of 2 nm.

(4) The methacrylic resin according to any one of (1) to (3), wherein the methacrylic resin has a photoelastic coefficient with an absolute value of $3.0 \times 10^{-12}$ $Pa^{-1}$ or less.

(5) The methacrylic resin according to any one of (1) to (4), wherein the structural unit (X) comprises at least one structural unit selected from the group consisting of an N-substituted maleimide monomer-derived structural unit, a glutarimide-based structural unit, and a lactone ring structural unit.

(6) A method of producing a methacrylic resin, the methacrylic resin having an N-substituted maleimide monomer-derived structural unit in a main chain thereof, having a glass transition temperature (Tg) of higher than 120° C. and 160° C. or lower, and having a photoelastic coefficient with an absolute value of $3.0 \times 10^{-12}$ $Pa^{-1}$ or less, the method comprising:

a pretreatment step of water washing and/or dehydrating N-substituted maleimide so that an amount of 2-amino-N-substituted succinimide in a solution of N-substituted maleimide is 5 ppm by mass or less relative to 100 mass % of N-substituted maleimide in the solution of N-substituted maleimide;

a polymerization step of performing polymerization using the solution of N-substituted maleimide obtained through the pretreatment step; and a devolatilization step of devolatilizing a polymerization solution obtained through the polymerization step using a devolatilization apparatus without any rotating part.

(7) The method of producing a methacrylic resin according to (6), wherein a shear rate exerted on the polymerization solution in the devolatilization step is 20 $s^-$ or less.

(8) The method of producing a methacrylic resin according to (6) or (7), wherein the polymerization step comprises supplementarily adding 5 mass % to 35 mass % of a methacrylic acid ester monomer relative to 100 mass % of a total mass of all monomers fed for the polymerization after 30 or more minutes pass after addition of a polymerization initiator is started.

(9) The method of producing a methacrylic resin according to (6) to (8), wherein a total mass of unreacted N-substituted maleimide remaining after an end of the polymerization is 10 ppm by mass or more and 1000 ppm by mass or less relative to 100 mass % of the polymerization solution at the end of the polymerization.

(10) The method of producing a methacrylic resin according to any one of (6) to (9), wherein the N-substituted maleimide monomer comprises N-arylmaleimide, and a total mass of unreacted N-arylmaleimide after the end of the polymerization is 10 ppm by mass or more and 500 ppm by mass or less relative to 100 mass % of the polymerization solution at the end of the polymerization.

(11) A method of producing a methacrylic resin, the methacrylic resin having a glutarimide-based structural unit or a lactone ring structural unit in a main chain thereof, and having a glass transition temperature (Tg) of higher than 120° C. and 160° C. or lower, the method comprising:

a cyclization step of cyclizing a methacrylic resin having no cyclic structure in a main chain thereof through a reaction in a solution; and a devolatilization step of devolatilizing the resin solution obtained through the cyclization step using a devolatilization apparatus without any rotating part.

(12) The method of producing a methacrylic resin according to (11), wherein a shear rate exerted on the resin solution in the devolatilization step is 20 $s^{-1}$ or less.

(13) The method of producing a methacrylic resin according to (11) or (12), wherein the methacrylic resin has a glutarimide-based structural unit in the main chain thereof, and a temperature of the solution during a glutarimidation is in a range of 160° C. to 220° C.

(14) A methacrylic resin composition comprising the methacrylic resin according to any one of (1) to (5) or a methacrylic resin produced by the method of producing a methacrylic resin according to any one of (6) to (13).

(15) A shaped article comprising the methacrylic resin composition according to (14).

(16) An optical component comprising the shaped article according to (15).

(17) The optical component according to (16), wherein the optical component is a light guide plate.

(18) The optical component according to (16), wherein the optical component is a lens.

(19) An automotive part comprising the shaped article according to (15).

Advantageous Effect

According to the present disclosure, a methacrylic resin and a methacrylic resin composition are provided which can be used as a raw material of a shaped article excellent in color tone in a long path length. In particular, it is preferable that the methacrylic resin and the methacrylic resin composition of the present embodiment have a high heat resistance, a highly controlled birefringence, and an improved color tone.

DETAILED DESCRIPTION

Figure 1:
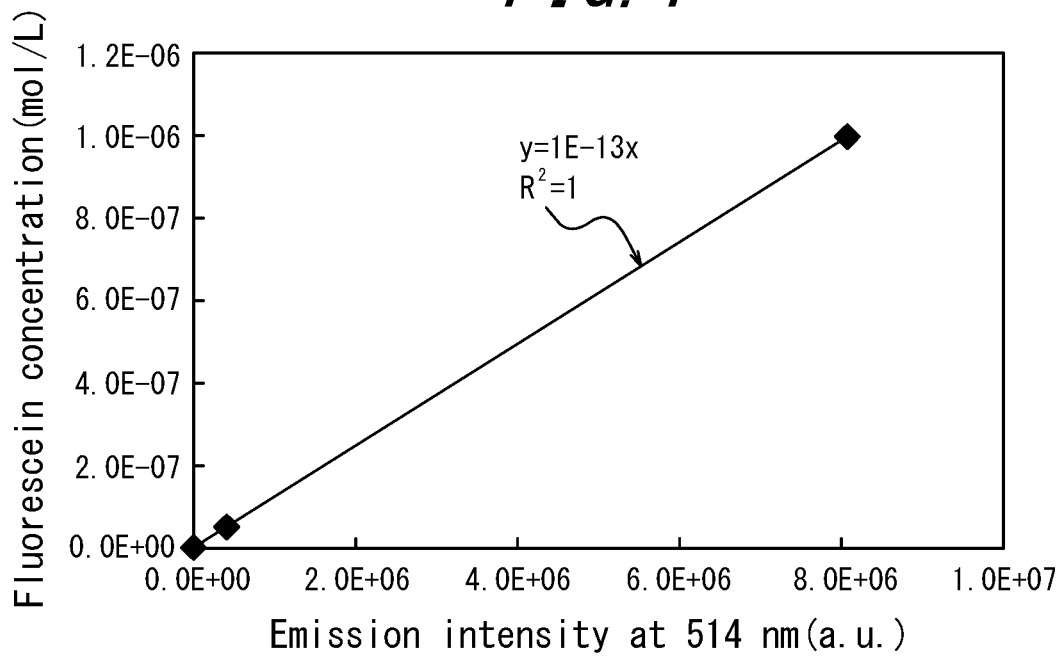
FIG. 1 is a diagram illustrating a concentration-intensity linear approximation line and a concentration-intensity conversion formula of a fluorescein/ethanol solution in examples.

The following provides a detailed description of an embodiment of the present disclosure (hereinafter, referred to as "present embodiment").

[Methacrylic Resin]

The methacrylic resin in the present embodiment has a structural unit (X) having a cyclic structure and a methacrylic acid ester monomer-derived structural unit in the main chain thereof. The main chain of the methacrylic resin of the present embodiment may consist only of the structural unit (X) having a cyclic structure and the methacrylic acid ester monomer-derived structural unit.

Each of the structural units will be described below.

—Methacrylic Acid Ester Monomer-Derived Structural Unit—

Examples of the methacrylic acid ester monomer-derived structural unit include, for example, structural units derived from a monomer selected from the following methacrylic acid esters. Examples of methacrylic acid esters that can be used include methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, cyclopentyl methacrylate, cyclohexyl methacrylate, cyclooctyl methacrylate, tricyclodecyl methacrylate, dicyclooctyl methacrylate, tricyclododecyl methacrylate, isobornyl methacrylate, phenyl methacrylate, benzyl methacrylate, 1-phenylethyl methacrylate, 2-phenoxyethyl methacrylate, 3-phenylpropyl methacrylate, and 2,4,6-tribromophenyl methacrylate.

One of these monomers may be used alone, or two or more of these monomers may be used in combination.

Among these methacrylic acid ester monomer-derived structural units, structural units derived from methyl methacrylate and benzyl methacrylate are preferable in terms of providing the resultant methacrylic resin with excellent transparency and weather resistance.

The methacrylic resin may include only one type of methacrylic acid ester monomer-derived structural unit or may include two or more types of methacrylic acid ester monomer-derived structural units.

The content of the methacrylic acid ester monomer-derived structural unit is preferably 50 mass % to 97 mass %, more preferably 55 mass % to 97 mass %, even more preferably 55 mass % to 95 mass %, still more preferably 60 mass % to 93 mass %, and particularly preferably 60 mass % to 90 mass %, relative to 100 mass % of the methacrylic resin, from a viewpoint of imparting sufficient heat resistance to the methacrylic resin through a structural unit (X) having a cyclic structure in the main chain thereof, which will be described later.

Note that the content of the methacrylic acid ester monomer-derived structural unit can be determined by $^1$H-NMR and $^{13}$C-NMR measurements. For example, $^1$H-NMR and $^{13}$C-NMR measurements can be made using $CDCl_3$ or DMSO-$d_6$ as a measurement solvent at a measurement temperature of 40° C.

The following provides a description of the structural unit (X) having a cyclic structure in the main chain thereof.

The structural unit (X) having a cyclic structure in the main chain thereof includes preferably at least one structural unit selected from the group consisting of an N-substituted maleimide monomer-derived structural unit, a glutarimide-based structural unit, and a lactone ring structural unit, and more preferably consists only of a structural unit selected from the group consisting of an N-substituted maleimide monomer-derived structural unit, a glutarimide-based structural unit, and a lactone ring structural unit. One type of the structural unit (X) having a cyclic structure in the main chain thereof may be used alone or a combination of two or more types may be used.

—N-Substituted Maleimide Monomer-Derived Structural Unit—

Next, an N-substituted maleimide monomer-derived structural unit is described.

The N-substituted maleimide monomer-derived structural unit may be at least one structural unit selected from the group consisting of a structural unit represented by the following formula (1) and a structural unit represented by the following formula (2), and is preferably formed from both a structural unit represented by the following formula (1) and a structural unit represented by the following formula (2).

[Chemical Formula 1]

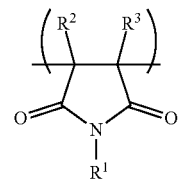

(1)

In formula (1), $R^1$ represents an arylalkyl group having a carbon number of 7 to 14 or an aryl group having a carbon number of 6 to 14, and $R^2$ and R3 each represent, independently of one another, a hydrogen atom, an oxygen atom, a sulfur atom, an alkyl group having a carbon number of 1 to 12, or an aryl group having a carbon number of 6 to 14.

Note that in a case in which $R^2$ or $R^3$ is an aryl group, $R^2$ or $R^3$ may include a halogen atom as a substituent.

Moreover, $R^1$ may be substituted with a substituent such as a halogen atom, an alkyl group having carbon number of 1 to 6, an alkoxy group having a carbon number of 1 to 6, a nitro group, or a benzyl group.

[Chemical Formula 2]

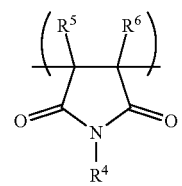

(2)

In formula (2), $R^4$ represents a hydrogen atom, a cycloalkyl group having a carbon number of 3 to 12, or an alkyl group having a carbon number of 1 to 12, and $R^5$ and $R^6$ each represent, independently of one another, a hydrogen atom, an oxygen atom, a sulfur atom, an alkyl group having a carbon number of 1 to 12, or an aryl group having a carbon number of 6 to 14.

Specific examples are listed below.

Examples of monomers (N-arylmaleimides and N-aromatic substituted maleimides) forming the structural unit represented by formula (1) include N-phenylmaleimide, N-benzylmaleimide, N-(2-chlorophenyl)maleimide, N-(4-chlorophenyl)maleimide, N-(4-bromophenyl)Maleimide, N-(2-methylphenyl)maleimide, N-(2,6-dimethylphenyl)maleimide, N-(2-ethylphenyl)maleimide, N-(2-methoxyphenyl)maleimide, N-(2-nitrophenyl)maleimide, N-(2,4,6-trimethylphenyl)maleimide, N-(4-benzylphenyl)maleimide, N-(2,4,6-tribromophenyl)maleimide, N-naphthylmaleimide, N-anthracenylmaleimide, 3-methyl-1-phenyl-1H-pyrrole-2,5-dione, 3,4-dimethyl-1-phenyl-1H-pyrrole-2,5-dione, 1,3-diphenyl-1H-pyrrole-2,5-dione, and 1,3,4-triphenyl-1H-pyrrole-2,5-dione.

Among these monomers, N-phenylmaleimide and N-benzylmaleimide are preferable in terms of providing the resultant methacrylic resin with excellent heat resistance and optical properties such as birefringence.

One ester monomer may be used alone, or two or more ester monomers may be used in combination.

Examples of monomers represented by formula (2) include N-methylmaleimide, N-ethylmaleimide, N-n-propylmaleimide, N-isopropylmaleimide, N-s-butylmaleimide, N-isobutylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-cyclopentylmaleimide, N-cyclohexylmaleimide, 1-cyclohexyl-3-methyl-1H-pyrrole-2,5-dione, 1-cyclohexyl-3,4-dimethyl-1H-pyrrole-2,5-dione, 1-cyclohexyl-3-phenyl-1H-pyrrole-2,5-dione, and 1-cyclohexyl-3,4-diphenyl-1H-pyrrole-2,5-dione.

Among these monomers, N-methylmaleimide, N-ethylmaleimide, N-isopropylmaleimide, and N-cyclohexylmaleimide are preferable in terms of providing the resultant methacrylic resin with excellent weather resistance, and N-cyclohexylmaleimide is particularly preferable in terms of providing excellent low water absorbency demanded of optical materials in recent years.

One of these monomers may be used alone, or two or more of these monomers may be used in combination.

The methacrylic resin of the present embodiment is particularly preferably obtained using a structural unit represented by formula (1) and a structural unit represented by formula (2), in combination, in order to exhibit a high level of control on birefringence properties.

The molar ratio (X1/X2) of the content (X1) of the structural unit represented by formula (1) relative to the content (X2) of the structural unit represented by formula (2) is preferably greater than 0 and no greater than 15, and more preferably greater than 0 and no greater than 10.

When the molar ratio (X1/X2) is within any of the ranges set forth above, the methacrylic resin of the present embodiment can exhibit good heat resistance and good photoelastic properties while maintaining transparency, and without yellowing or loss of environmental resistance.

The content of the N-substituted maleimide monomer-derived structural unit is preferably in the range of 5 mass % to 40 mass % and more preferably in the range of 5 mass % to 35 mass %, relative to 100 mass % of the methacrylic resin.

When the content of the N-substituted maleimide monomer-derived structural unit is within any of the ranges set forth above, a more adequate enhancement effect can be achieved with respect to heat resistance of the methacrylic resin, and a more preferable enhancement effect can also be achieved with respect to weather resistance, low water absorbency, and optical properties of the methacrylic resin. Restricting the content of the N-substituted maleimide monomer-derived structural unit to 40 mass % or less is effective for preventing a decrease in physical properties of the methacrylic resin caused by a large amount of monomer remaining unreacted due to reduced reactivity of monomer components in the polymerization reaction.

The methacrylic resin in the present embodiment that includes the N-substituted maleimide monomer-derived structural unit may further include structural units derived from other monomers that are copolymerizable with the methacrylic acid ester monomer and the N-substituted maleimide monomer to the extent that the objectives of the present disclosure are not impeded.

Examples of other copolymerizable monomers that can be used include aromatic vinyls; unsaturated nitriles; acrylic acid esters including a cyclohexyl group, a benzyl group, or an alkyl group having a carbon number of 1 to 18; glycidyl compounds; and unsaturated carboxylic acids.

Examples of the aromatic vinyls include styrene, α-methylstyrene, and divinylbenzene.

Examples of the unsaturated nitriles include acrylonitrile, methacrylonitrile, and ethacrylonitrile.

Examples of the acrylic acid esters include methyl acrylate, ethyl acrylate, propyl acrylate, isopropyl acrylate, and butyl acrylate.

An example of the glycidyl compounds includes glycidyl (meth)acrylate.

Examples of the unsaturated carboxylic acids include acrylic acid, methacrylic acid, itaconic acid, maleic acid, and fumaric acid, and half-esterified products and anhydrides thereof.

The methacrylic resin may include only one type of structural unit derived from another copolymerizable monomer, or may include two or more types of structural units derived from other copolymerizable monomers.

The content of structural units derived from such other copolymerizable monomers relative to 100 mass % of the methacrylic resin is preferably 0 mass % to 10 mass %, more preferably 0 mass % to 9 mass %, and even more preferably 0 mass % to 8 mass %.

It is preferable for the content of structural units derived from other monomers to be within any of the ranges set forth above in terms that molding properties and mechanical properties of the resin can be enhanced without losing the intended effects of introducing a cyclic structure into the main chain.

Note that the content of the N-substituted maleimide monomer-derived structural unit and the content of the structural unit derived from other copolymerizable monomers can be determined by $^1$H-NMR and $^{13}$C-NMR measurements. For example, $^1$H-NMR and $^{13}$C-NMR measurements can be made using $CDCl_3$ or DMSO-$d_6$ as a measurement solvent at a measurement temperature of 40° C.

—Glutarimide-Based Structural Unit—

An examples of the methacrylic resin including the glutarimide-based structural unit in the main chain thereof includes, for example, a methacrylic resin including a glutarimide-based structural unit described in JP 2006-249202 A, JP 2007-009182 A, JP 2007-009191 A, JP 2011-186482 A, or WO 2012/114718 A1, and may be formed by a method described in the same publication.

A glutarimide-based structural unit included in the methacrylic resin of the present embodiment may be formed after resin polymerization.

Specifically, the glutarimide-based structural unit may be represented by the following general formula (3).

[Chemical Formula 3]

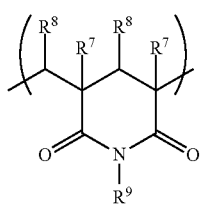

(3)

In general formula (3), it is preferable that $R^7$ and $R^8$ are each, independently of one another, a hydrogen atom or a methyl group, and $R^9$ is a hydrogen atom, a methyl group, a butyl group, or a cyclohexyl group, and more preferable that $R^7$ is a methyl group, $R^8$ is hydrogen, and $R^9$ is a methyl group.

The methacrylic resin may include a single type of glutarimide-based structural unit or may include two or more types of glutarimide-based structural units.

The content of the glutarimide-based structural unit in the methacrylic resin having a glutarimide-based structural unit is preferably in the range of 5 mass % to 70 mass %, and more preferably in the range of 5 mass % to 60 mass %, relative to 100 mass % of the methacrylic resin.

It is preferable for the content of the glutarimide-based structural unit to be within any of the ranges set forth above in terms that a resin having good molding properties, heat resistance, and optical properties can be obtained.

The content of the glutarimide-based structural unit in the methacrylic resin can be determined by a method described in the previously mentioned patent literature.

The methacrylic resin including the glutarimide-based structural unit may further include an aromatic vinyl monomer unit as necessary.

Examples of aromatic vinyl monomers that can be used include, but are not specifically limited to, styrene and α-methylstyrene. The aromatic vinyl monomer is preferably styrene.

The content of the aromatic vinyl unit in the methacrylic resin including the glutarimide-based structural unit is not specifically limited. Nevertheless, the content of the aromatic vinyl unit relative to 100 mass % of the methacrylic resin is preferably 0 mass % to 20 mass %.

It is preferable for the content of the aromatic vinyl unit to be in the range set forth above in terms that both heat resistance and excellent photoelastic properties can be obtained.

—Lactone Ring Structural Unit—

The methacrylic resin including the lactone ring structural unit in the main chain thereof can be formed, for example, by a method described in JP 2001-151814 A, JP 2004-168882 A, JP 2005-146084 A, JP 2006-96960 A, JP 2006-171464 A, JP 2007-63541 A, JP 2007-297620 A, or JP 2010-180305 A.

A lactone ring structural unit included in the methacrylic resin of the present embodiment may be formed after resin polymerization.

A lactone ring structural unit in the present embodiment is preferably a six-membered ring since this provides the cyclic structure with excellent stability.

The lactone ring structural unit that is a six-membered ring is, for example, particularly preferably a structure represented by the following general formula (4).

[Chemical Formula 4]

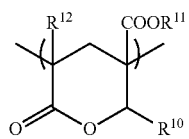

(4)

In general formula (4), $R^{10}$, $R^{11}$, and $R^{12}$ are each, independently of one another, a hydrogen atom or an organic residue having a carbon number of 1 to 20.

Examples of the organic residue include saturated aliphatic hydrocarbon groups (alkyl groups, etc.) having a carbon number of 1 to 20 such as a methyl group, an ethyl group, and a propyl group; unsaturated aliphatic hydrocarbon groups (alkenyl groups, etc.) having a carbon number of 2 to 20 such as an ethenyl group and a propenyl group; aromatic hydrocarbon groups (aryl groups, etc.) having a carbon number of 6 to 20 such as a phenyl group and a naphthyl group; and groups in which at least one hydrogen atom of any of these saturated aliphatic hydrocarbon groups, unsaturated aliphatic hydrocarbon groups, and aromatic hydrocarbon groups is substituted with at least one group selected from the group consisting of a hydroxy group, a carboxyl group, an ether group, and an ester group.

The lactone ring structural unit may be formed, for example, by copolymerizing an acrylic acid-based monomer having a hydroxy group and a methacrylic acid ester monomer such as methyl methacrylate to introduce a hydroxy group and an ester group or carboxyl group into the molecular chain, and then causing dealcoholization (esterification) or dehydration condensation (hereinafter, also referred to as a "cyclocondensation reaction") between the hydroxy group and the ester group or carboxyl group.

Examples of acrylic acid-based monomers having a hydroxy group that can be used in polymerization include 2-(hydroxymethyl)acrylic acid, 2-(hydroxyethyl)acrylic acid, alkyl 2-(hydroxymethyl)acrylates (for example, methyl 2-(hydroxymethyl)acrylate, ethyl 2-(hydroxymethyl)acrylate, isopropyl 2-(hydroxymethyl)acrylate, n-butyl 2-(hydroxymethyl)acrylate, and t-butyl 2-(hydroxymethyl)acrylate), and alkyl 2-(hydroxyethyl)acrylates. Moreover, 2-(hydroxymethyl)acrylic acid and alkyl 2-(hydroxymethyl) acrylates that are monomers having a hydroxyarkyl moiety are preferable, and methyl 2-(hydroxymethyl)acrylate and ethyl 2-(hydroxymethyl)acrylate are particularly preferable.

The content of the lactone ring structural unit in the methacrylic resin including the lactone ring structural unit in the main chain thereof is preferably 5 mass % to 40 mass %, and more preferably 5 mass % to 35 mass %, relative to 100 mass % of the methacrylic resin.

When the content of the lactone ring structural unit is within any of the ranges set forth above, effects resulting from introduction of a cyclic structure, such as improved solvent resistance and improved surface hardness, can be exhibited while maintaining molding properties.

The content of the lactone ring structure in the methacrylic resin can be determined by a method described in the previously mentioned patent literature.

The methacrylic resin including the lactone ring structural unit may include structural units derived from other monomers that are copolymerizable with the above-described methacrylic acid ester monomer and acrylic acid-based monomer having a hydroxy group.

Examples of such other copolymerizable monomers include monomers having a polymerizable double bond such as styrene, vinyltoluene, α-methylstyrene, α-hydroxymethylstyrene, α-hydroxyethylstyrene, acrylonitrile, methacrylonitrile, methallyl alcohol, ethylene, propylene, 4-methyl-1-pentene, vinyl acetate, 2-hydroxymethyl-1-butene, methyl vinyl ketone, N-vinylpyrrolidone, and N-vinylcarbazole.

One of these other monomers (constitutional units) may be included, or two or more of these other monomers may be included.

The content of structural units derived from such other copolymerizable monomers relative to 100 mass % of the methacrylic resin is preferably 0 mass % to 20 mass %, more preferably less than 10 mass % from the viewpoint of the weather resistance, and even more preferably less than 7 mass %.

The methacrylic resin in the present embodiment may include one type of structural unit or two or more types of structural units derived from the other copolymerizable monomers described above.

A methacrylic resin in the present embodiment preferably includes at least one structural unit selected from the group consisting of an N-substituted maleimide monomer-derived structural unit, a glutarimide-based structural unit, and a lactone ring structural unit. Of such cyclic structural units, it is particularly preferable that the methacrylic resin includes an N-substituted maleimide monomer-derived structural unit in terms that a high degree of control of optical properties such as the photoelastic coefficient can be easily achieved without blending with another thermoplastic resin. In addition, in applications where a high strength is required, inclusion of a glutarimide-based structural unit is particularly preferable.

—Properties of Methacrylic Resin—
—Glass Transition Temperature—

The glass transition temperature (Tg) of the methacrylic resin in the present embodiment is preferably higher than 120° C. and 160° C. or lower.

When the glass transition temperature (Tg) of the methacrylic resin is higher than 120° C., the heat resistance required in recent years for optical components such as lens shaped articles, automotive parts such as in-vehicle displays, and film shaped articles and optical films for liquid-crystal displays can be more easily obtained. The glass transition temperature (Tg) is more preferably 125° C. or higher and even more preferably 130° C. or higher from a viewpoint of the dimensional stability at temperatures in the environment of use.

On the other hand, when the glass transition temperature (Tg) of the methacrylic resin is 160° C. or lower, melt processing at an extremely high temperatures can be avoided to thereby reduce thermal decomposition of the resin or the like, enabling provision of favorable products. The glass transition temperature (Tg) is preferably 150° C. or lower, and more preferably 140° C. or lower from the viewpoint of achieving the effects described above more reliably.

Note that the glass transition temperature (Tg) can be determined by making measurements in accordance with JIS-K7121. Specifically, it can be determined by the method described in Examples described later.

—Molecular Weights and Molecular Weight Distributions—

The methacrylic resin in the present embodiment has a weight average molecular weight (Mw) as measured by gel permeation chromatography (GPC) as a polymethyl methacrylate-converted value preferably in the range of 100,000 to 170,000, more preferably in the range of 100,000 to 150,000, and even preferably in the range of 120,000 to 150,000. When the weight average molecular weight (Mw) is within any of the above ranges, an excellent balance of the mechanical strength and the fluidity can be achieved.

Note that the weight average molecular weight (Mw), the number average molecular weight (Mn), and the Z-average molecular weight (Mz) of the methacrylic resin can be measured using an apparatus under the conditions as follows.

Measurement apparatus: Gel permeation chromatograph (HLC-8320GPC) manufactured by Tosoh Corporation
Measurement conditions
    Columns: one TSK guard column Super H-H, two TSK gel Super HM-M, and one TSK gel Super H2500 connected in series in this order.
    Column temperature: 40° C.
    Developing solvent: tetrahydrofuran; flow rate: 0.6 mL/min; 0.1 g/L of 2,6-di-t-butyl-4-methylphenol (BHT) is added as internal standard
    Detector: Refractive index (RI) detector
    Detection sensitivity: 3.0 mV/min
    Sample: Solution of 0.02 g of methacrylic resin in 20 mL of tetrahydrofuran
    Injection volume: 10 μL
    Standard samples for calibration curve: Following 10 types of polymethyl methacrylate (PMMA Calibration Kit M-M-10 manufactured by Polymer Laboratories Ltd.) of differing molecular weight each having a known monodisperse weight peak molecular weight
    Weight peak molecular weight (Mp)
        Standard sample 1: 1,916,000
        Standard sample 2: 625,500
        Standard sample 3: 298,900
        Standard sample 4: 138,600
        Standard sample 5: 60,150
        Standard sample 6: 27,600
        Standard sample 7: 10,290
        Standard sample 8: 5,000
        Standard sample 9: 2,810
        Standard sample 10: 850

The RI detection intensity relative to the elution time of the methacrylic resin is measured under the conditions listed above.

The weight average molecular weight (Mw), the number average molecular weight (Mn), and the Z-average molecular weight (Mz) of the methacrylic resin are determined based on calibration curves obtained through measurement of the calibration curve standard samples, and then molecular weight distributions (Mw/Mn and Mz/Mw) are calculated using the determined values.

—Methanol-Insoluble Content—

The proportion of the amount of the methanol-insoluble content of the methacrylic resin in the present embodiment to the total amount (100 mass %) of the methanol-insoluble content and the methanol-soluble content is preferably 95 mass % or more, more preferably 95.5 mass % or more, even more preferably 96 mass % or more, still even more preferably 96.5 mass % or more, particularly preferably 97 mass % or more, and most preferably 97.5 mass % or more. The proportion of the amount of the methanol-insoluble content set to 95 mass % or more can suppress inconveniences during molding, such as stains on cast rolls during film molding or occurrence of silver streaks during injection molding.

The methanol-insoluble content and methanol-soluble content refer to components obtained by dissolving the methacrylic resin in chloroform, dripping the resultant solution into an excess of methanol to cause re-precipitation, separating a filtrate and a filtration residue, and then drying the obtained filtrate and filtration residue.

Specifically, the methanol-insoluble content and the methanol-soluble content can be obtained as follows. In 100 mL of chloroform, 5 g of the methacrylic resin is dissolved. The resultant solution is added into a dropping funnel and is then dripped into 1 L of methanol stirred by a stirrer over approximately 1 hour to cause re-precipitation. After the entire solution has been dripped into the methanol and then been left stand for 1 hour, vacuum filtration is performed using a membrane filter (T050A090C manufactured by Advantec Mfs. Inc.) as a filter. The filtration residue is vacuum dried for 16 hours at 60° C. and the dried product is taken to be methanol-insoluble content. Additionally, solvent is removed from the filtrate using a rotary evaporator with a bath temperature of 40° C. and a degree of vacuum that is gradually reduced from an initial setting of 390 Torr to a final level of 30 Torr. Soluble content remaining in the rotary evaporator flask is collected and taken to be methanol-soluble content. The mass of the methanol-insoluble content and the mass of the methanol-soluble content are weighed and then the amount of the methanol-soluble content is calculated as a proportion (mass %; proportion of methanol-soluble content) relative to the total amount (100 mass %) of the methanol-insoluble content and the methanol-soluble content.

—Photoelastic Coefficient $C_R$—

The absolute value of the photoelastic coefficient $C_R$ of the methacrylic resin of the present embodiment including the cyclic structure in the main chain thereof is preferably $3.0 \times 10^{-12}$ Pa$^{-1}$ or less, more preferably $2.0 \times 10^{-12}$ Pa$^{-1}$ or less, even more preferably $1.5 \times 10^{-12}$ Pa$^{-1}$ or less, and still even more preferably $1.0 \times 10^{-12}$ Pa$^{-1}$ or less. The photoelastic coefficient is described in various documents (see, for example, Review of Chemistry, No. 39, 1998 (published by Publishing Center of the Chemical Society of Japan)), and can be defined by the following formulae (i-a) and (i-b). The closer the value of the photoelastic coefficient $C_R$ to zero, the smaller the change in birefringence caused by external force becomes.

$$C_R = |\Delta n|/\sigma_R \quad \text{(i-a)}$$

$$|\Delta n| = |nx - ny| \quad \text{(i-b)}$$

(In the formula, $C_R$ is the photoelastic coefficient; $\sigma_R$ is the tensile stress; $|\Delta n|$ is the absolute value of the birefringence; nx is the refractive index in the tensile direction; and ny is the refractive index in a direction in the plane orthogonal to the tensile direction.)

When the absolute value of the photoelastic coefficient $C_R$ of the methacrylic resin of the present embodiment is $3.0 \times 10^{-12}$ Pa$^1$ or less, the birefringence caused by the residual stress generated during injection molding and a stress generated when an injection molded shaped article is attached as a part to a product can be sufficiently reduced. Clear images and video can thus be obtained when the resin is used for optical components or automotive parts. Note that the photoelastic coefficient $C_R$ is measured by processing the methacrylic resin into a pressed film using a vacuum compression molding machine. Specifically, it can be determined by the method described in EXAMPLES described later.

—Fluorescence Emission Intensity—

An evaluation of the emission intensity (fluorescence emission intensity) of the methacrylic resin in the present embodiment can be performed by the following two techniques (i) and (ii).

(i) Fluorescein/ethanol solutions are prepared by varying the concentrations. A concentration-intensity conversion formula is produced from the concentrations of the fluorescein/ethanol solutions and fluorescence emission intensities at a wavelength of 514 nm obtained by spectroscopically analyzing these solutions using an excitation wavelength of 436 nm and a slit width of 2 nm. A fluorescence emission intensity is then measured by spectroscopically analyzing a solution of the methacrylic resin in chloroform, and is converted into an equivalent concentration of a fluorescein/ethanol solution using this formula. Specifically, in the present embodiment, the fluorescein concentration converted from a fluorescence emission intensity at a wavelength of 514 nm obtained by spectrometrically analyzing a 2.0-mass % methacrylic resin solution in chloroform with an excitation wavelength of 436 nm and a slit width of 2 nm is preferably $30 \times 10^{-10}$ mol/L or less, more preferably $1 \times 10^{-10}$ mol/L or more and $20 \times 10^{-10}$ mol/L or less, even more preferably $1 \times 10^{-10}$ mol/L or more and $18 \times 10^{-10}$ mol/L or less, and particularly preferably $1 \times 10^{-10}$ mol/L or more and $10 \times 10^{-10}$ mol/L or less. A concentration of $30 \times 10^{-10}$ mol/L or less can enable production of a formed article, even a thick formed article, with less coloration. Further, a concentration of equal to or more than any of the lower limits is preferable because blue light can be reduced. Note that the fluorescein solutions in ethanol used for obtaining the concentration-intensity conversion formula had fluorescein concentrations between 0 mol/L and $1.0 \times 10^{-6}$ mol/L.

(ii) Solutions are prepared by dissolving quinine sulfate dihydrate into a 1-mol/L dilute sulfuric acid in varying concentrations. A concentration-intensity conversion formula is produced from the concentrations of the quinine sulfate solutions and fluorescence emission intensities at a wavelength of 458 nm obtained by spectroscopically analyzing the solutions using an excitation wavelength of 365 nm and a slit width of 2 nm. A solution of the methacrylic resin in chloroform is then spectroscopically analyzed at a wavelength of 458 nm, and is converted into an equivalent concentration of a solution containing quinine sulfate dihydrate dissolved in the 1-mol/L dilute sulfuric acid using the concentration-intensity conversion formula. Specifically, in the present embodiment, the concentration a solution of quinine sulfate dihydrate prepared by dissolving quinine sulfate dihydrate into a 1-mol/L dilute sulfuric acid converted from a fluorescence emission intensity at a wavelength of 458 nm obtained by spectrometrically analyzing a 2.0-mass % solution of methacrylic resin in chloroform with an excitation wavelength of 365 nm and a slit width of 2 nm is preferably $4 \times 10^{-9}$ mol/L or more and $6 \times 10^{-9}$ mol/L or less. A concentration of $4 \times 10^{-9}$ mol/L or more is preferable because the YI of the methacrylic resin is reduced by the effect of blue emissions at a wavelength of 458 nm. A concentration of more than $6 \times 10^{-9}$ mol/L is not desirable because the intensity of the absorption band near 365 nm is high, resulting in an increase in the YI.

Note that measurements were performed by a fluorescence spectrophotometer (Fluorolog3-22 manufactured by Horiba Jobin Yvon GmbH) using a xenon lamp as a light source and a photomultiplier tube (PMT). Using a time constant of 0.2 s and the Sc/Rc measurement mode to normalize emission intensities with the excitation light intensity at each wavelength, the measurement was carried out as a 90° observation of a quartz cell with a light path length of 1 cm. The quinine sulfate/dilute sulfuric acid solutions used for obtaining the concentration-intensity conversion formula had quinine sulfate concentrations between 0 mol/L and $1.0 \times 10^{-6}$ mol/L.

The emission intensity can be adjusted to any of the above ranges by reducing the shear rate in a devolatilization step during production of the methacrylic resin, or reducing the content ratio of impurities (such as 2-amino-N-substituted succinimide) in the N-substituted maleimide monomer as one of polymerization raw materials, for example.

[Method of Producing Methacrylic Resin]

The following describes a method of producing the methacrylic resin of the present embodiment.

—Method of Producing Methacrylic Resin Including N-Substituted Maleimide Monomer-Derived Structural Unit—

The method used to produce the methacrylic resin including the N-substituted maleimide monomer-derived structural unit in the main chain thereof (hereinafter, it sometimes referred to as "maleimide copolymer") may be any polymerization method from among bulk polymerization, solution polymerization, suspension polymerization, precipitation polymerization, and emulsion polymerization, is preferably suspension polymerization, bulk polymerization, or solution polymerization, and is more preferably solution polymerization.

In the production method in the present embodiment, the polymerization process may, for example, be a batch polymerization process, a semi-batch polymerization process, or a continuous polymerization process.

A so-called "semi-batch polymerization method" in which a portion of the monomers is charged into a reactor prior to the start of polymerization, a polymerization initiator is added to initiate polymerization, and then a remaining portion of the monomers is subsequently fed into the reactor can be preferably adopted in the present embodiment.

In order for a methacrylic resin including the N-substituted maleimide monomer-derived structural unit to exhibit a predetermined fluorescence emission intensity, it is preferable to perform at least one method selected from: (1) using, as a raw material, an N-substituted maleimide monomer having a controlled content of a certain impurity; (2) applying a polymerization method for reducing the amount of unreacted N-substituted maleimide remaining after the end of the polymerization; and (3) applying a devolatilization method with a reduced shear rate. Particularly, it is preferable to select a production method in which the above (1) and (3) are combined, or to select a production method in which these three are combined.

—Control on Impurities in N-Substituted Maleimide—

One example of the impurities in N-substituted maleimide which imparts a fluorescent-emitting property to the methacrylic resin is 2-amino-N-substituted succinimide which is produced in a reaction of N-substituted maleimide and a primary amine. In addition to 2-amino-N-substituted succinimide having a fluorescent-emitting property, our study revealed that heating 2-amino-N-substituted succinimide to 300° C. or higher or processing it in an apparatus imparting shear forces gave a thermally denatured product having a fluorescent-emitting property although the detailed mechanism of the denaturing is unknown. In other words, reduction of 2-amino-N-substituted succinimide contained in the N-substituted maleimide and carrying out devolatilization at 300° C. or lower with a devolatilization apparatus without any rotating part in production of the methacrylic resin are preferred for controlling the fluorescence emission intensity of the methacrylic resin.

Examples of the method of controlling impurities in the N-substituted maleimide include providing a pretreatment step of water washing (water washing step of) and/or dehydrating (dehydration step of) the N-substituted maleimide. The pretreatment step may involve only water washing, or may involve a combination of water washing and dehydration. In addition, water washing and dehydration may be performed once or may be performed multiple times. The pretreatment step may further involve a concentration adjusting step of adjusting the concentration of the solution of N-substituted maleimide obtained in the dehydration step.

For example, in the present embodiment, by removing 2-amino-N-substituted succinimide in N-substituted maleimide by the water washing step to be described below and removing water in the subsequent dehydration step, a solution of the N-substituted maleimide can be produced which is suited to control the fluorescence emission intensity and to prepare a methacrylic resin having a good color tone.

In the water washing step, for example, a method may used which includes dissolution of N-substituted maleimide in a nonaqueous organic solvent; separation of the organic layer from the water layer; washing of the organic layer with one or more liquids selected from an acidic aqueous solution, water, and an alkaline aqueous solution by a batch method, a continuous method, or both batch and continuous methods; and separation of the organic layer from the water layer. The amount of 2-amino-N-substituted succinimide in the organic layer after the water washing step is preferably 5 ppm by mass or less, more preferably 0.1 ppm by mass or more and 1 ppm by mass or less, when the amount of N-substituted maleimide in the organic layer is taken to be 100 mass %. An amount of 2-amino-N-substituted succinimide in the organic layer within any of these ranges is preferable because the fluorescence emission intensity of the methacrylic resin can be controlled to fall within a predetermined range and the methacrylic resin and a composition of the resin which enable production of a shaped article, even a shaped article having a long path length, with a good color tone. This is also preferable in view of the cleaning cost. When no dehydration step is performed, the organic layer containing N-substituted maleimide obtained in the water washing step may be used as the solution of the N-substituted maleimide in a polymerization step.

Any water-insoluble organic solvents can be used without particular limitation as long as the solvent dissolves N-substituted maleimide and 2-amino-N-substituted succinimide and phase-separates with water and a water mixture thereof has an azeotropic point. Specific examples of the solvent that can be used include, for example, aromatic hydrocarbons such as toluene and xylene; aliphatic hydrocarbons such as normal hexane and cyclohexane; and halogenated hydrocarbons such as chloroform and dichloroethane.

The concentration of N-substituted maleimide in an organic layer is preferably 0.5 mass % or more and 30 mass % or less, more preferably 10 mass % or more and 25 mass % or less, and even more preferably 20 mass % or more and 25 mass % or less.

The water that is used may be any of sewage water, pure water, and tap water.

Further, the acidity of the acidic aqueous solution or the alkaline aqueous solution is not limited.

Although the temperature at which the organic layer and the water layer are mixed and washed may be any temperature of 40° C. or higher, and the temperature is preferably 40° C. or higher and 80° C. or lower, and more preferably 50° C. or higher and 60° C. or lower.

The weight ratio of the water layer to the organic layer is preferably 5 mass % or more and 300 mass % or less, more preferably 10 mass % or more and 200 mass %, and even more preferably 30 mass % or more and 100 mass % or less, when the weight of the organic layer is taken to be 100 mass %.

A concentration of the organic layer, a liquid temperature, and a weight ratio of the water layer within these ranges are preferable because a reaction of N-substituted maleimide with water is less likely to proceed and extraction of 2-amino-N-substituted succinimide in the water layer is facilitated.

When washing is carried out in a batch, the reaction tank which is used may be made of stainless steel or glass lining or any other reaction tank may also be used. The configuration of stirring blades is not particularly limited. For example, specific examples of stirring blades that can be used include three-bladed sweptback impeller, four paddle blades, four-bladed pitched paddle, six turbine blades, and anchor blades. Further, TWINSTIR or FULLZONE manufactured by KOBELCO ECO-SOLUTIONS Co., Ltd. can also be used. The stirring time is preferably 10 minutes or longer and 120 minutes or shorter, and more preferably 30 minutes or longer and 60 minutes or shorter. Stirring time within any of these ranges is preferable because the efficiencies of stirring and extraction of 2-amino-N-substituted succinimide in the water layer are improved which results in further reduction of 2-amino-N-substituted succinimide in the N-substituted maleimide.

When washing is carried out continuously, a void tower, a packed tower, or a plate tower can be used or a motionless mixer such as a static mixer or an agitating mixer such as a dynamic mixer can also be used. The time of contact between the organic layer and the water layer is preferably set to 1 second or longer and 60 minutes or shorter, and more preferably 30 seconds or longer and 10 minutes or shorter. Contact time within any of these ranges is preferable because a reaction of N-substituted maleimide with water is less likely to proceed and extraction of 2-amino-N-substituted succinimide in the water layer is facilitated.

In the dehydration step, the organic layer is charged into the reaction tank and is heated under reduced pressure to remove water. The conditions of the pressure and the temperature are not particularly limited as long as the solvent used and water can form an azeotropic composition.

The water content in the organic layer after the dehydration step is preferably 100 ppm by mass or less when the weight of the organic layer is taken to be 100 mass %. A water content after the dehydration step within this range is preferable because degradation of the color tone caused by water can be suppressed during polymerization of the methacrylic resin and the amount of the solvent distilled off together with water can be reduced, which is cost efficient. The organic layer containing N-substituted maleimide obtained in the dehydration step may be used as the solution of N-substituted maleimide in the polymerization step, or the concentration of the solution of N-substituted maleimide may be subsequently adjusted in a concentration adjusting step and the concentration adjusted solution may be used in the polymerization step.

In the concentration adjusting step, for example, the organic layer of N-substituted maleimide obtained in the dehydration step or the like may be diluted by the water-insoluble organic solvent as described above. The same water-insoluble organic solvent used in the water washing step is preferably used in the concentration adjusting step.

The solution of N-substituted maleimide obtained through the pretreatment step is preferably a solution including the nonaqueous organic solvent (organic layer).

The mass ratio of 2-amino-N-substituted succinimide contained in the solution of N-substituted maleimide obtained through the pretreatment step is preferably 5 ppm by mass or less, and more preferably 0.1 ppm by mass or more and 1 ppm by mass or less, relative to 100 mass % of N-substituted maleimide contained in the solution of N-substituted maleimide.

The water content in the solution of N-substituted maleimide obtained through the pretreatment step is preferably 200 ppm by mass or less, and more preferably 100 ppm by mass to 200 ppm by mass, relative to 100 mass % of the solution of N-substituted maleimide.

The mass ratio of N-substituted maleimide contained in the solution of N-substituted maleimide obtained through the pretreatment step is preferably 5 mass % to 30 mass %, and more preferably 5 mass % to 25 mass %, relative to 100 mass % of the solution of N-substituted maleimide. A mass ratio of N-substituted maleimide within any of the above ranges is preferable because N-substituted maleimide becomes less likely to precipitate, which permits the solution to be transferred as a homogeneous solution.

When a plurality of N-substituted maleimide solutions are used in the polymerization step, a mixture of the plurality of N-substituted maleimide solutions preferably satisfies the mass ratio of 2-amino-N-substituted succinimide, the water content, and/or the mass ratio of N-substituted maleimide described above. More preferably, each solution of N-substituted maleimides satisfies the mass ratio of 2-amino-N-substituted succinimide, the water content, and/or the mass ratio of N-substituted maleimide described above.

By employing the water washing step and the dehydration step for N-substituted maleimide as described above, it is possible to reduce 2-amino-N-substituted succinimide having a fluorescent-emitting property and to remove water which may cause degradation of the color tone of the methacrylic resin. These steps are preferably carried out because a methacrylic resin and a composition of the resin which enable production of shaped article, even a shaped article having a long path length, with a good color tone can be produced.

In the polymerization step, a methacrylic acid ester monomer, an optional monomer, a polymerization initiator, a polymerization solvent, a chain transfer agent, and the like may be mixed into the solution of N-substituted maleimide obtained through the pretreatment step to prepare a monomer mixture solution, which is to be used for polymerization.

—Reduction of Unreacted N-Substituted Maleimide at the End of Polymerization—

We discovered that, when any unreacted N-substituted maleimide remained at the end of polymerization of a methacrylic resin, a low molecular weight fluorescent-emitting reaction by-product including N-substituted maleimide as a structural unit might be produced in a heated devolatilization apparatus or the like, although a detailed mechanism is unknown.

In order to control the fluorescence emission intensity of the methacrylic resin to fall within a certain range, the total mass of unreacted N-substituted maleimide remaining after the end of the polymerization is preferably adjusted to 1000 ppm by mass or less, and more preferably 10 ppm by mass or more and 500 ppm by mass or less, relative to 100 mass % of the polymerization solution at the end of the polymerization.

When an N-arylmaleimide such as N-phenylmaleimide is used as N-substituted maleimide, the total mass of unreacted N-arylmaleimide remaining after the end of the polymerization is preferably 500 ppm by mass or less, more preferably 10 ppm by mass or more and 500 ppm by mass or less, and even more preferably 10 ppm by mass or more and 50 ppm by mass or less, relative to 100 mass % of the polymerization solution at the end of the polymerization.

These ranges are preferable because the fluorescence intensity of the methacrylic resin is controlled to fall within a predetermined range. For controlling the amount of unreacted N-substituted maleimide to be less than 10 ppm by mass, the polymerization temperature or the amount of initiator need to be increased. These are not preferable because thermally denatured products of the maleimide and active radicals increase, resulting in degradation of the color tone of the methacrylic resin.

One means to control the amount of unreacted N-substituted maleimide after the end of the polymerization within any of the above ranges is a semi-batch polymerization method. In the semi-batch polymerization method, preferably, 5 mass % to 35 mass % of the methacrylic acid ester monomer is supplementarily added in the polymerization step relative to 100 mass % of the total mass of all the monomers (e.g., methacrylic ester, N-substituted maleimide, and other optional monomers) fed for the polymerization, after 30 or more minutes pass after addition of a polymerization initiator is started. In other words, it is preferable that 65 to 95 mass % of 100 mass % of the total mass of all the monomers fed for the polymerization is charged into a reactor before the polymerization initiator is added, and remaining 5 mass % to 35 mass % of the methacrylic acid ester monomer is supplementarily added after 30 or more minutes pass after the addition of the polymerization initiator is started. The amount of the methacrylic acid ester monomer to be supplementarily added is more preferably 10 mass % to 30 mass % relative to 100 mass % of the total mass of all monomers fed for the polymerization. An amount of the methacrylic acid ester monomer to be supplementarily added within this range is preferable because unreacted N-substituted maleimide is caused to react with the supplementarily added methacrylic acid ester monomer, so that the amount of unreacted N-substituted maleimide after the end of the polymerization can be controlled to fall within a predetermined range.

The timing to start the supplemental addition of the monomers, the speed of the supplemental addition, and so forth may be appropriately selected according to the polymerization conversion ratio. Further, other than the methacrylic acid ester monomer, a monomer mixture containing the N-substituted maleimide monomer or another monomer may be added within a range not inhibiting the effect of the present disclosure and not inhibiting reduction in the amount of unreacted N-substituted maleimide.

The semi-batch polymerization method as described above is preferably employed because unreacted N-substituted maleimide monomer is reduced at a later stage of the polymerization, production of fluorescent-emitting substances in the devolatilization step can be minimized, and a methacrylic resin and a composition of the resin which enable production of shaped article, even a shaped article having a long path length, with a good color tone can be produced.

The following provides a specific description of production by radical polymerization in the semi-batch process using solution polymerization as one example of a method of producing the methacrylic resin including an N-substituted maleimide monomer-derived structural unit (hereinafter, also referred to as a "maleimide copolymer").

In the semi-batch polymerization method, it is preferable to supplementarily add 5 mass % to 35 mass % of the methacrylic acid ester monomer relative to 100 mass % of the total mass of all the monomers (methacrylic ester, N-substituted maleimide, and other optional monomers) fed for the polymerization, after 30 or more minutes pass after addition of the polymerization initiator is started. In other words, it is preferable that 65 to 95 mass % of 100 mass % of the total mass of all the monomers fed for the polymerization is charged into a reactor before the polymerization initiator is added, and remaining 5 mass % to 35 mass % of the methacrylic acid ester monomer is supplementarily added after 30 or more minutes pass after the addition of the polymerization initiator is started.

The amount of the methacrylic acid ester monomer to be supplementarily added is more preferably 10 mass % to 30 mass % relative to 100 mass % of the total mass of all monomers fed for the polymerization.

The timing to start the supplemental addition of the monomers, the speed of the supplemental addition, and the like may be appropriately selected according to the polymerization conversion ratio.

Further, other than the methacrylic acid ester monomer, a monomer mixture containing the N-substituted maleimide monomer or another monomer may be added within a range not inhibiting the effect of the present disclosure and not inhibiting increase in the polymerization conversion ratio of N-substituted maleimide.

The semi-batch polymerization method as described above is preferably employed because the conversion ratio of unreacted N-substituted maleimide monomer can be increased at a later stage of polymerization, and a resin and a composition of the resin can be obtained which achieve excellent light transmittance of a shaped article having a long path length, facilitate control on the molecular weight distribution of a resultant polymerized product, and have a fluidity particularly suitable for injection molding.

No specific limitations are placed on the polymerization solvent that is used so long as the solubility of the maleimide copolymer obtained through polymerization is high and an appropriate reaction liquid viscosity can be maintained in order to prevent gelation or the like.

Specific examples of polymerization solvents that can be used include aromatic hydrocarbons such as toluene, xylene, ethylbenzene, and isopropylbenzene; ketones such as methyl isobutyl ketone, butyl CELLOSOLVE, methyl ethyl ketone, and cyclohexanone; and polar solvents such as dimethylformamide and 2-methylpyrrolidone.

Moreover, an alcohol such as methanol, ethanol, or isopropanol may be used in combination as the polymerization solvent to the extent that dissolution of the polymerized product during polymerization is not impaired.

No specific limitations are placed on the amount of solvent used in polymerization so long as polymerization proceeds, precipitation of the copolymer or used monomers does not occur in production, and the solvent can be easily removed. For example, when the total amount of used monomers is taken to be 100 mass %, the amount of the solvent is preferably 10 mass % to 200 mass %. The amount of the solvent is more preferably 25 mass % to 150 mass %, even more preferably 40 mass % to 100 mass %, and still more preferably 50 mass % to 100 mass %.

In the present embodiment, polymerization is also preferably performed while the solvent concentration is appropriately changed so that the amount of the solvent during the polymerization is within the range of 100 mass % or less relative to the total amount of the monomers blended taken to be 100 mass %.

More specifically, for example, when the total amount of the monomers blended is taken to be 100 mass %, 40 to 60 mass % is blended at the initial stage of polymerization, and remaining 60 to 40 mass % is blended while the polymerization takes place so that the final amount of the solvent blended is within the range of 100 mass % or less.

This is preferable because the polymerization conversion ratio can be increased and the molecular weight distribution can be controlled, and a resin and a resin composition can be obtained which are excellent in injection moldability and can enable production of a shaped article, even a shaped article having a long path length, with a good color tone.

In solution polymerization, it is important to reduce the concentration of dissolved oxygen in the polymerization solution as small as possible in advance. For example, the concentration of dissolved oxygen is preferably 10 ppm or less. The concentration of dissolved oxygen can be measured, for example, using a dissolved oxygen (DO) meter B-505 (produced by Iijima Electronics Corporation). The method by which the concentration of dissolved oxygen is reduced may be selected as appropriate from methods such as a method in which an inert gas is bubbled into the polymerization solution; a method in which an operation of pressurizing the inside of a vessel containing the polymerization solution to approximately 0.2 MPa with an inert gas and then releasing the pressure is repeated prior to polymerization; and a method in which an inert gas is passed through a vessel containing the polymerization solution.

Although no specific limitations are placed on the polymerization temperature other than being a temperature at which polymerization proceeds, the polymerization temperature is preferably 70° C. to 180° C., and more preferably 80° C. to 160° C. The polymerization temperature is even more preferably 90° C. to 150° C., and still more preferably 100° C. to 150° C. The polymerization temperature is preferably 70° C. or higher from a viewpoint of the productivity, and is preferably 180° C. or lower for reducing side reactions during polymerization to thereby obtain a polymer having a desired molecular weight and quality.

Although no specific limitations are placed on the polymerization time other than being a time that enables the required degree of polymerization to be obtained with the required conversion ratio, the polymerization time is preferably 2 hours to 15 hours, more preferably 3 hour to 12 hours, and even more preferably 4 hour to 10 hours, from a viewpoint of productivity and so forth.

The polymerization initiator may be any initiator commonly used in radical polymerization and examples thereof include organic peroxides such as cumene hydroperoxide, diisopropylbenzene hydroperoxide, di-t-butyl peroxide, lauroyl peroxide, benzoyl peroxide, t-butylperoxy isopropyl carbonate, t-amyl peroxy-2-ethylhexanoate, t-amyl peroxyisononanoate, and 1,1-di(t-butylperoxy)cyclohexane; and azo compounds such as 2,2'-azobis(isobutyronitrile), 1,1'-azobis(cyclohexanecarbonitrile), 2,2'-azobis(2,4-dimethylvaleronitrile), and dimethyl-2,2'-azobisisobutyrate.

One of these chain transfer agents may be used alone, or two or more of these chain transfer agents may be used in combination.

The additive amount of the polymerization initiator when the total amount of monomers used in polymerization is taken to be 100 mass % may be 0.01 mass % to 1 mass %, and is preferably 0.05 mass % to 0.5 mass %.

There is no particular limitation on the method to add the polymerization initiator, and the polymerization initiator may be added continuously or intermittently as long as the speed to add the polymerization initiator can be adjusted according to the concentrations of monomers remaining in the polymerization solution, rather than employing the constant addition speed. In the case where the polymerization initiator is intermittently added, the addition amount per unit time is not taken into consideration while the polymerization initiator is not added.

In the present embodiment, it is preferable that the type and the addition amount of polymerization initiator, the polymerization temperature, and so forth are appropriately selected such that the proportion of total amount of radicals generated by the polymerization initiator relative to the total amount of unreacted monomer remaining in the reaction system is constantly no greater than a certain value.

Adoption of these methods can suppress the amount of oligomer or low molecular weight product produced in a later stage of polymerization and may enable improvement of polymerization stability by inhibiting overheating during polymerization.

In the polymerization reaction, polymerization may be performed with addition of a chain transfer agent as necessary.

The chain transfer agent may be a chain transfer agent that is commonly used in radical polymerization and examples thereof include mercaptan compounds such as n-butyl mercaptan, n-octylmercaptan, n-decyl mercaptan, n-dodecyl mercaptan, and 2-ethylhexyl thioglycolate; halogen compounds such as carbon tetrachloride, methylene chloride, and bromoform; and unsaturated hydrocarbon compounds such as α-methylstyrene dimer, α-terpinene, dipentene, and terpinolene.

One of these chain transfer agents may be used alone, or two or more of these chain transfer agents may be used in combination.

These chain transfer agents may be added at any stage, without any specific limitations, so long as the polymerization reaction is in progress.

The amount of the chain transfer agent added when the total amount of monomers used in polymerization is taken to be 100 mass % may be 0.01 mass % to 1 mass %, and is preferably 0.05 mass % to 0.5 mass %.

A polymerized product is collected from the polymerization solution obtained through solution polymerization, for example, by separating the polymerization solvent and unreacted monomers through a step referred to as a "devolatilization step" to thereby collect the polymerized product. The devolatilization step is a step in which volatile contents such as the polymerization solvent, residual monomers, and reaction by-products are removed under heated and reduced pressure conditions.

In the present embodiment, it is preferable to control the content of unreacted N-substituted maleimide monomer contained in the polymerization solution including the methacrylic resin which is to be subjected to the devolatilization step so as to fall within a predetermined level or less. Details are as described above in the "Reduction of unreacted N-substituted maleimide at the end of polymerization" section. In addition to the above technique, the conversion ratio of the monomers can be increased by other techniques, such as performing polymerization by extending the polymerization time as long as possible or by adjusting the speed to add the polymerization initiator according to the concentration of unreacted monomers in the polymerization solution; performing polymerization while appropriately adjusting the concentration of the solvent during the polymerization; adding another monomer having high reactivity with remaining N-substituted maleimide monomer at a later stage of the polymerization; or adding a compound having a high reactivity with N-substituted maleimide such as a α-terpinene at the end of polymerization, for example.

The concentration of remaining N-substituted maleimide monomer in the polymerization solution including the methacrylic resin can be determined, for example, by sampling the polymerization solution and weighing the sample, and dissolving the sample in chloroform to prepare a 5-mass % solution, adding n-decane as an internal standard, and determining the concentration of remaining N-substituted maleimide monomer in the sample using a gas chromatography system (GC-2010 manufactured by Shimadzu Corporation). As for more specific measurement conditions, conditions described in EXAMPLES described later can be used.

As the apparatus used in the devolatilization step, it is preferable to use a devolatilization apparatus having a heat exchanger and a decompression vessel as main components thereof without any rotating part in the structure thereof.

Specifically, it is possible to employ a devolatilization apparatus which is configured from a devolatilization tank in a configuration where a decompression unit is attached to a decompression vessel which is sized to be suitable for devolatilization and is provided with a heat exchanger disposed in the upper part thereof, and a discharge device such as a gear pump for discharging a polymerized product after devolatilization.

In this devolatilization apparatus, a polymerization solution is preheated by feeding it to the heat exchanger such as a multi-tube heat exchanger, a plate-fin heat exchanger, and a flat plate heat exchanger having a flat plate channel and a heater, disposed in the upper part of the decompression vessel, and then is fed to the devolatilization tank that is heated under a reduced pressure to separate the copolymer from the polymerization solvent, the mixture of unreacted raw materials, polymerization by-products, and the like. A devolatilization apparatus without any rotating part as described above is preferably used because the fluorescence intensity can be controlled to fall within a predetermined range by reducing a low molecular weight fluorescent-emitting reaction by-product derived from unreacted N-substituted maleimide. Further, this is preferable because a methacrylic resin having a good color tone can be produced.

Apparatuses having a rotating part are exemplified by thin film evaporators such as WIPRENE and EXEVA manufactured by KOBELCO ECO-SOLUTIONS Co., Ltd. Co. and CONTRA and pitched-blade CONTRA manufactured by Hitachi, Ltd.; and extruders provided with vents. Absence of a rotating part can reduce shear during devolatilization, and enables production of a resin having an even smaller fluorescence emission property.

The devolatilization step in the present embodiment is performed so that the shear rate applied to the polymerization solution is preferably 20 s$^{-1}$ or less, more preferably 10 s$^{-1}$ or less, and even more preferably to 0.1 s$^{-1}$ or more and 10 s$^{-1}$ or less. A shear rate of 0.1 s$^{-1}$ or more can prevent the flow of the molten resin to be excessively slowed and prevent degradation of the color tone due to extended residence time. On the other hand, a shear rate of 20 s$^{-1}$ or less can suppress production of a fluorescent-emitting reaction by-product caused by shear.

Here, for example, the shear rate γ in an extruder is calculated by the following equation:

$$\gamma=(\pi \times D \times N)/H$$

(where D represents the screw diameter (m), N represents the screw rotation speed per second, and H represents the depth of the screw groove (m)).

In the case of a flat plate channel, the shear rate γ is calculated by the following equation:

$$\gamma=(6 \times Q)/(w \times h^2)$$

(where Q represents the volume flow rate (m$^3$/s) passing through the flat plate channel, w represents the width of the flat plate channel (m), and h represents the distance between flat plates (m)).

In the present embodiment, a flat plate heat exchanger having a flat plate channel and a heater is preferably used as the heat exchanger disposed in the upper part of the decompression vessel. More preferable is a flat plate heat exchanger having a flat plate channel and a heater in which the flat plate channel has a laminated structure having a plurality of slit-like channels in rectangular cross-sections in the same plane.

The polymerization solution fed to the devolatilization apparatus is sent from the center of the heat exchanger to the slit-like channels and heated. The heated polymerization solution is fed from the slit-like channels to the decompression vessel integrated with a heat exchanger under reduced pressure, and is flash evaporated.

Such a devolatilization technique may also be referred to as "flash devolatilization", and hereinafter is also referred to as "flash devolatilization".

Two more devolatilization apparatuses as described above may be arranged in series to perform devolatilization in two or more stages.

The range of the temperature raised by the heat exchanger provided to the devolatilization apparatus may be from 100° C. or higher to 300° C. or lower, and is preferably from Tg+100° C. to Tg+160° C., and more preferably from Tg+110° C. to Tg+150° C. The temperature range of the devolatilization tank which is raised and maintained may be from 100° C. or higher to 300° C. or lower, and is preferably from Tg+100° C. to Tg+160° C., and more preferably from Tg+110° C. to Tg+150° C. Temperatures of the heat exchanger and the devolatilization tank within any of these ranges are preferable because thermal denaturation of remaining 2-amino-N-substituted succinimide can be prevented and production of fluorescent-emitting substances can be suppressed. Further, such temperatures are also preferable because residual volatile contents are effectively prevented from increasing and the thermal stability and the product quality of the produced methacrylic resin are improved. Here, Tg is the glass transition temperature of the produced methacrylic resin.

The degree of vacuum in the devolatilization tank may be 5 Torr to 300 Torr, and is preferably 10 Torr to 200 Torr. When the degree of vacuum is 300 Torr or less, unreacted monomers or a mixture of unreacted monomers and the polymerization solvent can be separated and removed efficiently, which prevents the thermal stability and the quality of the resultant thermoplastic copolymer from being reduced. When the degree of vacuum is 5 Torr or more, industrial implementation is facilitated.

The average residence time in the devolatilization tank is 5 minutes to 60 minutes, and preferably 5 minutes to 45 minutes. Average residence time within any of these ranges is preferable because devolatilization can be performed efficiently and coloration and decomposition caused by thermal denaturation of the polymerized product can be suppressed.

The polymerized product collected through the devolatilization step is pelletized in a step referred to as a pelletization step.

In the pelletization step, a molten resin is extruded into strands in at least one of conveying pelletization apparatus selected from a gear pump, a single screw extruder, and a twin screw extruder having a porous die as an attached facility, and is then pelletized by cold cutting, hot cutting in air, strand cutting in water, or under water cutting. From the viewpoint of suppressing production of a fluorescent-emitting reaction by-product caused by shear, a conveying apparatus having a small shear rate is preferably selected without using an extruder.

In the present embodiment, for production of a highly controlled methacrylic resin composition, it is preferable to employ a pelletization technique in which a composition in a molten state at a high temperature is quickly cooled and solidified while contact with the air is minimized as much as possible.

The pelletization is more preferably performed under implementable conditions in which the temperature of the molten resin is as low as possible, the residence time from an outlet of the porous die to the surface of cooling water is as short as possible, and the temperature of the cooling water is as high as possible.

For example, the temperature of the molten resin is preferably 220° C. to 280° C., and more preferably 230° C. to 270° C., the residence time from the outlet of the porous die to the surface of the cooling water is preferably 5 seconds or less, and more preferably 3 seconds or less, and the temperature of the cooling water is preferably 30° C. to 80° C., and more preferably 40° C. to 60° C.

Pelletization with temperatures of the molten resin and the cooling water within any of these ranges is preferable because a methacrylic resin having a small water content and less coloration and a composition of such a resin can be produced.

Smaller content of remaining monomers in the methacrylic resin after the devolatilization step is more preferable from the viewpoint of the thermal stability and the product quality. Specifically, the content of the methacrylic acid ester monomer is preferably 3000 ppm by mass or less, and more preferably 2000 ppm by mass or less. The total content of N-substituted maleimide monomers is preferably 200 ppm by mass or less, and more preferably 100 ppm by mass or less.

The content of the residual polymerization solvent is preferably 500 ppm by mass or less, and more preferably 300 ppm by mass or less.

—Method of Producing Methacrylic Resin Including Glutarimide-Based Structural Unit—

The method used to produce the methacrylic resin including the glutarimide-based structural unit in the main chain thereof may be any polymerization method from among bulk polymerization, solution polymerization, suspension polymerization, precipitation polymerization, and emulsion polymerization, and is preferably suspension polymerization, bulk polymerization, or solution polymerization and more preferably solution polymerization.

In the production method in the present embodiment, the polymerization process may, for example, be a batch polymerization process, a semi-batch polymerization process, or a continuous polymerization process.

In the production method in the present embodiment, the monomers are preferably polymerized by radical polymerization.

The methacrylic resin including the glutarimide-based structural unit in the main chain thereof may, for example, be a methacrylic resin including a glutarimide-based structural unit described in JP 2006-249202 A, JP 2007-009182 A, JP 2007-009191 A, JP 2011-186482 A, or WO 2012/114718 A1, and may be formed by a method described in the same publication.

The following provides a specific description of a case in which production is carried out by batch radical polymerization using solution polymerization as one example of a method of producing the methacrylic resin including a glutarimide-based structural unit.

Initially, a (meth)acrylic acid ester polymer is produced by a polymerizing a (meth)acrylic acid ester such as methyl methacrylate. In a case in which an aromatic vinyl unit is included in the methacrylic resin including a glutarimide-based structural unit, the (meth)acrylic acid ester and an aromatic vinyl (e.g., styrene) are copolymerized to produce a (meth)acrylic acid ester-aromatic vinyl copolymer.

Examples of the solvent used in polymerization include aromatic hydrocarbons such as toluene, xylene, and ethylbenzene; and ketones such as methyl ethyl ketone and methyl isobutyl ketone.

One of these solvents may be used individually, or two or more of these solvents may be used together.

No specific limitations are placed on the amount of solvent used in polymerization so long as polymerization proceeds, precipitation of the copolymer or used monomers does not occur in production, and the solvent can be easily removed. For example, when the total amount of used monomers is taken to be 100 mass %, the amount of the solvent is preferably 10 mass % to 200 mass %. The amount of the solvent is more preferably 25 mass % to 200 mass %, even more preferably 50 mass % to 200 mass %, and still more preferably 50 mass % to 150 mass %.

Although no specific limitations are placed on the polymerization temperature other than being a temperature at which polymerization proceeds, the polymerization temperature is preferably 50° C. to 200° C., and more preferably 80° C. to 200° C. The polymerization temperature is even more preferably 90° C. to 150° C., further more preferably 100° C. to 140° C., and still more preferably 100° C. to 130° C. The polymerization temperature is preferably 70° C. or higher from a viewpoint of the productivity, and is preferably 180° C. or lower for reducing side reactions during polymerization to thereby obtain a polymer having a desired molecular weight and quality.

Although no specific limitations are placed on the polymerization time so long as the target conversion ratio can be achieved, the polymerization time is preferably 0.5 hours to 15 hours, more preferably 2 hour to 12 hours, and even more preferably 4 hour to 10 hours from a viewpoint of productivity and so forth.

In the polymerization reaction, polymerization may be performed with addition of a polymerization initiator and/or a chain transfer agent as necessary.

The polymerization initiator may be, but is not specifically limited to, any of the polymerization initiators disclosed in relation to the production method of the methacrylic resin including the N-substituted maleimide monomer-derived structural unit.

One of these polymerization initiators may be used individually, or two or more of these polymerization initiators may be used together.

These polymerization initiators may be added at any stage so long as the polymerization reaction is in progress.

The amount of a polymerization initiator that is used can be set as appropriate depending on the combination of monomers, reaction conditions, and so forth, without any specific limitations. However, when the total amount of monomer used in polymerization is taken to be 100 mass %, the amount of the polymerization initiator may be 0.01 mass % to 1 mass % and is preferably 0.05 mass % to 0.5 mass %.

The chain transfer agent may be any chain transfer agent that is commonly used in radical polymerization and examples thereof include the chain transfer agents disclosed in relation to the production method of the methacrylic resin including the N-substituted maleimide monomer-derived structural unit.

One of these chain transfer agents may be used alone, or two or more of these chain transfer agents may be used in combination.

These chain transfer agents may be added at any stage, without any specific limitations, so long as the polymerization reaction is in progress.

No specific limitations are placed on the amount of the chain transfer agent that is added other than being in a range that enables the desired degree of polymerization under the adopted polymerization conditions. However, when the total amount of monomer used in polymerization is taken to be 100 mass %, the amount of the chain transfer agent may be 0.01 mass % to 1 mass % and is preferably 0.05 mass % to 0.5 mass %.

Preferably, the polymerization initiator and the chain transfer agent may be added in the polymerization step using, for example, the method described in the above-mentioned method of preparing the methacrylic resin including the N-substituted maleimide monomer-derived structural unit.

The concentration of dissolved oxygen in the polymerization solution may be, for example, a value disclosed in the above-mentioned method of preparing the methacrylic resin including the N-substituted maleimide monomer-derived structural unit.

Subsequently, an imidization reaction is carried out by causing the (meth)acrylic acid ester polymer or the methacrylic acid ester-aromatic vinyl copolymer to react with an imidization agent (imidization step). This provides a methacrylic resin including a cyclic structural unit of a glutarimide-based structure in the main chain thereof.

The imidization agent is not particularly limited, and any imidization agents capable of producing a glutarimide-based structural unit represented by the above general formula (3) may be used.

Particular examples of the imidization agent include ammonia and a primary amine. Examples of the primary amine include primary amines having aliphatic hydrocarbon groups such as methylamine, ethylamine, n-propylamine, i-propylamine, n-butylamine, i-butylamine, tert-butylamine, and n-hexylamine; and primary amines having alicyclic hydrocarbon groups such as cyclohexylamine.

Among the above-mentioned imidization agents, ammonia, methylamine, and cyclohexylamine are preferably used from a viewpoint of the cost and the physical properties, and methylamine is particularly preferably used.

In this imidization step, the content of the glutarimide-based structural unit in the produced methacrylic resin including the glutarimide-based structural unit can be controlled by adjusting the proportion of the imidization agent added.

Although there is no particular limitation on the method of carrying out the imidization reaction, a conventionally known method can be used. For example, an imidization reaction can be made to proceed using an extruder or a batch reaction tank.

The extruder is not particularly limited, and a single screw extruder, a twin screw extruder, a multiscrew extruder, or the like can be used, for example.

Among them, a twin screw extruder is preferably used. A twin screw extruder can promote mixing of the imidization agent with the raw material polymer.

Examples of the twin screw extruder include a non-intermeshing co-rotating twin screw extruder, an intermeshing co-rotating twin screw extruder, a non-intermeshing counter-rotating twin screw extruder, and an intermeshing counter-rotating twin screw extruder, for example.

One of the extruders exemplified above may be used alone, or two or more of them may be used by connecting them in series.

Furthermore, it is particularly preferable to attach a vent port to the extruder used, which enables the pressure to be reduced to the atmospheric pressure or lower for removal of the imidization agent used for the reaction, by-products such as methanol, or the monomers.

In production of the methacrylic resin including the glutarimide-based structural unit, an esterification step for treatment with an esterification agent such as dimethyl carbonate may be included in addition to the imidization reaction process. In this process, a catalyst such as trimethylamine, triethylamine, and tributylamine may also be used for the treatment.

Similarly to the imidization step described above, the esterification step can be made to proceed using an extruder or a batch reaction tank, for example.

Furthermore, it is preferable to attach a vent port to the apparatus used, which enables the pressure to be reduced to the atmospheric pressure or lower for removal of excessive esterification agent, by-products such as methanol, or the monomers.

The methacrylic resin, which has undergone the imidization step and the optional esterification step, is melt extruded into strands by an extruder provided with a porous die, and is pelletized into pellets by cold cutting, hot cutting in air, strand cutting in water, underwater cutting, or the like.

In addition, for reducing the number of foreign matters in the resin, it is also preferable to use a method in which the methacrylic resin is dissolved into an organic solvent such as toluene, methyl ethyl ketone, and methylene chloride, and the resultant methacrylic resin solution is filtered, followed by devolatilization of the organic solvent.

The method of producing the methacrylic resin including the glutarimide-based structural unit in the main chain thereof is preferably a method comprising a cyclization step of cyclizing a methacrylic resin having no cyclic structure through a reaction in a solution, and a devolatilization step of devolatilizing the resin solution obtained through the cyclization step using a devolatilization apparatus without any rotating part. The devolatilization step is performed so that the resin solution is subjected to a shear rate of preferably 20 $s^{-1}$ or less, more preferably 10 $s^{-1}$ or less, and even more preferably 0.1 $s^{-1}$ or more and 10 $s^{-1}$ or less. A shear rate of 0.1 $s^{-1}$ or more can prevent the flow of the molten resin to be excessively slowed and prevent degradation of the color tone due to extended residence time. On the other hand, a shear rate of 20 s$^{-1}$ or less can suppress production of a fluorescent-emitting reaction by-product caused by shear.

From the viewpoint of reducing the fluorescence intensity (the content of fluorescent-emitting substances), the polymerization solution after the end of the polymerization is preferably imidized in a batch reaction tank without using a twin screw extruder that applies a shear force.

The imidization reaction is preferably carried out at 130° C. to 250° C., more preferably carried out at 150° C. to 230° C., even more preferably carried out at 160° C. to 220° C., and still more preferably carried out at 170° C. to 200° C. Further, the reaction time is preferably 10 minutes to 5 hours, and more preferably 30 minutes to 2 hours.

After the imidization step and an optional esterification step, devolatilization is preferably carried out by the low-shear devolatilization method described in the method of preparing the methacrylic resin including an N-substituted maleimide monomer-derived structural unit, followed by pelletization, from the viewpoint of reducing the fluorescence intensity.

—Method of Producing Methacrylic Resin Including Lactone Ring Structural Unit—

The method used to produce the methacrylic resin including the lactone ring structural unit in the main chain thereof is a method in which a lactone ring structure is formed by a cyclization reaction after polymerization. In order to promote this cyclization reaction, it is preferable that monomers are polymerized by radical polymerization through a solution polymerization method that uses a solvent.

In the production method in the present embodiment, the polymerization process may, for example, be a batch polymerization process, a semi-batch polymerization process, or a continuous polymerization process.

The methacrylic resin including the lactone ring structural unit in the main chain thereof can be formed, for example, by a method described in JP 2001-151814 A, JP 2004-168882 A, JP 2005-146084 A, JP 2006-96960 A, JP 2006-171464 A, JP 2007-63541 A, JP 2007-297620 A, or JP 2010-180305 A.

The following provides a specific description of a case in which production is carried out by batch radical polymerization using solution polymerization as one example of a method of producing the methacrylic resin including the lactone ring structural unit.

The method used to produce the methacrylic resin including the lactone ring structural unit is a method in which a lactone ring structure is formed by a cyclization reaction after polymerization. In order to promote this cyclization reaction, a solution polymerization method that uses a solvent is preferable.

Examples of the solvent used in polymerization include aromatic hydrocarbons such as toluene, xylene, and ethylbenzene; and ketones such as methyl ethyl ketone and methyl isobutyl ketone.

One of these solvents may be used individually, or two or more of these solvents may be used together.

No specific limitations are placed on the amount of solvent used in polymerization so long as polymerization can proceed and gelation is inhibited. However, when the total amount of monomer that is used is taken to be 100 mass %, the amount of solvent is, for example, preferably 50 mass % to 200 mass %, and more preferably 100 mass % to 200 mass %.

In order to sufficiently inhibit gelation of the polymerization solution and promote the cyclization reaction after polymerization, polymerization is preferably performed such that the concentration of produced polymer in the reaction mixture obtained after polymerization is 50 mass % or less. This concentration is preferably controlled to 50 mass % or less by adding the polymerization solvent to the reaction mixture as appropriate.

The method by which the polymerization solvent is added to the reaction mixture as appropriate is not specifically limited and may, for example, be through continuous addition of the polymerization solvent or intermittent addition of the polymerization solvent.

The polymerization solvent that is added may be a single type of solvent, or may be a mixed solvent of two or more types of solvents.

Although no specific limitations are placed on the polymerization temperature other than being a temperature at which polymerization proceeds, the polymerization temperature is preferably 50° C. to 200° C., and more preferably 80° C. to 180° C. from a viewpoint of productivity.

Although no specific limitations are placed on the polymerization time so long as the target conversion ratio can be achieved, the polymerization time is preferably 0.5 hours to 10 hours, and more preferably 1 hour to 8 hours from a viewpoint of productivity and so forth.

In the polymerization reaction, polymerization may be performed with addition of a polymerization initiator and/or a chain transfer agent as necessary.

The polymerization initiator may be, but is not specifically limited to, any of the polymerization initiators disclosed in relation to the production method of the methacrylic resin including the N-substituted maleimide monomer-derived structural unit.

One of these polymerization initiators may be used individually, or two or more of these polymerization initiators may be used together.

These polymerization initiators may be added at any stage so long as the polymerization reaction is in progress.

The amount of polymerization initiator that is added can be set as appropriate depending on the combination of monomers, reaction conditions, and so forth, without any specific limitations. However, when the total amount of monomer used in polymerization is taken to be 100 mass %, the amount of polymerization initiator may be 0.05 mass % to 1 mass %.

The chain transfer agent may be any chain transfer agent that is commonly used in radical polymerization and examples thereof include the chain transfer agents disclosed in relation to the production method of the methacrylic resin including the N-substituted maleimide monomer-derived structural unit.

One of these chain transfer agents may be used alone, or two or more of these chain transfer agents may be used in combination.

These chain transfer agents may be added at any stage, without any specific limitations, so long as the polymerization reaction is in progress.

No specific limitations are placed on the amount of chain transfer agent that is added other than being in a range that enables the desired degree of polymerization under the adopted polymerization conditions. However, when the total amount of monomer used in polymerization is taken to be 100 mass %, the amount of the chain transfer agent is preferably 0.05 mass % to 1 mass %.

Preferably, the polymerization initiator and the chain transfer agent may be added in the polymerization step using, for example, the method described in the above-mentioned method of preparing the methacrylic resin including the N-substituted maleimide monomer-derived structural unit.

The concentration of dissolved oxygen in the polymerization solution may be, for example, a value disclosed in the above-mentioned method of preparing the methacrylic resin including the N-substituted maleimide monomer-derived structural unit.

The methacrylic resin in the present embodiment that includes the lactone ring structural unit can be obtained by performing a cyclization reaction after the end of the polymerization reaction. Therefore, the polymerization reaction liquid containing a solvent is preferably subjected to the lactone cyclization reaction without removing the polymerization solvent from the liquid.

The copolymer obtained through polymerization is heat treated to cause a cyclocondensation reaction between a hydroxy group and an ester group present in the molecular chain of the copolymer to thereby form a lactone ring structure.

Heat treatment for formation of the lactone ring structure may be performed, for example, using a reactor including a vacuum device or devolatilization apparatus for removal of an alcohol that may be produced as a by-product of cyclocondensation, or an extruder including a devolatilization apparatus.

In formation of the lactone ring structure, the heat treatment may be performed in the presence of a cyclocondensation catalyst to promote the cyclocondensation reaction.

Specific examples of cyclocondensation catalysts that can be used include monoalkyl, dialkyl, and trialkyl esters of phosphorus acid such as methyl phosphite, ethyl phosphite, phenyl phosphite, dimethyl phosphite, diethyl phosphite, diphenyl phosphite, trimethyl phosphite, and triethyl phosphite; monoalkyl, dialkyl, and trialkyl esters of phosphoric acid such as methyl phosphate, ethyl phosphate, 2-ethylhexyl phosphate, octyl phosphate, isodecyl phosphate, lauryl phosphate, stearyl phosphate, isostearyl phosphate, dimethyl phosphate, diethyl phosphate, di-2-ethylhexyl phosphate, diisodecyl phosphate, dilauryl phosphate, distearyl phosphate, diisostearyl phosphate, trimethyl phosphate, triethyl phosphate, triisodecyl phosphate, trilauryl phosphate, tristearyl phosphate, and triisostearyl phosphate; and organic zinc compounds such as zinc acetate, zinc propionate, and octyl zinc.

One of these cyclocondensation catalysts may be used alone, or two or more of these cyclocondensation catalysts may be used in combination.

Although the amount of the cyclocondensation catalyst that is used is not specifically limited, the amount of the cyclocondensation catalyst relative to 100 mass % of the methacrylic resin is, for example, preferably 0.01 mass % to 3 mass %, and more preferably 0.05 mass % to 1 mass %.

Using 0.01 mass % or more of a catalyst is effective for improving the rate of the cyclocondensation reaction, whereas using 3 mass % or less of a catalyst is effective for preventing coloration of the resultant polymer and polymer crosslinking that then makes melt molding difficult.

The timing to add the cyclocondensation catalyst is not specifically limited. For example, the cyclocondensation catalyst may be added in an initial stage of the cyclocondensation reaction, may be added during the reaction, or may be added both in the initial stage and during the reaction.

In a case in which the cyclocondensation reaction is carried out in the presence of a solvent, devolatilization is preferably carried out concurrently with the reaction.

Although no specific limitations are placed on the apparatus used in a case in which the cyclocondensation reaction and a devolatilization step are carried out concurrently, it is preferable to use a devolatilization apparatus comprising a heat exchanger and a devolatilization tank, a vented extruder, or an apparatus in which a devolatilization apparatus and an extruder are arranged in series, and more preferable to use a vented twin screw extruder.

The vented twin screw extruder is preferably a vented extruder equipped with a plurality of vent ports.

In a case in which a vented extruder is used, the reaction treatment temperature is preferably 150° C. to 350° C., and more preferably 200° C. to 300° C. When the reaction treatment temperature is less than 150° C., the cyclocondensation reaction may be insufficient and residual volatile contents may increase. On the contrary, when the reaction treatment temperature exceeds 350° C., coloration or decomposition of the resultant polymer may occur.

Moreover, in a case in which a vented extruder is used, the degree of vacuum therein is preferably 10 Torr to 500 Torr, and more preferably 10 Torr to 300 Torr. When the degree of vacuum exceeds 500 Torr, the volatile content tends to remain. On the contrary, when the degree of vacuum is less than 10 Torr, industrial implementation may become difficult.

When a cyclocondensation reaction is performed as described above, an alkaline earth metal and/or amphoteric metal salt of an organic acid is preferably added during pelletization to deactivate any residual cyclocondensation catalyst.

Examples of the alkaline earth metal and/or amphoteric metal salt of an organic acid include calcium acetyl acetate, calcium stearate, zinc acetate, zinc octanoate, and zinc 2-ethylhexanoate.

After the cyclocondensation reaction step is completed, the methacrylic resin is melted and extruded as strands from an extruder equipped with a porous die, and is then pelletized by cold cutting, hot cutting in air, strand cutting in water, or under water cutting.

The above-mentioned lactonization for forming the lactone cyclic structural unit may be carried out after production of the resin and before production of a resin composition (which will be described later), or may be carried out during the production of the resin composition together with melt kneading of the resin with components other than the resin.

The method of producing the methacrylic resin including the lactone ring structural unit in the main chain thereof is preferably a method comprising a cyclization step of cyclizing a methacrylic resin having no cyclic structure through a reaction in a solution, and a devolatilization step of devolatilizing the resin solution obtained through the cyclization step using a devolatilization apparatus without any rotating part. The devolatilization step is performed so that the resin solution is subjected to a shear rate of preferably 20 s$^{-1}$ or less, more preferably 10 s$^{-1}$ or less, and even more preferably 0.1 s$^{-1}$ or more and 10 s$^{-1}$ or less. A shear rate of 0.1 s$^{-1}$ or more can prevent the flow of the molten resin to be excessively slowed and prevent degradation of the color tone due to extended residence time. On the other hand, a shear rate of 20 s$^{-1}$ or less can suppress production of a fluorescent-emitting reaction by-product caused by shear. From the viewpoint of reducing the fluorescence intensity (the content of fluorescent-emitting substances), the polymerization solution after the end of the polymerization is preferably lactonized in a batch reaction tank without using a twin screw extruder that applies a shear force, similarly to the method of producing the methacrylic resin having the glutarimide-based structural unit.

After the lactonization step, devolatilization is preferably carried out by the low-shear devolatilization method described in the method of preparing the methacrylic resin including an N-substituted maleimide monomer-derived structural unit, followed by pelletization, from the viewpoint of reducing the fluorescence intensity.

[Methacrylic Resin Composition]

The methacrylic resin composition of the present embodiment includes the above-mentioned methacrylic resin containing the structural unit (X) having a cyclic structure in the main chain thereof, and may contain any of a wide variety of additives to the extent that the effects of the present disclosure are not significantly lost.

—Additive—

Examples of the additive include, but are not particularly limited to, antioxidants; light stabilizers such as hindered amine based light stabilizers; ultraviolet absorbers; release agents; other thermoplastic resins; softeners and plasticizers such as paraffinic process oils, naphthenic process oils, aromatic process oils, paraffin, organic polysiloxanes, and mineral oils; flame retardants; antistatic agents; reinforcers such as organic fibers, inorganic fillers such as pigments including iron oxide, glass fibers, carbon fibers, and metal whiskers; coloring agents; organophosphorus compounds such as phosphite esters, phosphonites, and phosphate esters; other additives; and mixtures of any of the preceding examples.

—Antioxidant—

The methacrylic resin composition of the present embodiment preferably contains an antioxidant which prevents degradation or coloration during shaping processing or in use.

Examples of the antioxidant include, but are not limited to, hindered phenol antioxidants, phosphoric antioxidants, and sulfuric antioxidants.

One of such antioxidants may be used, or two or more of such antioxidants may be used in combination.

The methacrylic resin or the methacrylic resin composition of the present embodiment is suitable for use in various applications such as melt-extrusion, injection molding, and film shaping applications. The thermal history imparted in processing depends on the processing method, but may take various forms such as tens of seconds in the case of processing using an extruder to tens of minutes to several hours in the case of shaping processing of a thick product or shaping of a sheet. In a case in which a long thermal history is imparted, it is necessary to increase the amount of a thermal stabilizer added in order to obtain the desired thermal stability.

Hence, from a viewpoint of inhibiting bleed-out of the thermal stabilizer and preventing adhesion of a film to a roller during film production, it is preferable to use a plurality of thermal stabilizers in combination. For example, it is preferable to use a hindered phenol antioxidant together with at least one selected from a phosphoric antioxidant and a sulfuric antioxidant.

Examples of the hindered phenol antioxidant include, but are not specifically limited to, pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, 3,3',3'',5,5',5''-hexa-tert-butyl-a,a',a''-(mesitylene-2,4,6-triyl)tri-p-cresol, 4,6-bis(octylthiomethyl)-o-cresol, 4,6-bis(dodecylthiomethyl)-o-cresol, ethylenebis(oxyethylene) bis[3-(5-tert-butyl-4-hydroxy-m-tolyl)propionate], hexamethylene bis[3-(3,5-di-tert-butyl-4-hydroxyphenyl) propionate], 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylene)methyl]-1,3,5-triazine-2,4,6 (1H,3H,5H)-trione, 2,6-di-tert-butyl-4-(4,6-bis(octylthio)-1,3,5-triazin-2-ylamine)phenol, 2-[1-(2-hydroxy-3,5-di-tert-pentylphenyl)ethyl]-4,6-di-tert-pentylphenyl acrylate, and 2-tert-butyl-4-methyl-6-(2-hydroxy-3-tert-butyl-5-methyl-benzyl)phenyl acrylate.

In particular, pentaerythritol tetrakis[3-(3,5-di-tert-butyl-4-hydroxyphenyl)propionate], octadecyl-3-(3,5-di-t-butyl-4-hydroxyphenyl)propionate, and 2-[1-(2-hydroxy-3,5-di-tert-pentylphenyl)ethyl]-4,6-di-tert-pentylphenyl acrylate are preferable.

Commercially available hindered phenol antioxidants may be used as these hindered phenol antioxidants as the antioxidant. Examples of such commercially available hindered phenol antioxidants include, but are not specifically limited to, Irganox 1010; pentaerythritol tetrakis[3-(3,5-di-t-butyl-4-hydroxyphenyl)propionate]; produced by BASF), Irganox 1076 (octadecyl-3-(3,5-di-t-butyl-4-hydroxyphenyl)propionate; produced by BASF), Irganox 1330 (3,3',3'',5,5',5''-hexa-t-butyl-a,a',a''-(mesitylene-2,4,6-triyl)tri-p-cresol; produced by BASF), Irganox 3114 (1,3,5-tris(3,5-di-t-butyl-4-hydroxybenzyl)-1,3,5-triazine-2,4,6(1H,3H,5H)-trione; produced by BASF), Irganox 3125 (produced by BASF), ADK STAB AO-60 (pentaerythritol tetrakis[3-(3,5-di-t-butyl-4-hydroxyphenyl)propionate]; produced by Adeka Corporation), ADK STAB AO-80 (3,9-bis{2-[3-(3-t-butyl-4-hydroxy-5-methylphenyl)propionyloxy]-1,1-dimeth ylethyl}-2,4,8,10-tetraoxaspiro[5.5]undecane; produced by Adeka Corporation), Sumilizer BHT (produced by Sumitomo Chemical Co., Ltd.), Cyanox 1790 (produced by Cytec Solvay Group), Sumilizer GA-80 (produced by Sumitomo Chemical Co., Ltd.), Sumilizer GS (2-[1-(2-hydroxy-3,5-di-tert-pentylphenyl)ethyl]-4,6-di-tert-pentylphenyl) acrylate; produced by Sumitomo Chemical Co., Ltd.), Sumilizer GM (2-tert-butyl-4-methyl-6-(2-hydroxy-3-tert-butyl-5-methylbenzyl)phenyl acrylate; produced by Sumitomo Chemical Co., Ltd.), and vitamin E (produced by Eisai Co., Ltd.).

Among these commercially available phenolic antioxidants, Irganox 1010, ADK STAB AO-60, ADK STAB AO-80, Irganox 1076, Sumilizer GS, and the like are preferable in terms of thermal stability imparting effect in the resin.

One of these phenolic antioxidants may be used alone, or two or more of these phenolic antioxidants may be used in combination.

Phosphoric antioxidants that can be used as the antioxidant may be, but are not limited to, tris(2,4-di-t-butylphenyl) phosphite, bis(2,4-bis(1,1-dimethylethyl)-6-methylphenyl) ethyl ester phosphorous acid, tetrakis(2,4-di-t-butylphenyl) (1,1-biphenyl)-4,4'-diyl bisphosphonite, bis(2,4-di-t-butylphenyl)pentaerythritol diphosphite, bis(2,6-di-t-butyl-4-methylphenyl)pentaerythritol diphosphite, bis(2,4-dicumylphenyl)pentaerythritol diphosphite, tetrakis(2,4-t-butylphenyl)(1,1-biphenyl)-4,4'-diyl bisphosphonite, di-t-butyl-m-cresyl-phosphonite, and 4-[3-[(2,4,8,10-tetra-tert-butyldibenzo[d,f][1,3,2]dioxaphosphepin)-6-yloxy]propyl]-2-methyl-6-tert-butylphenol.

The phosphorus antioxidant may be commercially available phosphorus antioxidants. Examples of such commercially available phosphorus antioxidants include, but are not limited to, Irgafos 168 (tris(2,4-di-t-butylphenyl) phosphite; produced by BASF), Irgafos 12 (tris[2-[[2,4,8,10-tetra-t-butyldibenzo[d,f][1,3,2]dioxaphosphepin-6-yl]oxy]ethyl] amine; produced by BASF), Irgafos 38 (bis(2,4-bis(1,1-dimethylethyl)-6-methylphenyflethyl phosphite, produced by BASF), ADEKASTAB 329K (ADK STAB-229K, produced by Adeka Corporation), ADEKASTAB PEP-36 (ADK STAB PEP-36, produced by Adeka Corporation), ADEKASTAB PEP-36A (ADK STAB PEP-36A, produced by Adeka Corporation), ADEKASTAB PEP-8 (ADK STAB PEP-8, produced by Adeka Corporation), ADEKASTAB HP-10 (ADK STAB HP-10, produced by Adeka Corporation), ADEKASTAB 2112 (ADK STAB 2112, produced by Adeka Corporation), ADEKASTAB 1178 (ADK STAB 1178, produced by Adeka Corporation), ADEKASTAB 1500 (ADK STAB 1500, produced by Adeka Corporation), Sandstab P-EPQ (produced by Cryant Corporation), Weston 618 (produced by GE Corporation), Weston 619G (produced by GE Corporation), Ultranox 626 (produced by GE Corporation), Sumilizer GP (4-[3-[(2,4,8,10-tetra-tert-butyldibenzo[d,f][1,3,2]dioxaphosphepin)-6-iloxy]propyl]-2-methyl-6-tert-butylphenol, produced by Sumitomo Chemical Co., Ltd.), HCA (9,10-dihydro-9-oxa-10-phosphaphenanthrene-10-oxide, produced by Sanko Co., Ltd.), and so forth.

Among these commercially available phosphorus antioxidants, from a viewpoint of an effect of imparting thermal stability in the resin and an effect of using in combination with various antioxidants, Irgafos 168, ADEKASTAB PEP-36, ADEKASTAB PEP-36A, ADEKASTAB HP-10, and ADEKASTAB 1178 are preferable, and ADEKASTAB PEP-36 and ADEKASTAB PEP-36A are particularly preferable.

One phosphorus antioxidant may be used alone, or two or more phosphorus antioxidants may be used in combination.

Examples of sulfuric antioxidants that can be used as the antioxidant include, but are not specifically limited to, 2,4-bis(dodecylthiomethyl)-6-methylphenol (Irganox 1726 produced by BASF), Irganox 1520L (produced by BASF), 2,2-bis[[3-(dodecylthio)-1-oxopropoxy]methyl]propane-1,3-diyl bis[3-(dodecylthio)propionate] (ADK STAB AO-412S produced by Adeka Corporation), 2,2-bis[[3-(dodecylthio)-1-oxopropoxy]methyl]propane-1,3-diyl bis[3-(dodecylthio)propionate] (KEMINOX PLS produced by Chemipro Kasei Kaisha, Ltd.), and di(tridecyl)-3,3'-thiodipropionate (AO-503 produced by Adeka Corporation).

Among these commercially available sulfuric antioxidants, ADK STAB AO-412S and KEMINOX PLS are preferable from a viewpoint of an effect of imparting thermal stability in the resin, an effect of using in combination with various antioxidants, and handleability.

One of these sulfuric antioxidants may be used alone, or two or more of these sulfuric antioxidants may be used in combination.

Although the content of the antioxidant can be any amount that enables an effect of thermal stability improvement to be obtained, an excessive content may lead to problems such as bleed-out during processing. Accordingly, the content of the antioxidant per 100 mass % of the methacrylic resin is preferably 5 mass % or less, more preferably 3 mass % or less, even more preferably 1 mass % or less, further preferably 0.8 mass % or less, even further preferably 0.01 mass % to 0.8 mass %, and particularly preferably 0.01 mass % to 0.5 mass %.

There is no particular limitation on the timing to add the antioxidant, and examples include a method in which the antioxidant is added to a monomer solution before polymerization, followed by initiating polymerization; a method in which the antioxidant is added to and mixed with a polymer solution after polymerization, followed by being subjected to a devolatilization step; a method in which the antioxidant is added to and mixed with a molten polymer after devolatilization, followed by pelletization; and a method in which the antioxidant is added to and mixed with pellets which are melt-extruded once again after devolatilization and pelletization. Among these methods, from a viewpoint of preventing thermal degradation and coloration in the devolatilization step, the antioxidant is preferably added to and mixed with a polymer solution after polymerization and before a devolatilization step, followed by being subjected to a devolatilization step.

—Hindered Amine Based Light Stabilizer—

The methacrylic resin composition of the present embodiment resin composition may contain a hindered amine based light stabilizer.

The hindered amine based light stabilizer is not specifically limited, but is preferably a compound including three or more cyclic structures. Here, it is preferable that the cyclic structures are at least one selected from the group consisting of aromatic rings, aliphatic rings, aromatic heterocycles, and nonaromatic heterocycles; and in a case in which one compound includes two or more cyclic structures, these cyclic structures may be either identical to or different from each other.

Specific examples of the hindered amine based light stabilizer include, but are not limited to, bis(1,2,2,6,6-pentamethyl-4-piperidyl) [[3,5-bis(1,1-dimethylethyl)-4-hydroxyphenyl]methyl]butylmalonate; a mixture of bis(1,2,2,6,6-pentamethyl-4-piperidyl) sebacate and methyl-1,2,2,6,6-pentamethyl-4-piperidyl sebacate; bis(2,2,6,6-tetramethyl-4-piperidyl) sebacate; N,N'-bis(2,2,6,6-tetramethyl-4-piperidyl)-N,N'-diformylhexamethylenediamine; polycondensates of dibutylamine, 1,3,5-triazine, and N,N'-bis(2,2,6,6-tetramethyl-4-piperidyl-1,6-hexamethyl-enediamine with N-(2,2,6,6-tetramethyl-4-piperidyl) butylamine; poly[{6-(1,1,3,3-tetramethylbutyl)amino-1,3,5-triazine-2,4-diyl}{(2,2,6,6-tetramethyl-4-piperidyl) imino}hexamethylene {(2,2,6,6-tetramethyl-4-piperidy) imino}]; tetrakis(1,2,2,6,6-pentamethyl-4-piperidyl)butane-1,2,3,4-tetracarboxylate; tetrakis(2,2,6,6-tetramethyl-4-piperidyl)butane-1,2,3,4-tetracarboxylate; reactants of 1,2,2,6,6-pentamethyl-4-piperidiol and β,β,β',β'-tetramethyl-2,4,8,10-tetraoxaspiro[5.5]undecane-3,9-diethanol; reactants of 2,2,6,6-tetramethyl-4-piperidiol and β,β,β',β'-tetramethyl-2,4,8,10-tetraoxaspiro[5.5]undecane-3,9-diethanol; bis(1-undecanoxy-2,2,6,6-tetramethylpiperidine-4-il) carbonate; 1,2,2,6,6-pentamethyl-4-piperidyl methacrylate; and 2,2,6,6-tetramethyl-4-piperidyl methacrylate.

Among these, preferable examples include bis(1,2,2,6,6-pentamethyl-4-piperidyl) [[3,5-bis(1,1-dimethylethyl)-4-hydroxyphenyl]methyl]butylmalonate; polycondensates of dibutylamine, 1,3,5-triazine, and N,N'-bis(2,2,6,6-tetramethyl-4-piperidyl-1,6-hexamethylenediamine with N-(2,2,6,6-tetramethyl-4-piperidyl)butylamine; poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}]; reactants of 1,2,2,6,6-pentamethyl-4-piperidiol and β,β,β',β'-tetramethyl-2,4,8,10-tetraoxaspiro[5.5]undecane-3,9-diethanol; and reactants of 2,2,6,6-tetramethyl-4-piperidiol and β,β,β',β'-tetramethyl-2,4,8,10-tetraoxaspiro[5.5]undecane-3,9-diethanol, which include three or more cyclic structures.

Although the content of the hindered amine based light stabilizer can be any amount that enables an effect of light stability improvement to be obtained, an excessive content may lead to problems such as bleed-out during processing. Accordingly, the content of the hindered amine based light stabilizer per 100 mass % of the methacrylic resin is preferably 5 mass % or less, more preferably 3 mass % or less, even more preferably 1 mass % or less, further preferably 0.8 mass % or less, even further preferably 0.01 mass % to 0.8 mass %, and particularly preferably 0.01 mass % to 0.5 mass %.

—Ultraviolet Absorber—

The methacrylic resin composition of the present embodiment may contain an ultraviolet absorber.

Although no specific limitations are placed on ultraviolet absorbers that can be used, an ultraviolet absorber having a maximum absorption wavelength in a range of 280 nm to 380 nm is preferable. Examples of ultraviolet absorbers that can be used include benzotriazole compounds, benzotriazine compounds, benzophenone compounds, oxybenzophenone compounds, benzoate compounds, phenolic compounds, oxazole compounds, cyanoacrylate compounds, and benzoxazinone compounds.

Examples of benzotriazole compounds that can be used include 2,2'-methylenebis[4-(1,1,3,3-tetramethylbutyl)-6-(2H-benzotriazol-2-yl) phenol], 2-(3,5-di-tert-butyl-2-hydroxyphenyl)-5-chlorobenzotriazole, 2-(2H-benzotriazol-2-yl)-p-cresol, 2-(2H-benzotriazol-2-yl)-4,6-bis(1-methyl-1-phenylethyl)phenol, 2-benzotriazol-2-yl-4,6-di-tert-butylphenol, 2-[5-chloro(2H)-benzotriazol-2-yl]-4-methyl-6-t-butylphenol, 2-(2H-benzotriazol-2-yl)-4,6-di-t-butylphenol, 2-(2H-benzotriazol-2-yl)-4-(1,1,3,3-tetramethylbutyl)phenol, 2-(2H-benzotriazol-2-yl)-4-methyl-6-(3,4,5,6-tetrahydrophthalimidylmethyl) phenol, reaction products of methyl 3-(3-(2H-benzotriazol-2-yl)-5-t-butyl-4-hydroxyphenyl)propionate and polyethylene glycol 300, 2-(2H-benzotriazol-2-yl)-6-(linear/branched dodecyl)-4-methylphenol, 2-(5-methyl-2-hydroxyphenyl) benzotriazole, 2-[2-hydroxy-3,5-bis(α,α-dimethylbenzyl)phenyl]-2H-benzotriazole, and 3-(2H-benzotriazol-2-yl)-5-(1,1-dimethylethyl)-4-hydroxy-C7-9 branched/linear alkyl esters.

Among these benzotriazole compounds, benzotriazole compounds having a molecular weight of 400 or more are preferable. Examples of such benzotriazole compounds that are commercially available products include Kemisorb® 2792 (Kemisorb is a registered trademark in Japan, other countries, or both; produced by Chemipro Kasei Kaisha, Ltd.), ADK STAB® LA31 (ADK STAB is a registered trademark in Japan, other countries, or both; produced by Adeka Corporation), and TINUVIN® 234 (TINUVIN is a registered trademark in Japan, other countries, or both; produced by BASF).

Examples of benzotriazine compounds that can be used include 2-mono(hydroxyphenyl)-1,3,5-triazine compounds, 2,4-bis(hydroxyphenyl)-1,3,5-triazine compounds, and 2,4,6-tris(hydroxyphenyl)-1,3,5-triazine compounds. Specific examples include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, 2,4-diphenyl-6-(2-hydroxy-4-butoxyethoxy)-1,3,5-triazine, 2,4-bis(2-hydroxy-4-butoxyphenyl)-6-(2,4-dibutoxyphenyl)-1,3,5-triazine, 2,4,6-tris(2-hydroxy-4-methoxyphenyl)-1,3,5-triazine, 2,4,6-tris(2-hydroxy-4-ethoxyphenyl)-1,3,5-triazine, 2,4,6-tris(2-hydroxy-4-propoxyphenyl)-1,3,5-triazine, 2,4,6-tris(2-hydroxy-4-butoxyphenyl)-1,3,5-triazine, 2,4,6-tris(2-hydroxy-4-hexyloxyphenyl)-1,3,5-triazine, 2,4,6-tris(2-hydroxy-4-octyloxyphenyl)-1,3,5-triazine, 2,4,6-tris(2-hydroxy-4-dodecyloxyphenyl)-1,3,5-triazine, 2,4,6-tris(2-hydroxy-4-benzyloxyphenyl)-1,3,5-triazine, 2,4,6-tris(2-hydroxy-4-ethoxyethoxyphenyl)-1,3,5-triazine, 2,4,6-tris(2-hydroxy-4-butoxyethoxyphenyl)-1,3,5-triazine, 2,4,6-tris(2-hydroxy-4-propoxyethoxyphenyl)-1,3,5-triazine, 2,4,6-tris(2-hydroxy-4-methoxycarbonylpropyloxyphenyl)-1,3,5-triazine, 2,4,6-tris(2-hydroxy-4-ethoxycarbonylethyloxyphenyl)-1,3,5-triazine, 2,4,6-tris(2-hydroxy-4-(1-(2-ethoxyhexyloxy)-1-oxopropan-2-yloxy)phenyl)-1,3,5-triazine, 2,4,6-tris(2-hydroxy-3-methyl-4-methoxyphenyl)-1,3,5-triazine, 2,4,6-tris(2-hydroxy-3-methyl-4-ethoxyphenyl)-1,3,5-triazine, 2,4,6-tris(2-hydroxy-3-methyl-4-propoxyphenyl)-1,3,5-triazine, 2,4,6-tris(2-hydroxy-3-methyl-4-butoxyphenyl)-1,3,5-triazine, 2,4,6-tris(2-hydroxy-3-methyl-4-hexyloxyphenyl)-1,3,5-triazine, 2,4,6-tris(2-hydroxy-3-methyl-4-octyloxyphenyl)-1,3,5-triazine, 2,4,6-tris(2-hydroxy-3-methyl-4-dodecyloxyphenyl)-1,3,5-triazine, 2,4,6-tris(2-hydroxy-3-methyl-4-benzyloxyphenyl)-1,3,5-triazine, 2,4,6-tris(2-hydroxy-3-methyl-4-ethoxyethoxyphenyl)-1,3,5-triazine, 2,4,6-tris(2-hydroxy-3-methyl-4-butoxyethoxyphenyl)-1,3,5-triazine, 2,4,6-tris(2-hydroxy-3-methyl-4-propoxyethoxyphenyl)-1,3,5-triazine, 2,4,6-tris(2-hydroxy-3-methyl-4-methoxycarbonylpropyloxyphenyl)-1,3,5-triazine, 2,4,6-tris(2-hydroxy-3-methyl-4-ethoxycarbonylethyloxyphenyl)-1,3,5-triazine, and 2,4,6-tris(2-hydroxy-3-methyl-4-(1-(2-ethoxyhexyloxy)-1-oxopropane-2-yloxy)phenyl)-1,3,5-triazine.

Commercially available products such as Kemisorb 102 (produced by Chemipro Kasei Kaisha, Ltd.), LA-F70 (produced by Adeka Corporation), LA-46 (produced by Adeka Corporation), TINUVIN 405 (produced by BASF), TINUVIN 460 (produced by BASF), TINUVIN 479 (produced by BASF), and TINUVIN 1577FF (produced by BASF) may be used as the benzotriazine compounds.

Among these benzotriazine compounds, an ultraviolet absorber having a 2,4-bis(2,4-dimethylphenyl)-6-[2-hydroxy-4-(3-alkyloxy-2-hydroxy propyloxy)-5-α-cumylphenyl]-s-triazine framework ("alkyloxy" refers to a long chain alkyloxy group such as an octyloxy, nonyloxy, or decyloxy group) is more preferable in terms of having high compatibility with acrylic resins and excellent ultraviolet absorption properties.

Particularly from a viewpoint of compatibility with resins and volatility during heating, the ultraviolet absorber is preferably a benzotriazole compound having a molecular weight of 400 or more or a benzotriazine compound, and from a viewpoint of inhibiting decomposition of the ultraviolet absorber under heating during extrusion, the ultraviolet absorber is particularly preferably a benzotriazine compound.

The melting point (Tm) of the ultraviolet absorber is preferably 80° C. or higher, more preferably 100° C. or higher, even more preferably 130° C. or higher, and still more preferably 160° C. or higher.

When the ultraviolet absorber is heated from 23° C. to 260° C. at a rate of 20° C./min, the weight loss rate of the ultraviolet absorber is preferably 50% or less, more preferably 30% or less, even more preferably 15% or less, further preferably 10% or less, and even further preferably 5% or less.

One of such ultraviolet absorbers may be used alone, or two or more of such ultraviolet absorbers may be used in combination. By using two types of ultraviolet absorbers having different structures, ultraviolet light can be absorbed over a wider wavelength region.

The amount of the ultraviolet absorber is not specifically limited so long as the disclosed effects can be exhibited without impairing heat resistance, damp heat resistance, thermal stability, and molding properties. Nevertheless, the amount of the ultraviolet absorber relative to 100 mass % of the methacrylic resin is preferably 0.1 mass % to 5 mass %, more preferably 0.2 mass % to 4 mass %, even more preferably 0.25 mass % to 3 mass %, and still more preferably 0.3 mass % to 3 mass %. When the amount of the ultraviolet absorber is within one of the ranges set forth above, an excellent balance of ultraviolet light absorption performance, molding properties, and so forth can be obtained.

—Release Agent—

The methacrylic resin composition of the present embodiment may contain a release agent. Examples of the release agent include, but are not limited to, fatty acid esters, fatty acid amides, fatty acid metal salts, hydrocarbon based lubricants, alcohol based lubricants, polyalkylene glycols, carboxylic acid esters, and paraffin based mineral oils of and hydrocarbons.

Fatty acid esters that can be used as the release agent are not specifically limited, and may be conventionally known ones.

Examples of the fatty acid ester include ester compounds of a fatty acid having a carbon number of 12 to 32 such as lauric acid, palmitic acid, heptadecanoic acid, stearic acid, oleic acid, arachidic acid, behenic acid, etc., and a monovalent aliphatic alcohol such as palmityl alcohol, stearyl alcohol, behenyl alcohol, etc., or a multivalent aliphatic alcohol such as glycerin, pentaerythritol, dipentaerythritol, sorbitan, etc.; and complex ester compounds of a fatty acid, a polybasic organic acid, and a monovalent aliphatic alcohol or a multivalent aliphatic alcohol.

Examples of such a fatty acid ester include cetyl palmitate, butyl stearate, stearyl stearate, stearyl citrate, glycerin monocaprylate, glycerin monocaprate, glycerin monolaurate, glycerin monopalmitate, glycerin dipalmitate, glycerin monostearate, glycerin distearate, glycerin tristearate, glycerin monooleate, glycerin dioleate, glycerin trioleate, glycerin monolinoleate, glycerin monobehenate, glycerin mono (12-hydroxy) stearate, glycerin di(12-hydroxy) stearate, glycerin tri(12-hydroxy) stearate, glycerin diacetomonostearate, glycerin citric acid fatty acid ester, pentaerythritol adipic acid stearic acid ester, montanic acid partially saponified ester, pentaerythritol tetrastearate, dipentaerythritol hexastearate, and sorbitan tristearate.

One fatty acid ester may be used alone, or two or more fatty acid ester based lubricants may be used in combination.

Examples of commercially products include Rikemal series, Poem series, Rikester series, and Rikemaster series produced by Riken Vitamin Co., Ltd., Excel series, Rheodol series, Excepart series, and Coconad series produced by Kao Corporation. Specific examples include Rikemal S-100, Rikemal H-100, Poem V-100, Rikemal B-100, Rikemal HC-100, Rikemal S-200, Poem B-200, Rikester EW-200, Rikester EW-400, Excel S-95, and Rheodol MS-50.

Fatty acid amides are not specifically limited, and may be conventionally known ones.

Examples of the fatty acid amide include saturated fatty acid amides such as lauric acid amide, palmitic acid amide, stearic acid amide, behenic acid amide, and hydroxystearic acid amide; unsaturated fatty acid amides such as oleic acid amide, erucic acid amide, and ricinoleic acid amide; substituted amides such as N-stearyl stearic acid amide, N-oleyl oleic acid amide, N-stearyl oleic acid amide, N-oleyl stearic acid amide, N-stearyl erucic acid amide, and N-oleyl palmitic acid amide; methylol amides such as methylol stearic acid amide and methylol behenic acid amide; saturated fatty acid bisamides such as methylene-bis-stearic acid amide, ethylene-bis-capric acid amide, ethylene-bis-lauric acid amide, ethylene-bis-stearic acid amide (ethylene-bis-stearyl amide), ethylene-bis-isostearic acid amide, ethylene-bis-hydroxy stearic acid amide, ethylene-bis-behenic acid amide, hexamethylene-bis-stearic acid amide, hexamethylene-bis-behenic acid amide, hexamethylene-bis-hydroxy stearic acid amide, N,N'-distearyl adipic acid amide, and N,N'-distearyl sebacic acid amide; unsaturated fatty acid bisamides such as ethylene-bis-oleic acid amide, hexamethylene-bis-oleic acid amide, N,N'-dioleyl adipic acid amide, and N,N'-dioleyl sebacic acid amide; and aromatic bisamides such as m-xylylene-bis-stearic acid amide and N,N'-distearyl isophthalic acid amide.

One fatty acid amide based lubricant may be used individually, or two or more fatty acid ester based lubricants may be used together.

Examples of commercially available products include Diamid series (produced by Nippon Kasei Chemical Co., Ltd.), Amide series (produced by Nippon Kasei Chemical Co., Ltd.), Nikka Amide series (produced by Nippon Kasei Chemical Co., Ltd.), Methylol Amide series, Bisamide series, Slipax series (produced by Nippon Kasei Chemical Co., Ltd.), Kao Wax series (produced by Kao Corporation), Fatty Acid Amide series (produced by Kao Corporation), ethylene-bis-stearic acid amides (produced by Dainichi Chemical Industry Co., Ltd.), and so forth.

Fatty acid metallic salts refer to metallic salts of higher fatty acids. Examples include lithium stearate, magnesium stearate, calcium stearate, calcium laurate, calcium ricinoleate, strontium stearate, barium stearate, barium laurate, barium ricinoleate, zinc stearate, zinc laurate, zinc ricinoleate, zinc 2-ethylhexanoate, lead stearate, dibasic lead stearate, lead naphthenate, calcium 12-hydroxystearate, lithium 12-hydroxystearate, and so forth. Among these, from a viewpoint of excellent processability and extremely excellent transparency of the obtained transparent resin composition, calcium stearate, magnesium stearate, and zinc stearate are particularly preferable.

Commercially available products include SZ series, SC series, SM series, SA series and so forth produced by Sakai Chemical Industry Co., Ltd.

From a viewpoint of maintaining transparency, in a case where the fatty acid metallic salts are used, it is preferable that the amount of a fatty acid metallic salt is 0.2 mass % or less relative to 100 mass % of the methacrylic resin composition.

One release agent may be used alone, or two or more release agents may be used in combination.

A release agent that is used preferably has a decomposition start temperature of 200° C. or higher. The decomposition start temperature may be measured through a 1% mass loss temperature in TGA.

Although the content of the release agent can be any amount as long as an effect as a release agent can be obtained, and an excessive content may lead to problems such as bleed-out during processing. Accordingly, the content of the release agent is preferably 5 mass % or less, more preferably 3 mass % or less, even more preferably 1 mass % or less, further preferably 0.8 mass % or less, even further preferably 0.01 to 0.8 mass %, particularly preferably 0.01 to 0.5 mass % per 100 mass % of the methacrylic resin. The release agent is preferably added in an amount in any of the ranges set forth above, because deterioration of the transparency due to addition of the release agent is inhibited and poor release from the mold or adhesion to metal rolls tend to be inhibited during injection molding.

—Other Thermoplastic Resin—

The methacrylic resin composition of the present embodiment may contain a thermoplastic resin other than the methacrylic resin with the aim of adjusting the birefringence or improving the flexibility, so long as the objectives of the present disclosure are not impeded.

Examples of other thermoplastic resins include polyacrylates such as polybutyl acrylate; styrene polymers such as polystyrene, styrene-methyl methacrylate copolymer, styrene-butyl acrylate copolymer, styrene-acrylonitrile copolymer, and acrylonitrile-butadiene-styrene block copolymer; acrylic rubber particles having a three- or four-layer structure described in JP S59-202213 A, JP S63-27516 A, JP S51-129449 A, and JP S52-56150 A; rubbery polymers disclosed in JP S60-17406 B and JP H8-245854 A; and methacrylic rubber-containing graft copolymer particles obtained by multi-step polymerization described in WO 2014/002491 A1.

Among these other thermoplastic resins, from a viewpoint of obtaining good optical properties and mechanical properties, it is preferable to use a styrene-acrylonitrile copolymer or rubber-containing graft copolymer particles having a grafted portion in a surface layer thereof with a chemical composition that is compatible with the methacrylic resin including the structural unit (X) having a cyclic structure in the main chain thereof.

The average particle diameter of acrylic rubber particles, methacrylic rubber-containing graft copolymer particles, or a rubbery polymer such as described above is preferably 0.03 μm to 1 μm, and more preferably 0.05 μm to 0.5 μm from a viewpoint of improving impact strength, optical properties, and so forth of a film obtained using the composition of the present embodiment.

The content of other thermoplastic resin relative to 100 mass % of the methacrylic resin is preferably 0 mass % to 50 mass %, and more preferably 0 mass % to 25 mass %.

[Method of Producing Methacrylic Resin Composition]

No specific limitations are placed on the method by which the methacrylic resin composition of the present embodiment is produced other than being a method through which a composition that satisfies the requirements of this disclosure can be obtained. Examples includes, for example, a method of kneading using a kneading machine such as an extruder, a heating roller, a kneader, a roller mixer, or a Banbury mixer. Kneading by an extruder is preferable in terms of productivity. The kneading temperature may be set in accordance with the preferable processing temperature of the polymer forming the methacrylic resin and any other resins mixed therewith. As a guideline, the kneading temperature may be within a range of 140° C. to 300° C., and preferably a range of 180° C. to 280° C. Moreover, it is preferable that the extruder includes a vent port in order to reduce volatile content.

Here, the content of residual solvent (residual solvent content) in the methacrylic resin composition in the present embodiment is preferably less than 1000 ppm by mass, more preferably less than 800 ppm by mass, and even more preferably less than 700 ppm by mass.

Here, the "residual solvent" refers to a polymerization solvent (except for alcohols) that is used in polymerization and a solvent used to prepare a solution by redissolution of the resin obtained in the polymerization. Specific examples of the polymerization solvent include aromatic hydrocarbons such as toluene, xylene, ethylbenzene, and isopropylbenzene; ketones such as methyl isobutyl ketone, Butyl CELLOSOLVE, methyl ethyl ketone, and cyclohexanone; and polar solvents such as dimethylformamide and 2-methylpyrrolidone. Examples of the solvent used for redissolution include toluene, methyl ethyl ketone, and methylene chloride.

The content of residual alcohols (residual alcohol content) in the methacrylic resin composition in the present embodiment is preferably less than 500 ppm by mass, more preferably less than 400 ppm by mass, and even more preferably less than 350 ppm by mass.

Here, the "residual alcohols" refer to alcohols that are by-produced through cyclization condensation, and specific examples thereof include aliphatic alcohols such as methanol, ethanol, and isopropanol.

The residual solvent content and the residual alcohol content can be measured by gas chromatography.

Moreover, in a situation in which the methacrylic resin composition of the present embodiment is to be used in a film application or the like, the methacrylic resin composition is preferably produced by also using, for example, a filtration device such as a sintered filter, pleated filter, or leaf disk-type polymer filter having a filtration precision of 1.5 μm to 20 μm in one or more steps selected from a polymerization reaction step, a liquid-liquid separation step, a liquid-solid separation step, a devolatilization step, a pelletization step, and a molding step in order to reduce the amounts of contaminants.

Whichever method is selected, the composition is preferably produced after reducing the contents of oxygen and water as much as possible.

For example, the concentration of dissolved oxygen in a polymerization solution in solution polymerization is preferably less than 300 ppm in the polymerization step, and in a production method in which an extruder or the like is used, the oxygen concentration inside the extruder is preferably less than 1 volume %, and more preferably less than 0.8 volume %. The water content in the methacrylic resin is adjusted to preferably 1,000 ppm by mass or less, and more preferably 500 ppm by mass or less.

Values within any of the ranges set forth above are beneficial in terms that it becomes relatively easy to produce a composition that satisfies the requirements of this disclosure.

The glass transition temperature (Tg), the weight average molecular weight (Mw), the number average molecular weight (Mn), and the ratio of the amount of the methanol-soluble content to 100 mass % of the total amount of the methanol-soluble content and the methanol-insoluble content, the photoelastic coefficient $C_R$, and the emission intensity of the methacrylic resin composition may be the same as those described above for the methacrylic resin.

—Method of Producing Methacrylic Resin Shaped Article—

As the method of producing a shaped article (methacrylic resin shaped article) of the present disclosure, a wide variety of molding methods can be adopted such as extrusion molding, injection molding, compression molding, calendar molding, inflation molding, and blow molding.

Various shaped articles in which the methacrylic resin and the resin composition thereof of the present embodiment are used may be further subjected to surface functionalization treatment such as anti-reflection treatment, transparent conductive treatment, electromagnetic shielding treatment, or gas barrier treatment.

Various shaped articles including the methacrylic resin of the present embodiment or the resin composition thereof may be further subjected to surface functionalization treatment such as hard coating treatment, anti-reflection treatment, transparent conductive treatment, electromagnetic shielding treatment, or gas barrier treatment. Although there is no particular limitation on the thickness of such a functional layer, the thickness of the functional layer is typically in the range of 0.01 μm to 10 μm.

A hard coating layer to be applied on the surface is applied to the surface, for example, by applying a coating liquid containing a silicone-based curable resin, a curable resin containing organic polymer composite inorganic fine particles, or an acrylate such as urethane acrylate, epoxy acrylate, and a multifunctional acrylate, and a photopolymerization initiator dissolved or dispersed in an organic solvent, onto a film or sheet produced from the methacrylic resin composition of the present embodiment by a conventionally known coating method, followed by drying and photo-curing of the coating.

Furthermore, before application of a hard coating layer, a method for improving the adhesiveness may also be used in which an easy adhesion layer, a primer layer, an anchor layer, or the like having the composition containing inorganic fine particles is applied, followed by formation of the hard coating layer, for example.

The anti-glare layer to be applied on the surface is formed by preparing an ink of particles of silica, a melamine resin, an acrylic resin, or the like, and applying the ink on another functional layer by a conventionally known coating method to form a layer, which is then heat- or photo-cured.

Examples of the anti-reflection layer to be applied on the surface include a thin film of an inorganic substance such as a metal oxide, a fluoride, a silicide, a boride, a nitride, and a sulfide; and a single layer or a stack of multiple layers of resins having different refractive indices such as an acrylic resin and a fluororesin. Alternatively, a stack of thin layers including composite fine particles of an inorganic compound and an organic compound can also be used.

—Properties of Methacrylic Resin Shaped Article—

The methacrylic resin shaped article in the present embodiment has a yellowness index (YI) in an light path length of 80 mm of preferably 17.0 or less, more preferably 15.0 or less, and even more preferably 14.0 or less. When the YI in the light path length of 80 mm is within any of these ranges, it is possible to achieve a color tone which is suitable even for applications of shaped articles with long path lengths such as light guide plates.

Note that the YI can be measured according to JIS K 7373 using a long path length transmission spectrophotometer (ASA 1 manufactured by NIPPON DENSHOKU INDUSTRIES Co., Ltd.). More specifically, it can be measured by a method described in the subsequent EXAMPLES section.

—Applications of Methacrylic Resin Shaped Article—

Examples of applications of the methacrylic resin shaped article include applications to household products, office automation appliances, audiovisual apparatuses, electric components for batteries, lighting apparatuses, automotive parts, housings, sanitary products such as alternatives for sanitary pottery, and optical components.

Examples of automotive parts include tail lamps, meter covers, head lamps, light guide rods, lens, and front plates for car navigation systems. An automotive part of the present embodiment preferably include the above-described shaped article.

Examples of optical components include light guide plates, diffuser plates, polarizer protective films, quarter-wave plates, half-wave plates, viewing angle compensation films, liquid-crystal optical compensation films and other retardation films, display front plates, display base plates, lenses, touch panels, and the like used in displays such as liquid-crystal displays, plasma displays, organic EL displays, field emission displays, and rear projection televisions. Use in transparent base plates and the like of solar cells is also appropriate. Other possible applications include waveguides, lenses, optical fibers, optical fiber coating materials, LED lenses, lens covers, and so forth in the fields of optical communication systems, optical switching systems, optical measurement systems, or in optical products such as head mounted displays and liquid crystal projectors.

Moreover, use as a modifier for another resin is also possible.

EXAMPLES

The following provides a more specific description of the present disclosure through examples and comparative examples. This disclosure is not limited to these examples.

(1. Quantification of 2-Cyclohexylamino-N-Cyclohexylsuccinimide)

N-cyclohexylmaleimide or a solution of N-cyclohexylmaleimide in metaxylene was weighed out to prepare a 25-mass % N-cyclohexylmaleimide solution in metaxylene. Isopropyl benzoate was then added as an internal standard, and a measurement was made for making the determination using a gas chromatography system (GC-2014 manufactured by Shimadzu Corporation) under the following conditions:

Detector: FID

Column used: HP-5 ms

Measurement condition: The temperature was maintained to 80° C. for 5 minutes, raised to 300° C. at a heating rate of 10° C./minute, and then maintained for 5 minutes (2. Quantification of 2-Anilino-N-Phenylsuccinimide)

N-phenylmaleimide or a solution of N-phenylmaleimide in metaxylene was weighed out to prepare a 10-mass % N-phenylmaleimide solution in metaxylene. Isopropyl benzoate was then added as an internal standard, and a measurement was made for making the determination using a liquid chromatography system (UPLC H-Class manufactured by Waters Corporation) under the following conditions:

Detector: PDA (detection wavelength: 210 nm to 300 nm)

Column used: ACQUITY UPLC HSS T3

Column temperature: 40° C.

Mobile phase: 50% acetonitrile water solution containing 0.1% formic acid

Flow rate: 0.4 mL/min (3. Determination of Amount of Remaining N-Substituted Maleimide Monomer)

An analyte (polymerization solution after polymerization or methacrylic resin pellets) was sampled and weighed. This sample was then dissolved in chloroform to prepare a 5-mass % solution. Then n-decane was added as an internal standard, and a measurement was made for making the determination using a gas chromatography system (GC-2010 manufactured by Shimadzu Corporation) under the following conditions:
- Detector: FID
- Columns used: ZB-1
- Measurement condition: The temperature was maintained to 45° C. for 5 minutes, raised to 300° C. at a heating rate of 20° C./minute, and then maintained for 15 minutes (4. Analyses of Structural Units)

With regard to structural units in methacrylic resins produced in examples and comparative examples to be described later, unless otherwise specified, each structural unit included in methacrylic resins or methacrylic resin compositions was identified by $^1$H-NMR and $^{13}$C-NMR measurements, and the amount of the structural unit was calculated. The conditions for the $^1$H-NMR and $^{13}$C-NMR measurements were as follows.
- Measurement apparatus: DPX-400 manufactured by Bruker Corporation
- Measurement solvent: CDCl$_3$ or d$_6$-DMSO
- Measurement temperature: 40° C.

(5. Glass Transition Temperature)

The glass transition temperature (Tg) (° C.) of the methacrylic resin was measured according to JIS-K7121.

First, specimens were obtained by cutting approximately 10 mg from a sample at four points (four locations) after the sample had been conditioned (left for 1 week at 23° C.) in a standard state (23° C., 65% RH).

A DSC curve was then plotted using a differential scanning calorimeter (Diamond DSC manufactured by PerkinElmer Japan) under a nitrogen gas flow rate of 25 mL/min while heating the specimen from room temperature (23° C.) to 200° C. at 10° C./min (primary heating), holding the specimen at 200° C. for 5 minutes to completely melt the specimen, cooling the specimen from 200° C. to 40° C. at 10° C./min, holding the specimen at 40° C. for 5 minutes, and then reheating the specimen under the same heating conditions (secondary heating). The glass transition temperature (Tg) (° C.) was then measured as the intersection point (mid-point glass transition temperature) of a stair-shaped change section of the DSC curve during the secondary heating and a straight line that was equidistant in a vertical axis direction from each extrapolated baseline. Four points were measured per sample and the arithmetic mean (rounded to nearest whole number beyond the decimal point) was taken to be the measured value.

(6. Molecular Weights and Molecular Weight Distributions)

The weight average molecular weight (Mw), the number average molecular weight (Mn), and the Z-average molecular weight (Mz) of the methacrylic resins produced in the following examples and comparative examples were measured with the apparatus under the conditions as follows.
- Measurement apparatus: Gel permeation chromatograph (HLC-8320GPC) manufactured by Tosoh Corporation
- Measurement conditions
  - Columns: one TSK guard column Super H-H, two TSK gel Super HM-M, and one TSK gel Super H2500 connected in series in this order.
  - Column temperature: 40° C.
  - Developing solvent: tetrahydrofuran; flow rate: 0.6 mL/min; 0.1 g/L of 2,6-di-t-butyl-4-methylphenol (BHT) was added as internal standard
  - Detector: Differential refractive index (RI) detector, detection sensitivity: 3.0 mV/min
  - Sample: Solution of 0.02 g of methacrylic resin in 20 mL of tetrahydrofuran
  - Injection volume: 10 µL
  - Standard samples for calibration curve: Following 10 types of polymethyl methacrylate (PMMA Calibration Kit M-M-10 manufactured by Polymer Laboratories Ltd.) of differing molecular weight each having a known monodisperse weight peak molecular weight
  - Weight peak molecular weight (Mp)
    - Standard sample 1: 1,916,000
    - Standard sample 2: 625,500
    - Standard sample 3: 298,900
    - Standard sample 4: 138,600
    - Standard sample 5: 60,150
    - Standard sample 6: 27,600
    - Standard sample 7: 10,290
    - Standard sample 8: 5,000
    - Standard sample 9: 2,810
    - Standard sample 10: 850

The RI detection intensity relative to the elution time of the methacrylic resin was measured under the conditions listed above.

The weight average molecular weight (Mw), the number average molecular weight (Mn), and the Z-average molecular weight (Mz) of the methacrylic resin composition were determined based on calibration curves obtained through measurement of the calibration curve standard samples, and then molecular weight distributions (Mw/Mn and Mz/Mw) were calculated using the determined values.

(7. Photoelastic Coefficient)

Each of the methacrylic resins obtained in the examples and comparative examples was formed into a pressed film using a vacuum compression molding machine to obtain a measurement sample.

Specifically, the sample was prepared by using a vacuum compression molding machine (SFV-30 manufactured by Shinto Metal Industries Corporation) to pre-heat the resin for 10 minutes at 260° C. under vacuum (approximately 10 kPa) and subsequently compress the resin for 5 minutes at 260° C. and approximately 10 MPa, and by then releasing the vacuum and press pressure and transferring the resin to a compression molding machine for cooling in which the resin was cooled and solidified. The resultant pressed film was cured for at least 24 hours in a constant temperature and constant humidity chamber adjusted to a temperature of 23° C. and a humidity of 60%, and then a measurement specimen (thickness: approximately 150 µm, width: 6 mm) was cut out therefrom.

The photoelastic coefficient $C_R$ (Pa$^{-1}$) was measured using a birefringence measurement device that is described in detail in *Polymer Engineering and Science* 1999, 39, 2349-2357.

The film-shaped specimen was set in a film tensing device (manufactured by Imoto Machinery Co., Ltd.) set up in the same constant temperature and constant humidity chamber such that the chuck separation was 50 mm. Next, a birefringence measurement device (RETS-100 manufactured by Ostuka Electronics Co., Ltd.) was set up such that a laser light path of the device was positioned in a central portion of the film. The birefringence of the specimen was measured while applying tensile stress with a strain rate of 50%/min (chuck separation: 50 mm, chuck movement speed: 5 mm/min).

The photoelastic coefficient ($C_R$) (Pa$^{-1}$) was calculated by making a least squares approximation of the relationship between the absolute value (|Δn|) of the measured birefringence and the tensile stress ($\sigma_R$) and then determining the gradient of the resultant straight line. This calculation was performed using data in a tensile stress range of 2.5 MPa≤$\sigma_R$≤10 MPa.

$$C_R=|\Delta n|/\sigma_R$$

Note that the absolute value (|Δn|) of birefringence is a value indicated below.

$$|\Delta n|=|nx-ny|$$

(where nx is the refractive index in the stretching direction, and ny is the refractive index in the in-plane direction orthogonal to the stretching direction)

(8. Fluorescence Emission Intensity)

Each methacrylic resin obtained in the examples and comparative examples was weighed out and charged into a glass sample bottle. Chloroform was added, and the mixture was shaken for 30 minutes by a shaking apparatus at a rate of 800 times per minute to prepare a 2.0-mass % methacrylic resin solution in chloroform. Fluorescence emission intensities were evaluated using the following two techniques (i) and (ii).

(i) Fluorescein/ethanol solutions were prepared by varying the concentrations. A concentration-intensity conversion formula was produced from the concentrations of the fluorescein/ethanol solutions and fluorescence emission intensities at a wavelength of 514 nm obtained by spectroscopically analyzing these solutions using an excitation wavelength of 436 nm and a slit width of 2 nm. A fluorescence emission intensity was then measured by spectroscopically analyzing the 2.0-mass % methacrylic resin solution in chloroform, and was converted into an equivalent concentration of a fluorescein/ethanol solution using this formula.

Specifically, emission intensities at a wavelength of 514 nm of ethanol and fluorescein/ethanol solutions of 5×10$^{-8}$ mol/L and 1×10$^{-6}$ mol/L were measured (listed in Table 1) to produce a linear approximation line (illustrated in FIG. 1) from values corrected with the ethanol background (BG). This linear approximation line was used as a concentration-intensity conversion formula. This formula was used to convert an emission intensity of a 2.0-mass % methacrylic resin composition solution in chloroform to an equivalent concentration to make an evaluation.

(ii) Solutions were prepared by dissolving quinine sulfate dihydrate into a 1-mol/L dilute sulfuric acid in varying concentrations. A concentration-intensity conversion formula was produced from the concentrations of the quinine sulfate solutions and fluorescence emission intensities at a wavelength of 458 nm obtained by spectroscopically analyzing the solutions using an excitation wavelength of 365 nm and a slit width of 2 nm. The 2.0-mass % methacrylic resin solution in chloroform was then spectroscopically analyzed at a wavelength of 458 nm, and was converted into an equivalent concentration of a solution containing quinine sulfate dihydrate dissolved in the 1-mol/L dilute sulfuric acid using the concentration-intensity conversion formula.

Figure 2:
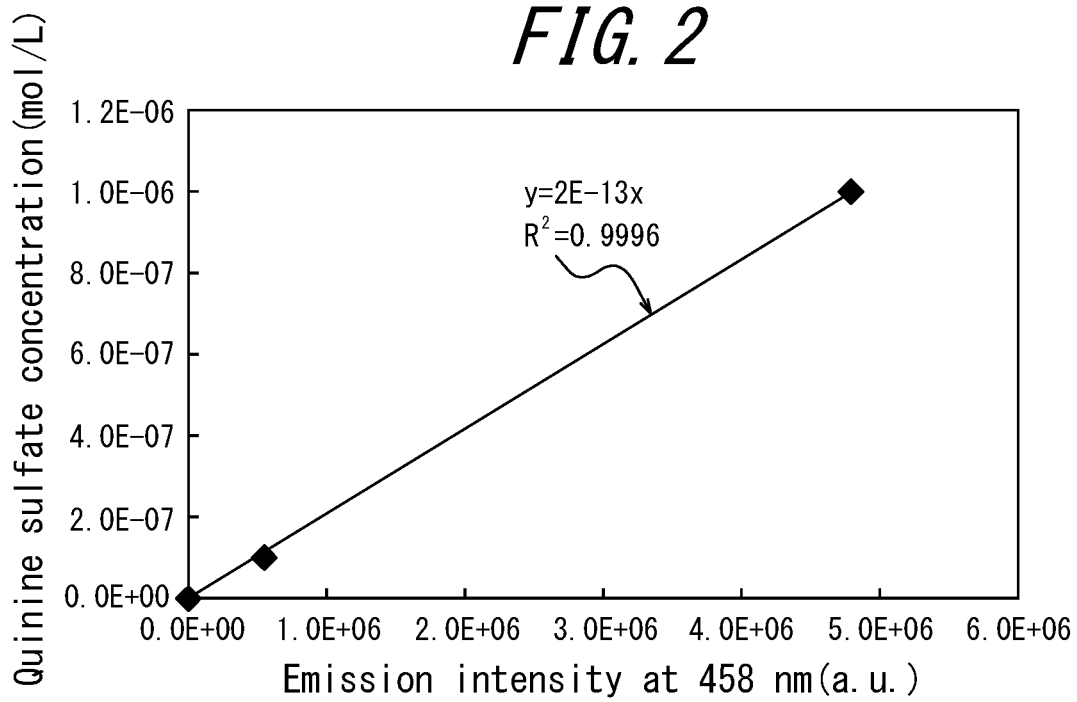
FIG. 2 is a diagram illustrating a concentration-intensity linear approximation line and a concentration-intensity conversion formula of a solution of quinine sulfate dihydrate dissolved in a 1-mol/L dilute sulfuric acid in the examples.

Specifically, emission intensities at the wavelength of 458 nm of the 1 mol/L dilute sulfuric acid and quinine sulfate dihydrate/dilute sulfuric acid solutions of 1×10$^{-7}$ mol/L and 1×10$^{-6}$ mol/L were measured (listed in Table 2) to produce a linear approximation line (illustrated in FIG. 2) from values corrected with the dilute sulfuric acid background (BG). This linear approximation line was used as a concentration-intensity conversion formula. This formula was used to convert an emission intensity of a 2.0-mass % methacrylic resin solution in chloroform into a concentration to make an evaluation.

Note that the fluorescence measurements were carried out by a fluorescence spectrophotometer (Fluorolog3-22 manufactured by Horiba Jobin Yvon S.A.S.) using a xenon lamp as a light source and a photomultiplier tube (PMT). Using a time constant of 0.2 s and the Sc/Rc measurement mode to normalize emission intensities with the excitation light intensity at each wavelength, the measurement was carried out as a 90° observation of a quartz cell with a light path length of 1 cm.

TABLE 1

| Fluorescein | Emission intensity at 514 nm (a.u.) | |
|---|---|---|
| concentration mol/L | Ethanol BG not corrected | Ethanol BG corrected |
| 0* | 3540.3 | 0.0 |
| 5 × 10$^{-8}$ | 415976.0 | 412435.7 |
| 1 × 10$^{-6}$ | 8077560.0 | 8074019.7 |

*Solvent (ethanol) was measured

TABLE 2

| Quinine sulfate | Emission intensity at 458 nm (a.u.) | |
|---|---|---|
| concentration mol/L | Dilute H$_2$SO$_4$ BG not corrected | Dilute H$_2$SO$_4$ BG corrected |
| 0* | 603.4 | 0.0 |
| 1 × 10$^{-7}$ | 553473.0 | 553473.0 |
| 1 × 10$^{-6}$ | 4793040.0 | 4793040.0 |

*Solvent (1-mol/L dilute H$_2$SO$_4$) was measured (9. Color Tone (YI) in Length Direction of Injection Shaped Article)

—Evaluation of Injection Molded Plate—

Injection molding was carried out using an injection molding machine (AUTO SHOT C Series MODEL 15A manufactured by FANUC CORPORATION) under the conditions of a cylinder temperature of 270° C. and a mold temperature of 70° C. to produce a strip-shaped specimen having a thickness of 3 mm, a width of 12 mm, and a length of 124 mm.

The produced formed piece was cut in the longitudinal direction into a piece in 80 mm long. Both end surfaces of this piece in the direction perpendicular to the longitudinal direction of the formed piece were polished using a polishing machine (PLA-BEAUTY manufactured by MEGAROTECHNICA CO., LTD.) at a cutter rotation speed of 8500 rpm and a feed rate of 1 m/min.

The YI in the length direction (light path length: 80 mm) of the polished formed piece was measured using a long path length transmission spectrophotometer (ASA1 manufactured by NIPPON DENSHOKU INDUSTRIES Co., Ltd.,). The YI was measured in a wavelength range of 380 mn to 780 nm according to JIS K 7373.

(10. YI of Solution)

A 20 w/v % chloroform solution of each methacrylic resin or formed piece produced in the examples and comparative examples was prepared as a measurement specimen (specifically, the solution was prepared by dissolving 10 g of the specimen into chloroform so as to obtain 50 mL of the solution). The transmittance was measured using an ultraviolet-visible spectrophotometer (UV-2500PC manufactured by Shimadzu Corporation) under the conditions of a measurement wavelength of 380 nm to 780 nm, a slit width of 2 nm, a field angle of view of 10° for a cell with a light path length of 10 cm, using a supplementary illuminant C and chloroform as a reference substance.

The yellowness index (YI) was calculated according to JIS K 7373 using the CIE 1931 color space from the following formula:

$$YI=100(1.2769X-1.0592Z)/Y$$

[Raw Materials]

Raw materials that were used in the subsequently described examples and comparative examples were as follows.

[[Monomers]]

methyl methacrylate (MMA) manufactured by Asahi Kasei Corporation

N-phenylmaleimide (phMI; mass ratio of 2-anilino-N-phenylsuccinimide (APSI) to the mass of phMI: 60 ppm by mass) manufactured by Nippon Shokubai Co., Ltd.

N-cyclohexylmaleimide (chMI; mass ratio of 2-cyclohexylamino-N-cyclohexylsuccinimide (CCSI) to the mass of chMI: 80 ppm by mass) manufactured by Nippon Shokubai Co., Ltd.

Styrene manufactured by Asahi Kasei Co., Ltd.

—Water Washing and Dehydration Steps for N-Substituted Maleimide—

By the following water washing method, 2-amino-N-substituted succinimide was removed, and contained water was removed by the following dehydration method.

—Water Washing and Dehydrations Step for N-Cyclohexylmaleimide—

—Reduction of CCSI in N-Cyclohexylmaleimide to 5 ppm by Mass or Less—

A 2.0 m³-glass lined reactor equipped with a temperature controller functioning through use of a jacket and three retreating blades as stirring blades were charged with 250.0 kg of chMI and 750.0 kg of metaxylene (hereinafter referred to as "mXy") after they were weighed out. Steam was then blown into the jacket to raise the temperature of the solution in the reactor to 56° C., and the solution was stirred to yield an organic layer. Then, 350.0 kg of a 2-mass % water solution of sulfuric acid was weighed out and charged into the reactor, and the solution was stirred at 100 rpm for 10 minutes while the temperature of the solution was kept at 56° C. After stirring was stopped, the solution was allowed to stand for 10 minutes. The water layer was then drained to a metal barrel.

The same procedure was repeated twice, and the operation to wash the organic layer with the water solution of sulfuric acid was carried out three times in total. The content of CCSI in the organic layer was quantified by gas chromatography to be 4.9 ppm by mass relative to chMI in the organic layer.

Thereafter, 350.0 kg of ion exchanged water was charged into the reactor, and the solution was stirred at 100 rpm for 10 minutes while the temperature of the solution was kept at 55° C. After stirring was stopped, the solution was allowed to stand for 20 minutes. The water layer was then drained to a metal barrel.

The same operation was repeated once again, and the operation to wash the organic layer with ion exchanged water was carried out twice in total. The content of CCSI in the organic layer was quantified by gas chromatography to be 4.6 ppm by mass relative to chMI in the organic layer. The temperature of the solution was kept at 50° C., and the pressure inside the reactor was gradually reduced to 5 kPa while the solution was stirred at 100 rpm. Thereafter, the temperature of the solution was raised to 60° C. to perform an azeotropic dehydration operation. After 131.6 kg of water/mXy mixture liquid was distilled off, the water concentration in the organic layer was quantified by a Karl Fischer moisture meter to be 102 ppm by mass relative to the mass of the organic phase.

To the organic layer, mXy was added for adjusting the concentration to yield 1034.3 kg of the organic layer containing 24.0 mass % of chMI, having a water concentration of 191 ppm by mass, and containing 4.6 ppm by mass of CCSI relative to the mass of chMI.

—Reduction of CCSI in N-Cyclohexylmaleimide to 1 ppm by Mass or Less—

A 0.5 m³-glass lined reactor equipped with a temperature controller functioning through use of a jacket and FULL-ZONE manufactured of KOBELCO ECO-SOLUTIONS Co., Ltd. as stirring blades were charged with 80.0 kg of chMI and 240.0 kg of metaxylene (hereinafter referred to as "mXy") after they were weighed out. Steam was then blown into the jacket to raise the temperature of the solution in the reactor to 55° C., and the solution was stirred to yield an organic layer. Then, 112.0 kg of a 2-mass % water solution of sulfuric acid was weighed out and charged into the reactor, and the solution was stirred at 100 rpm for 30 minutes while the temperature of the solution was kept at 55° C. After stirring was stopped, the solution was allowed to stand for 10 minutes. The water layer was then drained to a metal barrel.

The same procedure was repeated three times, and the operation to wash the organic layer with the water solution of sulfuric acid was carried out four times in total. The content of CCSI in the organic layer was quantified by gas chromatography to be 0.57 ppm by mass relative to chMI in the organic layer.

Thereafter, 112.0 kg of ion exchanged water was charged into the reactor, and the solution was stirred at 100 rpm for 30 minutes while the temperature of the solution was kept at 55° C. After stirring was stopped, the solution was allowed to stand for 10 minutes. The water layer was then drained to a metal barrel.

The temperature of the solution was kept at 50° C., and the pressure inside the reactor was gradually reduced to 5 kPa while the solution was stirred at 100 rpm. Thereafter, the temperature of the solution was raised to 60° C. to perform an azeotropic dehydration operation. After 54 kg of water/mXy mixture liquid was distilled off, the water concentration in the organic layer was quantified by a Karl Fischer moisture meter to be 46 ppm by mass relative to the mass of the organic phase.

To the organic layer, mXy was added for adjusting the concentration to yield 384.0 kg of the organic layer containing 20.3 mass % of chMI, having a water concentration of 125 ppm by mass, and containing 0.60 ppm by mass of CCSI relative to the mass of chMI.

—Water Washing and Dehydration Steps for N-Phenylmaleimide—

—Reduction of APSI in N-Phenylmaleimide to 5 ppm by Mass or Less—

A 2.0 m³-glass lined reactor equipped with a temperature controller functioning through use of a jacket and three retreating blades as stirring blades were charged with 150.0 kg of phMI and 720.0 kg of mXy after they were weighed out. Steam was then blown into the jacket to raise the temperature of the solution in the reactor to 55° C., and the solution was stirred to yield an organic layer. Then, 336.0 kg of a 7-mass % water solution of sodium bicarbonate was weighed out and charged into the reactor, and the solution was stirred at 100 rpm for 10 minutes while the temperature of the solution was kept to 55° C. After stirring was stopped, the solution was allowed to stand for 10 minutes. The water layer was then drained to a metal barrel.

Thereafter, 336.0 kg of ion exchanged water was charged into the reactor, and the solution was stirred at 100 rpm for 10 minutes while the temperature of the solution was kept at 55° C. After stirring was stopped, the solution was allowed to stand for 10 minutes. The water layer was then drained to a metal barrel.

Then, 336.0 kg of a 2-mass % water solution of sulfuric acid was weighed out and charged into the reactor, and the solution was stirred at 100 rpm for 10 minutes while the temperature of the solution was kept at 55° C. After stirring was stopped, the solution was allowed to stand for 10 minutes. The water layer was then drained to a metal barrel.

The operation of washing with ion exchanged water was repeated twice in the same manner as described above.

The content of APSI in the organic layer was quantified by liquid chromatography to be 3.6 ppm by mass relative to the mass of phMI in the organic layer.

The temperature of the solution was kept at 50° C., and the pressure inside the reactor was gradually reduced to 5 kPa while the solution was stirred at 100 rpm. Thereafter, the temperature of the solution was raised to 55° C. to perform an azeotropic dehydration operation. After 190 kg of water/mXy mixture liquid was distilled off, the water concentration in the organic layer was quantified by a Karl Fischer moisture meter to be 47 ppm by mass relative to the mass of the organic phase.

To the organic layer, mXy was added for adjusting the concentration to yield 1340.7 kg of the organic layer containing 10.8 mass % of phMI, having a water concentration of 170 ppm by mass, and containing 3.4 ppm by mass of APSI relative to the mass of phMI.

—Reduction of APSI in N-Phenylmaleimide to 1 ppm by Mass or Less—

A 0.5 m$^3$-glass lined reactor equipped with a temperature controller functioning through use of a jacket and FULL-ZONE manufactured of KOBELCO ECO-SOLUTIONS Co., Ltd. as stirring blades were charged with 50.0 kg of phMI and 240.0 kg of mXy after they were weighed out. Steam was then blown into the jacket to raise the temperature of the solution in the reactor to 55° C., and the solution was stirred to yield an organic layer. Then, 112.0 kg of a 7-mass % water solution of sodium bicarbonate was weighed out and charged into the reactor, and the solution was stirred at 100 rpm for 15 minutes while the temperature of the solution was kept to 55° C. After stirring was stopped, the solution was allowed to stand for 10 minutes. The water layer was then drained to a metal barrel. The same operation was repeated once again, and the operation to wash the organic layer with a water solution of sodium bicarbonate was performed twice in total.

Thereafter, 112.0 kg of ion exchanged water was charged into the reactor, and the solution was stirred at 100 rpm for 30 minutes while the temperature of the solution was kept at 55° C. After stirring was stopped, the solution was allowed to stand for 10 minutes. The water layer was then drained to a metal barrel.

Then, 112.0 kg of a 2-mass % water solution of sulfuric acid was weighed out and charged into the reactor, and the solution was stirred at 100 rpm for 30 minutes while the temperature of the solution was kept at 55° C. After stirring was stopped, the solution was allowed to stand for 10 minutes. The water layer was then drained to a metal barrel. The same procedure was repeated twice, and the operation to wash the organic layer with the water solution of sulfuric acid was carried out three times in total.

The operation of washing with ion exchanged water was repeated twice in the same manner as described above.

The content of APSI in the organic layer was quantified by liquid chromatography to be 0.37 ppm by mass relative to the mass of phMI in the organic layer.

The temperature of the solution was kept at 50° C., and the pressure inside the reactor was gradually reduced to 5 kPa while the solution was stirred at 100 rpm. Thereafter, the temperature of the solution was raised to 55° C. to perform an azeotropic dehydration operation. After 72 kg of water/mXy mixture liquid was distilled off, the water concentration in the organic layer was quantified by a Karl Fischer moisture meter to be 60 ppm by mass relative to the mass of the organic phase.

To the organic layer, mXy was added for adjusting the concentration to yield 432.8 kg of the organic layer containing 10.3 mass % of phMI, having a water concentration of 180 ppm by mass, and containing 0.42 ppm by mass of APSI relative to the mass of phMI.

[[Polymerization Initiator]]
1,1-di(t-butylperoxy)cyclohexane: PERHEXA C manufactured by NOF Corporation

[[Chain Transfer Agent]]
n-octylmercaptan manufactured by Kao Corporation

[[Hindered Phenol Antioxidant]]
Irganox 1076 (manufactured by BASF)

[[Sulfuric Antioxidant]]
Irgafos 168 (melting point 180° C. to 190° C.): manufactured by BASF Example 1

After 508.7 kg of the 10.3-mass % phMI solution in metaxylene (hereinafter referred to as "mXy") (containing 0.42 ppm by mass of APSI) which had been subjected to the water washing and dehydration steps by repeating above-mentioned steps multiple times was weighed, the solution was charged into a 1.25 m$^3$-reactor equipped with a temperature controller functioning through use of a jacket and a stirring blade as stirring blades. While the solution was stirred, 312.8 kg of mXy was distilled off at a temperature of 60° C. under reduced pressure inside the reactor of 5 kPa. Thereafter, the reaction chamber was returned to normal pressure, and was charged with 81.8 kg of the 20.3-mass % of chMI solution in mXy (containing 0.60 ppm by mass of CCSI) which had been subjected to the water washing and dehydration steps and 38.3 kg of mXy. Further, 326.1 kg of MMA and 0.66 kg of n-octylmercaptan as a chain transfer agent were weighed and placed, and the solution was stirred to prepare a mixed monomer solution.

Then, 123.0 kg of mXy was weighed and added to a first tank.

Further, a mixed monomer solution for subsequent addition was prepared by weighing out 165.0 kg of MMA and 80.0 kg of mXy, charging these materials into a second tank, and then stirring these materials.

The liquid contained in the reactor was subjected to 1 hour of nitrogen bubbling at a rate of 30 L/min, and the liquid in each of the first and second tanks was subjected to 30 minutes of nitrogen bubbling at a rate of 10 L/min, to remove dissolved oxygen.

Thereafter, the temperature of the solution in the reactor was raised to 124° C. by blowing steam into the jacket, and then the contents of the reactor were stirred at 50 rpm while adding a polymerization initiator solution containing 0.35 kg of 1,1-di(t-butylperoxy)cyclohexane dissolved in 3.025 kg of mXy at a rate of 1 kg/hour to initiate polymerization. In addition, the mixed monomer solution for subsequent addition was added from the first tank over 4 hours at 30.75 kg/hour.

The temperature of the solution inside the reactor during polymerization was controlled to 124±2° C. through temperature adjustment using the jacket.

The monomer solution containing MMA was then added from the second tank at a rate of 122.5 kg/hour during a time duration between 4 hours and 6 hours thereafter.

Moreover, the addition rate of the initiator solution was reduced to 0.25 kg/hour, 0.75 kg/hour, and 0.5 kg/hour after 0.5 hours, 4 hours, and 6 hours had passed after the start of polymerization, respectively, and the addition was stopped after 7 hours had passed after the start of polymerization. The polymerization reaction was continued for further 3 hours to yield a polymerization solution containing a methacrylic resin having a cyclic structure in the main chain thereof.

An evaluation of the contents of N-substituted maleimides contained in the produced polymerization solution revealed that 340 ppm by mass of phMI and 120 ppm by mass of chMI were contained.

To the polymerization solution under stirring, 0.1 mass % of Irganox 1076 and 0.05 mass % of Irgafos 168 were added relative to 100 mass % of polymer contained in the solution.

The polymerization solution containing the antioxidants was filtrated through a filter having a filtration accuracy of 2 μm composed of SUS 316L metal fibers.

The polymerized product was collected from the polymerization solution using, as an apparatus used for the devolatilization step, a devolatilization apparatus which was composed of a flat plate heat exchanger having a flat plate slit channel and a heat medium channel, and a decompression vessel provided with a SUS heating medium jacket having an inner volume of about 0.3 m$^3$ (hereinafter referred to as a "devolatilization tank"), and had no rotating part.

The solution containing the polymerized product obtained through the polymerization was fed to the heat exchanger disposed in the upper part of the decompression vessel at a rate of 30 liters/hour, heated to 260° C., and then fed to the devolatilization tank heated to an internal temperature of 260° C. and evacuated to a degree of vacuum of 30 Torr to subject the solution to a devolatilization process. The shear rate in the devolatilization apparatus was calculated to be 5.3 s$^-$ from the shape of the apparatus and the operating conditions.

The polymerized product subjected to devolatilization was pressurized from the lower part of the devolatilization tank by a gear pump, extruded from a strand die, water cooled, and then pelletized to obtain methacrylic resin composition pellets.

It was confirmed that the chemical composition of the obtained pelletized polymerized product comprised structural units derived from the monomers MMA, phMI, and chMI in proportions of 88.1 mass %, 9.0 mass %, and 2.9 mass %, respectively. The weight average molecular weight was 102,000, and Mw/Mn was 2.12. The other physical properties are summarized in Table 3.

Example 2

A mixed solution of 39.6 kg of phMI, 59.5 kg of chMI, and 247.0 kg of mXy was prepared through a procedure similar to that in Example 1 from the 10.3-mass % of phMI solution in mXy (containing 0.42 ppm by mass of APSI) and the 20.3-mass % chMI solution in mXy (containing 0.60 ppm by mass of CCSI) which had been subjected to the water washing and dehydration steps. To this solution, 296.0 kg of MMA and 0.390 kg of n-octylmercaptan were charged to prepare a mixed monomer solution, and methacrylic resin composition pellets were then produced in the same manner as in Example 1

Note that an evaluation of the contents of N-substituted maleimides contained in the produced polymerization solution revealed that 80 ppm by mass of phMI and 460 ppm by mass of chMI were contained.

It was confirmed that the chemical composition of the obtained pelletized polymerized product comprised structural units derived from the monomers MMA, phMI, and chMI in proportions of 83.1 mass %, 6.8 mass %, and 10.1 mass %, respectively. The weight average molecular weight was 151,000, and Mw/Mn was 2.14. The other physical properties are summarized in Table 3.

Example 3

A mixed solution of 5.6 kg of phMI, 187.2 kg of chMI, and 247.0 kg of mXy was prepared through a procedure similar to that in Example 1 from the 10.3-mass % of phMI solution in mXy (containing 0.42 ppm by mass of APSI) and the 20.3-mass % chMI solution in mXy (containing 0.60 ppm by mass of CCSI) which had been subjected to the water washing and dehydration steps. To this solution, 184.2 kg of MMA, 53.1 kg of styrene, and 0.280 kg of n-octylmercaptan were charged to prepare a mixed monomer solution.

Then, 123.0 kg of mXy was weighed and added to a first tank.

Further, a mixed monomer solution for subsequent addition was prepared by weighing out 130.0 kg of MMA and 80.0 kg of mXy, charging these materials into a second tank, and then stirring these materials.

Thereafter, methacrylic resin composition pellets were produced in the same manner as in Example 1

Note that an evaluation of the contents of N-substituted maleimides contained in the produced polymerization solution revealed that 30 ppm by mass of phMI and 250 ppm by mass of chMI were contained.

It was confirmed that the chemical composition of the obtained pelletized polymerized product comprised structural units derived from the monomers MMA, phMI, chMI, and styrene in proportions of 57.2 mass %, 0.8 mass %, 33.0 mass %, and 9.0 mass %, respectively. The weight average molecular weight was 130,000, Mw/Mn was 2.33, and the glass transition temperature was 150° C. The other physical properties are summarized in Table 3.

Example 4

A mixed solution of 52.4 kg of phMI, 16.6 kg of chMI, and 450.0 kg of mXy was prepared through a procedure similar to that in Example 1 from the 10.3-mass % of phMI solution in mXy (containing 0.42 ppm by mass of APSI) and the 20.3-mass % chMI solution in mXy (containing 0.60 ppm by mass of CCSI) which had been subjected to the water washing and dehydration steps. To this solution, 491.1 kg of MMA and 0.660 kg of n-octylmercaptan were charged to prepare a mixed monomer solution.

The liquid contained in the reactor was subjected to 1 hour of nitrogen bubbling at a rate of 30 L/min to remove dissolved oxygen.

Thereafter, the temperature of the solution in the reactor was raised to 124° C. by blowing steam into the jacket, and then the contents of the reactor were stirred at 50 rpm while adding a polymerization initiator solution prepared by dissolving 0.23 kg of 1,1-di(t-butylperoxy)cyclohexane in 1.82 kg of mXy at a rate of 1 kg/hour to initiate polymerization. Moreover, the addition rate of the initiator solution was reduced to 0.5 kg/hour, 0.42 kg/hour, 0.35 kg/hour, 0.14 kg/hour, and 0.13 kg/hour after 0.5 hours, 1 hour, 2 hours, 3 hours, and 4 hours had passed after the start of polymerization, respectively, and the addition was stopped after 7 hours had passed after the start of polymerization.

The temperature of the solution inside the reactor during polymerization was controlled to 124±2° C. through temperature adjustment using the jacket.

A polymerization solution containing a methacrylic resin having a cyclic structure in the main chain thereof was obtained after 15 hours from the start of polymerization.

An evaluation of the contents of N-substituted maleimides contained in the produced polymerization solution revealed that 6300 ppm by mass of phMI and 2150 ppm by mass of chMI were contained.

To the polymerization solution under stirring, 0.1 mass % of Irganox 1076 and 0.05 mass % of Irgafos 168 were added relative to 100 mass % of polymer contained in the solution.

This polymerization solution containing the antioxidants was filtrated through a filter having a filtration accuracy of 2 μm composed of SUS 316L metal fibers.

The polymerized product was collected from the polymerization solution using, as an apparatus used for the devolatilization step, a devolatilization apparatus which was composed of a flat plate heat exchanger having a flat plate slit channel and a heat medium channel, and a decompression vessel provided with a SUS heating medium jacket having an inner volume of about 0.3 $m^3$ (hereinafter referred to as a "devolatilization tank"), and had no rotating part.

The solution containing the polymerized product obtained through the polymerization was fed to the heat exchanger disposed in the upper part of the decompression vessel at a rate of 30 liters/hour, heated to 260° C., and then fed to the devolatilization tank heated to an internal temperature of 260° C. and evacuated to a degree of vacuum of 30 Torr to subject the solution to a devolatilization process. The shear rate in the devolatilization apparatus was calculated to be 5.3 $s^-$ from the shape of the apparatus and the operating conditions.

The polymerized product subjected to devolatilization was pressurized from the lower part of the devolatilization tank by a gear pump, extruded from a strand die, water cooled, and then pelletized to obtain methacrylic resin composition pellets.

It was confirmed that the chemical composition of the obtained pelletized polymerized product comprised structural units derived from the monomers MMA, phMI, and chMI in proportions of 88.3 mass %, 9.0 mass %, and 2.7 mass %, respectively. The weight average molecular weight was 113,000, Mw/Mn was 2.25, and the glass transition temperature was 135° C. The other physical properties are summarized in Table 3.

Example 5

Methacrylic resin composition pellets having a cyclic structure in the main chain thereof were produced through operations similar to those in Example 1 from the 10.8-mass % phMI solution in mXy (containing 3.4 ppm by mass of APSI) and the 24.0-mass % chMI solution in mXy (containing 4.6 ppm by mass of CCSI) which has been subjected to the water washing and dehydration steps, except that the weights of mXy to be distilled off under reduced pressure and the weight of mXy to be added thereafter were changed so that the concentrations of monomers in the mixed monomer solution matched those in Example 1.

Note that an evaluation of the contents of N-substituted maleimides contained in the produced polymerization solution revealed that 320 ppm by mass of phMI and 110 ppm by mass of chMI were contained.

It was confirmed that the chemical composition of the obtained pelletized polymerized product comprised structural units derived from the monomers MMA, phMI, and chMI in proportions of 88.1 mass %, 9.1 mass %, and 2.8 mass %, respectively. The weight average molecular weight was 102,000, Mw/Mn was 2.13, and the glass transition temperature was 132° C. The other physical properties are summarized in Table 3.

Example 6

On both sides of the injection molded plate produced in Example 1, Acier E50PG manufactured by Nidek Co., Ltd. was sprayed. The coats were then dried and irradiated with ultraviolet light of about 1000 mJ/$cm^2$ using a high-pressure mercury lamp to thereby form hard coating layers with a thickness of about 3 μm. Anti-reflection layers were then formed by depositing $TiO_2$ (film thickness: 12 nm), $SiO_2$ (film thickness: 37 nm), $TiO_2$ (film thickness: 117 nm), and $SiO_2$ (film thickness: 88 nm) in this order, by the vacuum evaporation.

The total light transmittance of the injection molded plate produced in Example 1 was 91.7%, whereas the injection molded plate provided with hard coating layers and the anti-reflection layers had a favorable total light transmittance of 97.4%.

When a cross-cut test was performed according to JIS K5600-5-6, no peeling of the hard coating layers was observed.

Next, the injection molded plate provided with the hard coating layers and the anti-reflection layers formed thereon was placed in a constant temperature and humidity bath at a temperature of 80° C. and a relative humidity of 80% for 500 hours. Thereafter, the total light transmittance was measured and a cross-cut test was performed in the similar manner. No changes were observed from the injection molded plate before the constant temperature and humidity test.

Example 7

After 400.3 kg of MMA, 100.2 kg of styrene, 0.396 kg of n-dodecylmercaptan (which was equivalent to 800 ppm by mass relative to the total mass of all monomers charged into the polymerization system), and 500.4 kg of toluene were weighed out, the mixture was charged to a 1.25-$m^3$ reactor equipped with a temperature controller functioning through use of a jacket and a stirring blade and stirred to yield a mixed monomer solution.

Next, The liquid contained in the reactor was then subjected to 1 hour of nitrogen bubbling at a rate of 30 L/min to remove dissolved oxygen.

Thereafter, the temperature of the solution in the reactor was raised to 120° C. by blowing steam into the jacket, and then the contents of the reactor were stirred at 50 rpm while adding a polymerization initiator solution containing 0.253 kg of 1,1-di(t-amylperoxy)cyclohexane dissolved in 4.748 kg of mXy for 5 hours at a rate of 1.0 kg/hour to initiate polymerization. In this manner, the polymerization initiator was not added at the initial stage, but added at a constant addition rate for predetermined time.

The temperature of the solution inside the reactor during polymerization was controlled to 120±2° C. through temperature adjustment using the jacket.

The polymerization solution was sampled after 6 hours from the start of the polymerization to determine the polymerization conversion ratio from the concentration of residual monomers. Because the polymerization conversion ratio was determined to be 96%, that point in time was determined as the end point of the polymerization (that is, the polymerization time was 6 hours).

Thereafter, 250 kg of toluene was added to dilute the polymerization solution. The liquid temperature was then lowered to 50° C. after the end of the polymerization.

Thereafter, a mixed solution containing 165 kg of monomethylamine and 165 kg of methanol was added dropwise into the reactor at room temperature. The temperature of the liquid was then increased to 190° C., and the liquid was stirred under an increased pressure for 2 hour to cause a glutarimide cyclization reaction to proceed. The temperature of the liquid was lowered to 110° C., and the pressure inside the reactor was reduced to a reduced pressure to distill off unreacted monomethylamine and methanol, and a part of toluene to obtain a solution containing about 50 mass % of glutarimide cyclized methacrylic polymer in toluene.

To the polymerization solution under stirring, 0.1 mass % of Irganox 1010 and 0.05 mass % of Irgafos 168 were added relative to 100 mass % of polymer contained in the solution.

The polymerization solution containing the antioxidants was filtrated through a filter having a filtration accuracy of 2 μm composed of SUS 316L metal fibers.

The polymerized product was collected from the polymerization solution using, as an apparatus used for the devolatilization step, a devolatilization apparatus which was composed of a flat plate heat exchanger having a flat plate slit channel and a heat medium channel, and a decompression vessel provided with a SUS heating medium jacket having an inner volume of about 0.3 m$^3$ (hereinafter referred to as a "devolatilization tank"), and had no rotating part.

The solution containing the polymerized products obtained through the polymerization was fed to the heat exchanger disposed in the upper part of the decompression vessel at a rate of 30 liters/hour, heated to 250° C., and then fed to the devolatilization tank heated at an internal temperature of 250° C. and evacuated to a degree of vacuum of 30 Torr to subject the solution to a devolatilization process. The shear rate in the devolatilization apparatus was calculated to be 5.3 s$^{-1}$ from the shape of the apparatus and the operating conditions.

The polymerized product subjected to devolatilization was then pressurized by a gear pump from the lower part of the devolatilization tank, extruded from a strand die, water cooled, and subsequently pelletized to obtain a methacrylic resin including a glutarimide-based structural unit.

Example 8

A methacrylic resin having a glutarimide-based structural unit was produced in the same manner as in Example 7, except that the liquid temperature during the glutarimide cyclization reaction was changed from 190° C. to 220° C.

Comparative Example 1

A mixed solution of 39.6 kg of phMI, 59.7 kg of chMI, and 236.9 kg of mXy was prepared through a procedure similar to that in Example 1 from the 10.3-mass % of phMI solution in mXy (containing 0.42 ppm by mass of APSI) and the 20.3-mass % chMI solution in mXy (containing 0.60 ppm by mass of CCSI) which had been subjected to the water washing and dehydration steps. To this solution, 340.7 kg of MMA and 0.275 kg of n-octylmercaptan were charged to prepare a mixed monomer solution.

Then, 123.1 kg of mXy was weighed in the first tank as a solvent for subsequent addition.

Further, 110.0 kg of MMA and 90.0 kg of mXy were weighed in the second tank, and mixed and stirred to prepare an MMA solution for subsequent addition.

The liquid contained in the reactor was subjected to 1 hour of nitrogen bubbling at a rate of 30 L/min, and the liquid in each of the first and second tanks was subjected to 30 minutes of nitrogen bubbling at a rate of 10 L/min, to remove dissolved oxygen.

Thereafter, the temperature of the solution in the reactor was raised to 128° C. by blowing steam into the jacket, and then the contents of the reactor were stirred at 50 rpm while adding a polymerization initiator solution containing 0.371 kg of 1,1-di(t-butylperoxy)cyclohexane dissolved in 3.004 kg of mXy at a rate of 1 kg/hour to initiate polymerization.

The temperature of the solution inside the reactor during polymerization was controlled to 128±2° C. through temperature adjustment using the jacket. The rate to add the initiator solution was reduced to 0.25 kg/hour after 30 minutes from the start of polymerization, and mXy was added from the first tank over 3.5 hours at 30.78 kg/hour.

The rate to add the initiator solution was then increased to 0.75 kg/hour after 4 hours from the start of polymerization, and the MMA solution for subsequent addition was added at 100 kg/hour for 2 hours from the second tank.

Moreover, the rate to add the initiator solution was reduced to 0.5 kg/hour after 6 hours from the start of polymerization, and addition was stopped after 7 hours from the start of polymerization.

After 8 hours from the start of polymerization, a polymer solution containing a methacrylic resin was yielded.

An evaluation of the contents of N-substituted maleimides contained in the produced polymerization solution revealed that 240 ppm by mass of phMI and 1010 ppm by mass of chMI were contained.

Next, the resultant polymer solution was introduced to a twin screw extruder provided with a plurality of vent ports for devolatilization, to thereby perform devolatilization. The conditions in the twin screw extruder were a feed rate of the resultant copolymer solution of 10 kg/hour in terms of resin, a barrel temperature of 260° C., a screw rotation speed of 150 rpm, and a degree of vacuum of 10 Torr to 40 Torr. The resin subjected to devolatilization in the twin screw extruder was extruded from a strand die, water cooled, and then pelletized to produce a methacrylic resin. The shear rate in the devolatilization apparatus was calculated to be 80 s$^-$ from the shape of the apparatus and the operating conditions.

It was confirmed that the chemical composition of the obtained pelletized polymerized product comprised structural units derived from the monomers MMA, phMI, and chMI in proportions of 80.9 mass %, 7.7 mass %, and 11.4 mass %, respectively. The weight average molecular weight was 149,000, and Mw/Mn was 2.26. The other physical properties are summarized in Table 3.

Comparative Example 2

A mixed monomer solution was prepared by weighing out 335.5 kg of MMA, 37.4 kg of phMI (commercially available product was used as it was without being purified), 67.1 kg of chMI (commercially available product was used as it was without being purified), 0.300 kg of n-octylmercaptan as a chain transfer agent, and 236.9 kg of mXy, charging these materials into a 1.25-m³ reactor equipped with a temperature controller functioning through use of a jacket and a stirring blade, and then stirring these materials.

Then, 123.1 kg of mXy was weighed in the first tank as a solvent for subsequent addition.

Further, 110.0 kg of MMA and 90.0 kg of mXy were weighed in the second tank, and mixed and stirred to prepare an MMA solution for subsequent addition.

The liquid contained in the reactor was subjected to 1 hour of nitrogen bubbling at a rate of 30 L/min, and the liquid in each of the first and second tanks was subjected to 30 minutes of nitrogen bubbling at a rate of 10 L/min, to remove dissolved oxygen.

Thereafter, the temperature of the solution in the reactor was raised to 123° C. by blowing steam into the jacket, and then the contents of the reactor were stirred at 50 rpm while adding a polymerization initiator solution containing 0.481 kg of 1,1-di(t-butylperoxy)cyclohexane dissolved in 2.644 kg of mXy at a rate of 1 kg/hour to initiate polymerization.

The temperature of the solution inside the reactor during polymerization was controlled to 123±2° C. through temperature adjustment using the jacket. The rate to add the initiator solution was reduced to 0.25 kg/hour after 30 minutes from the start of polymerization, and mXy was added from the first tank over 3.5 hours at 30.78 kg/hour.

The rate to add the initiator solution was then increased to 0.75 kg/hour after 4 hours from the start of polymerization, and the MMA solution for subsequent addition was added at 100 kg/hour for 2 hours from the second tank.

Moreover, the rate to add the initiator solution was reduced to 0.25 kg/hour after 6 hours from the start of polymerization, and addition was stopped after 7 hours from the start of polymerization.

After 8 hours from the start of polymerization, a polymer solution containing a methacrylic resin was yielded.

An evaluation of the contents of N-substituted maleimides contained in the produced polymerization solution revealed that 340 ppm by mass of phMI and 1480 ppm by mass of chMI were contained.

The resultant polymerization solution was then fed into a condensation device including a tubular heat exchanger which had been pre-heated to 250° C. and a vaporization tank, and had no rotating part for performing devolatilization. The condition of the degree of vacuum in the vaporization tank was 10 Torr to 15 Torr. The resin flowed down in the vaporization tank was discharged by a screw pump, was extruded from a strand die, and was pelletized after water cooling to obtain a methacrylic resin. The shear rate in the devolatilization apparatus was calculated to be 5.3 s⁻¹ from the shape of the apparatus and the operating conditions.

It was confirmed that the chemical composition of the obtained pelletized polymerized product comprised structural units derived from the monomers MMA, phMI, and chMI in proportions of 80.0 mass %, 7.2 mass %, and 12.8 mass %, respectively. The weight average molecular weight was 137,000, and Mw/Mn was 2.32. The other physical properties are summarized in Table 3.

Comparative Example 3

A mixed solution of 45.0 kg of phMI, 30.0 kg of chMI, and 247.0 kg of mXy was prepared through a procedure similar to that in Example 1 from the 10.3-mass % of phMI solution in mXy (containing 0.42 ppm by mass of APSI) and the 20.3-mass % chMI solution in mXy (containing 0.60 ppm by mass of CCSI) which had been subjected to the water washing and dehydration steps. To this solution, 485.1 kg of MMA and 0.660 kg of n-octylmercaptan were charged to prepare a mixed monomer solution.

The liquid contained in the reactor was subjected to 1 hour of nitrogen bubbling at a rate of 30 L/min to remove dissolved oxygen.

Thereafter, the temperature of the solution in the reactor was raised to 124° C. by blowing steam into the jacket, and then the contents of the reactor were stirred at 50 rpm while adding a polymerization initiator solution prepared by dissolving 0.23 kg of 1,1-di(t-butylperoxy)cyclohexane dissolved in 1.82 kg of mXy at a rate of 1 kg/hour to initiate polymerization. Moreover, the addition rate of the initiator solution was reduced to 0.5 kg/hour, 0.42 kg/hour, 0.35 kg/hour, 0.14 kg/hour, and 0.13 kg/hour after 0.5 hours, 1 hour, 2 hours, 3 hours, and 4 hours had passed after the start of polymerization, respectively, and the addition was stopped after 7 hours had passed after the start of polymerization.

The temperature of the solution inside the reactor during polymerization was controlled to 124±2° C. through temperature adjustment using the jacket.

A polymerization solution containing a methacrylic resin having a cyclic structure in the main chain thereof was obtained after 15 hours from the start of polymerization.

An evaluation of the contents of N-substituted maleimides contained in the produced polymerization solution revealed that 6500 ppm by mass of phMI and 2260 ppm by mass of chMI were contained.

To the polymerization solution under stirring, 0.1 mass % of Irganox 1076 and 0.05 mass % of Irgafos 168 were added relative to 100 mass % of polymer contained in the solution.

The polymerization solution to which the antioxidant was added was fed to a condensation device including a tubular heat exchanger which had been pre-heated to 170° C. and a vaporization tank to increase the concentration of the polymer contained in the solution to 70 mass %. The resultant polymerization solution was then fed to a thin film evaporator having a rotating part and a heat transfer area of 0.2 m² to perform devolatilization.

This step were performed under the conditions of a temperature inside the device of 280° C., a feed rate of 30 L/hour, a rotation speed of 400 rpm, and a degree of vacuum of 30 Torr. The polymerized product subjected to devolatilization was then pressurized using a gear pump, extruded from a strand die, water cooled, and subsequently pelletized to obtain pellets of the methacrylic resin composition. The shear rate inside the thin film evaporator having the rotating part was estimated to be $3.2 \times 10^3$ s⁻¹ from the shape of the apparatus and the operating conditions.

It was confirmed that the chemical composition of the obtained pelletized polymerized product comprised structural units derived from the monomers MMA, phMI, and chMI in proportions of 87.3 mass %, 7.7 mass %, and 5.0 mass %, respectively. The weight average molecular weight was 152,000, Mw/Mn was 2.05, and the glass transition temperature was 135° C. The other physical properties are summarized in Table 3.

Comparative Example 4

After 400.3 kg of MMA, 100.2 kg of styrene, 0.396 kg of n-dodecylmercaptan (which was equivalent to 800 ppm by mass relative to the total mass of all monomers charged into the polymerization system), and 500.4 kg of toluene were weighed out, the mixture was charged to a 1.25-m³ reactor equipped with a temperature controller functioning through use of a jacket and a stirring blade and stirred to yield a mixed monomer solution.

The liquid contained in the reactor was then subjected to 1 hour of nitrogen bubbling at a rate of 30 L/min to remove dissolved oxygen.

Thereafter, the temperature of the solution in the reactor was raised to 120° C. by blowing steam into the jacket, and then the contents of the reactor were stirred at 50 rpm while adding a polymerization initiator solution containing 0.253 kg of 1,1-di(t-amylperoxy)cyclohexane dissolved in 4.748 kg of mXy for 5 hours at a rate of 1.0 kg/hour to initiate polymerization. In this manner, the polymerization initiator was not added at the initial stage, but added at a constant addition rate for predetermined time.

The temperature of the solution inside the reactor during polymerization was controlled to 120±2° C. through temperature adjustment using the jacket.

The polymerization solution was sampled after 6 hours from the start of the polymerization to determine the polymerization conversion ratio from the concentration of residual monomers. Because the polymerization conversion ratio was determined to be 96%, that point in time was determined as the end point of the polymerization (that is, the polymerization time was 6 hours).

Thereafter, this polymerization solution was fed into a condensation device including a tubular heat exchanger which had been pre-heated to 170° C. and a vaporization tank, and the concentration of polymer contained in the solution was raised to 70 mass %.

The resultant polymerization solution was fed into a thin film evaporator having a heat transfer area of 0.2 m² and was subjected to devolatilization.

This step were performed under the conditions of a temperature inside the device of 280° C., a feed amount of 30 L/hour, a rotation speed of 400 rpm, and a degree of vacuum of 30 Torr. The polymerized product subjected to devolatilization was then pressurized using a gear pump, extruded from a strand die, water cooled, and subsequently pelletized to obtain the methacrylic resin. The shear rate inside the thin film evaporator having the rotating part was estimated to be $3.2 \times 10^3$ s$^{-1}$ from the shape of the apparatus and the operating conditions.

A methacrylic resin having a glutarimide-based structural unit was produced from the resultant methacrylic resin and monomethylamine as an imidizing agent using an intermeshing co-rotating twin screw extruder having a bore diameter of 15 mm and an L/D of 90.

In this process, the oxygen concentration in the extruder was maintained to 1% or less by flowing nitrogen gas from the hopper. The temperature of each temperature control zone in the extruder was set to 250° C., and the screw rotation speed was set to 300 rpm. The MS resin was fed at 1 kg/hour, and the feed content of monomethylamine was set to 20 mass % relative to 100 mass % of the methacrylic resin. The methacrylic resin was charged from the hopper, and the resin was molten by a kneading block to be filled. Monomethylamine was then injected from the nozzle. A seal ring was disposed at the end of the reaction zone to fill the resin. Any by-products and excess methylamine after the reaction were removed by reducing the degree of vacuum in the vent port to 60 Torr. The resin which was discharged as strands from the dice disposed at the outlet of the extruder was cooled in a water tank and then pelletized by a pelletizer. The shear rate in the extruder was calculated to be 160 s$^{-1}$ from the shape of the apparatus and the operating conditions.

Then, in an intermeshing co-rotating twin screw extruder having a bore diameter of 15 mm and an L/D of 90 as the apparatus having a rotating part, the resultant pellets as produced above were charged at a feed rate of 1 kg/hour by the hopper under the following conditions: a temperature of each temperature control zone in the extruder was 230° C. and a screw rotation speed was 150 rpm. The resin was molten by a kneading block to be filled. Dimethyl carbonate was then injected from the nozzle in an amount of 0.8 mass % relative to 100 mass % of the pelletized resin. A reverse flight was disposed at the end of the reaction zone to fill the resin. Any by-products and excess dimethyl carbonate after the reaction were removed by reducing the degree of vacuum in the vent port to 100 Torr. The shear rate in the extruder was calculated to be 80 s$^{-1}$ from the shape of the apparatus and the operating conditions.

The resin which was discharged as strands from the dice disposed at the outlet of the extruder was cooled in a water tank and then pelletized again by a pelletizer, to thereby produce a methacrylic resin having a glutarimide structure.

Comparative Example 5

A methacrylic resin was produced in the same manner as in Comparative Example 1, except that the polymer solution obtained in Comparative Example 1 was fed to a condensation device including a tubular heat exchanger which had been pre-heated to 170° C. and a vaporization tank, and the concentration of the polymer contained in the solution was increased to 70 mass % and then supplied to a twin screw devolatilization extruder before devolatilization in the twin screw devolatilization extruder.

Comparative Example 6

The polymer solution obtained in Comparative Example 1 was desolvated by steam distillation, pulverized, dried, and then passed through an extruder under conditions of a barrel temperature of 260° C. and a screw rotation speed of 100 rpm. Strands were pelletized, and water cooled to yield a methacrylic resin. The shear rate in the extruder was calculated to be 53 s$^{-1}$ from the shape of the apparatus and the operating conditions.

TABLE 3

| | Conditions for production of methacrylic resin | | | | | | | | |
|---|---|---|---|---|---|---|---|---|---|
| | Content (ppm by mass) of 2-ammo-N-substituted succinimide in N-substituted maleimide | | Form of polymerization | Content (ppm by mass) of unreacted N-substituted maleimide at end of polymerization | | Form of devolatilization | Devol. temp ° C. | Glu. method | Glu. temp ° C. |
| | APSI | CCSI | | PhMI | ChMI | | | | |
| Ex. 1 | 0.42 | 0.60 | Semi batch | 340 | 120 | Flash devolatilization | 260 | — | — |

TABLE 3-continued

| | | | | | | | | | |
|---|---|---|---|---|---|---|---|---|---|
| Ex. 2 | 0.42 | 0.60 | Semi batch | 80 | 460 | Flash devolatilization | 240 | — | — |
| Ex. 3 | 0.42 | 0.60 | Semi batch | 30 | 250 | Flash devolatilization | 260 | — | — |
| Ex. 4 | 0.42 | 0.60 | Batch | 6300 | 2150 | Flash devolatilization | 260 | — | — |
| Ex. 5 | 3.4 | 4.6 | Semi batch | 320 | 110 | Flash devolatilization | 260 | — | — |
| Ex. 7 | — | — | Batch | — | — | Flash devolatilization | 250 | Solution | 190 |
| Ex. 8 | — | — | Batch | — | — | Flash devolatilization | 250 | Solution | 220 |
| Comp. Ex. 1 | 0.42 | 0.60 | Semi batch | 240 | 1010 | Twin screw extrusion | 260 | — | — |
| Comp. Ex. 2 | 60 | 80 | Semi batch | 340 | 1480 | Flash devol. | 250 | — | — |
| Comp. Ex. 3 | 0.42 | 0.60 | Batch | 6500 | 2260 | Precondensation-thin film distillation | 170→280 | — | — |
| Comp. Ex. 4 | — | — | Batch | — | — | Precondensation-thin film distillation | 170→280 | Twin screw extrusion | 230 |
| Comp. Ex. 5 | 0.42 | 0.60 | Semi batch | 240 | 1010 | Precondensation-twin screw extrusion | 170→260 | — | — |
| Comp. Ex. 6 | 0.42 | 0.60 | Semi batch | 240 | 1010 | Steam distillation | 260 | — | — |

| | Properties of methacrylic resin | | | | | Properties of formed piece | |
|---|---|---|---|---|---|---|---|
| | Concentration of converted from emission intensity at 514 nm* ×10$^{-10}$ mol/L | Concentration converted from emission intensity at 458 nm** ×10$^{-9}$ mol/L | Glass transition temp. °C. | Photoelastic coefficient ×10$^{-12}$ Pa$^{-1}$ | YI of solution of pellets (10 cm) | YI of solution of formed piece (10 cm) | Length direction YI of 80 mm molded piece |
| Ex. 1 | 10 | 4.3 | 132 | 0.3 | 5.4 | 5.9 | 13.7 |
| Ex. 2 | 16 | 5.5 | 131 | 0.2 | 4.6 | 5.6 | 14.8 |
| Ex. 3 | 24 | 8.2 | 150 | 0.7 | 5.9 | 6.2 | 15.8 |
| Ex. 4 | 28 | 19.0 | 135 | 0.5 | 6.1 | 6.3 | 16.4 |
| Ex. 5 | 13 | 4.9 | 132 | 0.3 | 5.6 | 6.0 | 14.0 |
| Ex. 7 | 17 | 5.2 | 132 | 2.9 | 3.4 | 4.7 | 16.2 |
| Ex. 8 | 28 | 12.1 | 135 | 3.0 | 4.1 | 5.3 | 20.1 |
| Comp. Ex. 1 | 35 | 10.4 | 134 | 0.4 | 6.1 | 6.7 | 18.5 |
| Comp. Ex. 2 | 36 | 11.6 | 135 | 0.1 | 6.3 | 6.3 | 19.5 |
| Comp. Ex. 3 | 165 | 49.5 | 135 | 0.8 | 7.2 | 8.6 | 40.9 |
| Comp. Ex. 4 | 39 | 16.4 | 133 | 3.0 | 4.2 | 5.6 | 29.7 |
| Comp. Ex. 5 | 33 | 10.1 | 134 | 0.4 | 6.0 | 6.5 | 18.3 |
| Comp. Ex. 6 | 38 | 12.8 | 134 | 0.4 | 6.5 | 6.9 | 20.1 |

Ex. = Example,
Comp. = Comparative,
Devol. = Devolatilization,
Glu. = Glutarimization
*Concentration obtained by converting emission intensity at a wavelength of 514 nm into concentration of fluorescein/ethanol solution
**Concentration obtained by converting emission intensity at a wavelength of 458 nm into concentration of quinine sulfate/dilute sulfuric acid solution As can be seen from Table 3, the methacrylic resin shaped articles of the examples had improved color tones in long optical path lengths.

In the comparative examples, on the other hand, although the solutions of the methacrylic resins and the methacrylic resin shaped articles had good color tones, the methacrylic resin shaped articles had inferior color tones in long path lengths.

INDUSTRIAL APPLICABILITY

The methacrylic resin and the methacrylic resin composition of the present disclosure have not only high heat resistance and excellent birefringence, but are significantly excellent in color tone and transparency.

Examples of formed articles for optical components produced from the methacrylic resin composition of the present disclosure include, for example, light guide plates, display front plates, and touch panels used for displays of smartphones, PDAs, tablet PCs, liquid crystal televisions, etc., lenses of cameras on smartphones and tablet PCs, and optical lens components of head mount displays, liquid crystal projectors, and the like, such as prism elements, waveguides, and lenses, among others, small and thin optical lens having varied thicknesses, optical fibers, sheath materials for optical fibers, phase plates having lenses, Fresnel lenses, or microlens arrays, and optical cover components. Further, examples of automotive parts include light guide plates for in-vehicle displays; panels for in-vehicle meters; optical components for front plates of car navigation systems, head-up displays such as combiners and optical cover components; lenses of in-vehicle cameras; and light guide rods. Other than the above-listed applications, the shaped article can be preferably used for parts of display apparatuses for digital signage or the like for presenting information on a thin display apparatus which is connected to a network for the purpose of promotion, advertising, or the like, at locations such as camera focus plates, outdoor places, storefronts, public facilities, and public transportation facilities.

The invention claimed is:

1. A methacrylic resin having a structural unit (X),
   the structural unit (X) comprising a cyclic structure in a main chain thereof,
   the methacrylic resin having a glass transition temperature (Tg) of higher than 120° C. and 160° C. or lower,
   an emission intensity at a wavelength of 514 nm in terms of a concentration of a solution of fluorescein in ethanol being $30 \times 10^{-10}$ mol/L or less when a solution containing 2.0 mass % of the methacrylic resin in chloroform is spectroscopically analyzed using an excitation wavelength of 436 nm and a slit width of 2 nm.

2. The methacrylic resin according to claim 1, wherein the emission intensity in terms of the concentration of the solution of fluorescein in ethanol is $1 \times 10^{10}$ mol/L or more and $20 \times 10^{-10}$ mol/L or less.

3. The methacrylic resin according to claim 1, wherein an emission intensity at a wavelength of 458 nm in terms of a concentration of a solution of quinine sulfate dihydrate dissolved in a 1-mol/L dilute sulfuric acid is $4 \times 10^{-9}$ mol/L or more and $6 \times 10^{-9}$ mol/L or less when a solution containing 2.0 mass % of the methacrylic resin in chloroform is spectroscopically analyzed using an excitation wavelength of 365 nm and a slit width of 2 nm.

4. The methacrylic resin according to claim 1, wherein the methacrylic resin has a photoelastic coefficient with an absolute value of $3.0 \times 10^{-12}$ Pa$^{-1}$ or less.

5. The methacrylic resin according to claim 1, wherein the structural unit (X) comprises at least one structural unit selected from the group consisting of an N-substituted maleimide monomer-derived structural unit, a glutarimide-based structural unit, and a lactone ring structural unit in the main chain thereof.

6. A method of producing the methacrylic resin according to claim 1, the structural unit (X) having an N-substituted maleimide monomer-derived structural unit in a main chain thereof, and the methacrylic resin having a photoelastic coefficient with an absolute value of $3.0 \times 10^{-12}$ Pa$^{-1}$ or less, the method comprising:
   a pretreatment step of water washing and/or dehydrating N-substituted maleimide so that an amount of 2-amino-N-substituted succinimide in a solution of N-substituted maleimide is 5 ppm by mass or less relative to 100 mass % of N-substituted maleimide in the solution of N-substituted maleimide;
   a polymerization step of performing polymerization using the solution of N-substituted maleimide obtained through the pretreatment step; and
   a devolatilization step of devolatilizing a polymerization solution obtained through the polymerization step using a devolatilization apparatus without any rotating part.

7. The method of producing a methacrylic resin according to claim 6, wherein a shear rate exerted on the polymerization solution in the devolatilization step is 20 s$^{-1}$ or less.

8. The method of producing a methacrylic resin according to claim 6, wherein the polymerization step comprises supplementarily adding 5 mass % to 35 mass % of a methacrylic acid ester monomer relative to 100 mass % of a total mass of all monomers fed for the polymerization after 30 or more minutes pass after addition of a polymerization initiator is started.

9. The method of producing a methacrylic resin according to claim 6, wherein a total mass of unreacted N-substituted maleimide remaining after an end of the polymerization is 10 ppm by mass or more and 1000 ppm by mass or less relative to 100 mass % of the polymerization solution at the end of the polymerization.

10. The method of producing a methacrylic resin according to claim 6, wherein
    the N-substituted maleimide monomer comprises N-arylmaleimide, and
    a total mass of unreacted N-arylmaleimide after the end of the polymerization is 10 ppm by mass or more and 500 ppm by mass or less relative to 100 mass % of the polymerization solution at the end of the polymerization.

11. A methacrylic resin composition comprising the methacrylic resin according to claim 1.

12. A shaped article comprising the methacrylic resin composition according to claim 11.

13. An optical component comprising the shaped article according to claim 12.

14. The optical component according to claim 13, wherein the optical component is a light guide plate.

15. The optical component according to claim 13, wherein the optical component is a lens.

16. An automotive part comprising the shaped article according to claim 12.

17. The methacrylic resin according to claim 4, wherein the structural unit (X) comprises at least one structural unit selected from the group consisting of an N-substituted maleimide monomer-derived structural unit, a glutarimide-based structural unit, and a lactone ring structural unit.

18. The method of producing a methacrylic resin according to claim 7, wherein the polymerization step comprises supplementarily adding 5 mass % to 35 mass % of a methacrylic acid ester monomer relative to 100 mass % of a total mass of all monomers fed for the polymerization after 30 or more minutes pass after addition of a polymerization initiator is started.

19. The method of producing a methacrylic resin according to claim 7, wherein a total mass of unreacted N-substituted maleimide remaining after an end of the polymerization is 10 ppm by mass or more and 1000 ppm by mass or less relative to 100 mass % of the polymerization solution at the end of the polymerization.

20. The method of producing a methacrylic resin according to claim 7, wherein
    the N-substituted maleimide monomer comprises N-arylmaleimide, and a total mass of unreacted N-arylmaleimide after the end of the polymerization is 10 ppm by mass or more and 500 ppm by mass or less relative to 100 mass % of the polymerization solution at the end of the polymerization.

21. A methacrylic resin composition comprising the methacrylic resin according to claim 4.

* * * * *